US011155235B2

(12) United States Patent
Breed et al.

(10) Patent No.: US 11,155,235 B2
(45) Date of Patent: Oct. 26, 2021

(54) AIRBAGS INCLUDING INFLATOR ASSEMBLIES

(71) Applicant: Automotive Technologies International, Inc., Miami Beach, FL (US)

(72) Inventors: David S Breed, Miami Beach, FL (US); Gennadii A Voropaiev, Kiev (UA); Nina F Yurchenko, Kiev (UA); Yuriy A Paramonov, Kiev (UA); Andriy I Koshil, Kiev (UA)

(73) Assignee: Automotive Technologies International, Inc., Miami Beach, FL (US)

( * ) Notice: Subject to any disclaimer, the term of this patent is extended or adjusted under 35 U.S.C. 154(b) by 12 days.

(21) Appl. No.: 16/476,594

(22) PCT Filed: Jan. 10, 2018

(86) PCT No.: PCT/US2018/013088
§ 371 (c)(1),
(2) Date: Jul. 9, 2019

(87) PCT Pub. No.: WO2018/132420
PCT Pub. Date: Jul. 19, 2018

(65) Prior Publication Data
US 2019/0359167 A1 Nov. 28, 2019

Related U.S. Application Data

(60) Provisional application No. 62/444,898, filed on Jan. 11, 2017, provisional application No. 62/512,463, (Continued)

(51) Int. Cl.
*B60R 21/30* (2006.01)
*B60R 21/264* (2006.01)
(Continued)

(52) U.S. Cl.
CPC .............. *B60R 21/30* (2013.01); *B60R 21/21* (2013.01); *B60R 21/26* (2013.01); *B60R 21/262* (2013.01);
(Continued)

(58) Field of Classification Search
CPC ................... B60R 21/30; B60R 21/26; B60R 2021/26094
(Continued)

(56) References Cited

U.S. PATENT DOCUMENTS 3,694,003 A  9/1972 Radke
3,741,583 A  6/1973 Usui et al.
(Continued)

FOREIGN PATENT DOCUMENTS

DE  19844427 A1  4/2000
GB  1324401 A  7/1973
(Continued)

OTHER PUBLICATIONS

Extended European Search Report dated Jul. 16, 2000 for EP 18738852.5.
Written opinion for PCT/US18/13088 dated Jun. 1, 2018.

*Primary Examiner* — Paul N Dickson
*Assistant Examiner* — Caitlin Anne Miller
(74) *Attorney, Agent, or Firm* — Brian Roffe

(57) ABSTRACT

Airbag inflator system including a housing defining a flow passage leading into an interior of an airbag). A reverse flow valve is arranged at an inlet end region and selectively enables connection of the flow passage to ambient atmosphere dependent on a pressure differential on opposite sides of the reverse flow valve. A gas generator is arranged in connection with the housing. An activation system provides a signal to the gas generator to cause generation of gas. An aspirator is arranged between the reverse flow valve and the
(Continued)

outlet end region and includes an inlet portion alongside the reverse flow valve and an aspiration portion partly separated from the inlet portion to define at least one opening in flow communication with the gas generator. The aspirator is preferably configured to generate gas flow in accordance with the Prandtl-Meyer effect.

24 Claims, 43 Drawing Sheets

Related U.S. Application Data filed on May 30, 2017, provisional application No. 62/516,702, filed on Jun. 8, 2017, provisional application No. 62/530,961, filed on Jul. 11, 2017, provisional application No. 62/531,024, filed on Jul. 11, 2017, provisional application No. 62/552,215, filed on Aug. 30, 2017, provisional application No. 62/584,159, filed on Nov. 10, 2017, provisional application No. 62/607,294, filed on Dec. 18, 2017.

(51) Int. Cl.
  B60R 21/21 (2011.01)
  B60R 21/262 (2011.01)
  B60R 21/26 (2011.01)
  G05D 1/02 (2020.01)
  B60R 21/237 (2006.01)

(52) U.S. Cl.
  CPC .......... B60R 21/264 (2013.01); B60R 21/237 (2013.01); B60R 2021/26094 (2013.01); G05D 1/021 (2013.01)

(58) Field of Classification Search
  USPC ....................................................... 280/738
  See application file for complete search history.

(56) References Cited

U.S. PATENT DOCUMENTS

| | | | |
|---|---|---|---|
| 3,801,127 A | 4/1974 | Katter | |
| 3,910,595 A | 10/1975 | Katter et al. | |
| 4,043,572 A | 8/1977 | Hattori et al. | |
| 4,817,828 A | 4/1989 | Goetz | |
| 4,846,368 A | 7/1989 | Goetz | |
| 4,877,264 A | 10/1989 | Jiesu | |
| 4,928,991 A | 5/1990 | Uiriamu | |
| 5,217,249 A | 6/1993 | Kogaguchi | |
| 5,246,083 A | 9/1993 | Graf et al. | |
| 5,433,475 A | 7/1995 | Kokeguchi | |
| 5,441,303 A | 8/1995 | Rozanski | |
| 5,505,495 A | 4/1996 | Breed | |
| 5,607,180 A | 3/1997 | Kornhauser | |
| 5,772,238 A * | 6/1998 | Breed | B60R 21/20 280/728.2 |
| 5,890,736 A * | 4/1999 | Sides | B60R 21/30 280/736 |
| 6,007,088 A * | 12/1999 | Yamamoto | B60R 21/217 280/728.3 |
| 6,142,516 A | 11/2000 | O'Loughlin et al. | |
| 6,237,947 B1 | 5/2001 | Kausch | |
| 7,703,395 B2 | 4/2010 | Cook et al. | |
| 7,740,273 B2 * | 6/2010 | Breed | B60R 21/26 280/736 |
| 7,744,122 B2 | 6/2010 | Breed | |
| 7,748,737 B2 | 7/2010 | Hall et al. | |
| 7,762,580 B2 | 7/2010 | Breed | |
| 9,039,038 B2 * | 5/2015 | Breed | B60R 21/30 280/731 |
| 10,124,759 B2 * | 11/2018 | Smith | B60R 21/36 |
| 2002/0053789 A1 * | 5/2002 | Fujimoto | B60R 21/272 280/741 |
| 2003/0218319 A1 | 11/2003 | Amamori | |
| 2003/0234523 A1 | 12/2003 | Henderson et al. | |
| 2006/0202452 A1 | 9/2006 | Breed et al. | |
| 2007/0284863 A1 | 12/2007 | Bostick et al. | |
| 2008/0284145 A1 * | 11/2008 | Breed | B60R 21/235 280/736 |
| 2008/0293342 A1 * | 11/2008 | Yu | B24B 37/30 451/288 |
| 2014/0361522 A1 | 12/2014 | Breed | |
| 2014/0375032 A1 * | 12/2014 | Fukawatase | B60R 21/239 280/729 |
| 2017/0225641 A1 * | 8/2017 | Faruque | B60R 21/2338 |
| 2019/0126887 A1 | 5/2019 | Williams et al. | |
| 2020/0391689 A1 * | 12/2020 | Fischer | B60R 21/214 |

FOREIGN PATENT DOCUMENTS

| | | |
|---|---|---|
| WO | 03093069 A1 | 11/2003 |
| WO | 2018132420 A1 | 7/2018 |

* cited by examiner

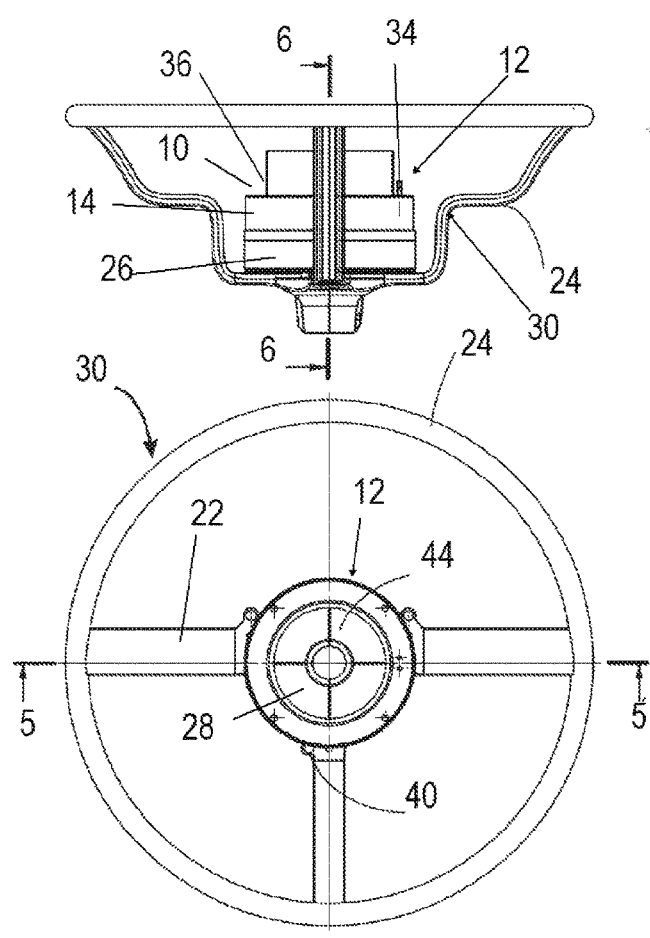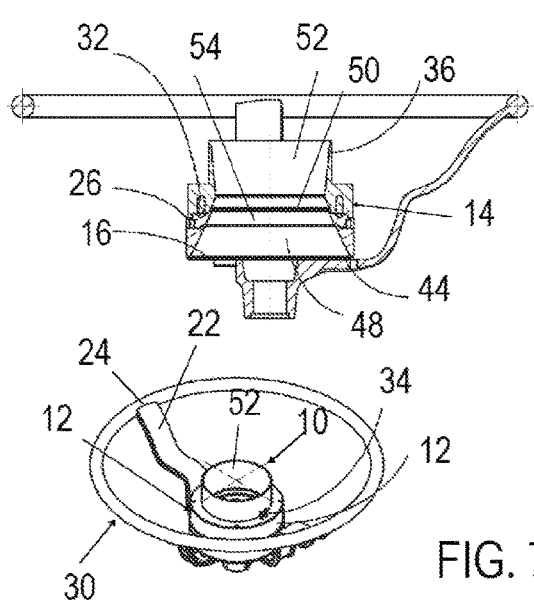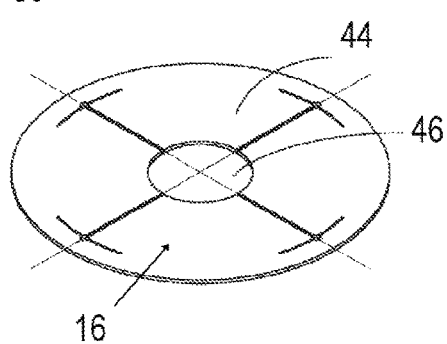

FIG. 15
FIG. 14
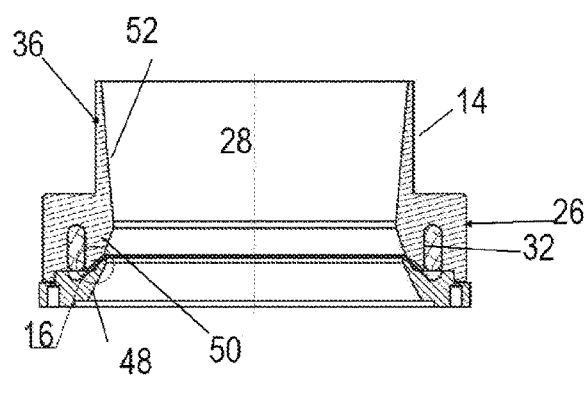
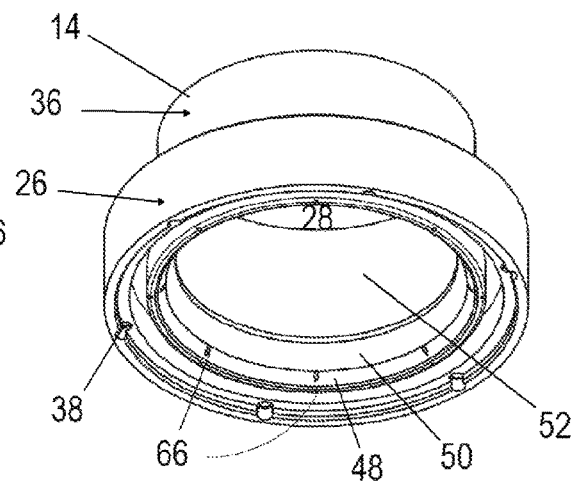
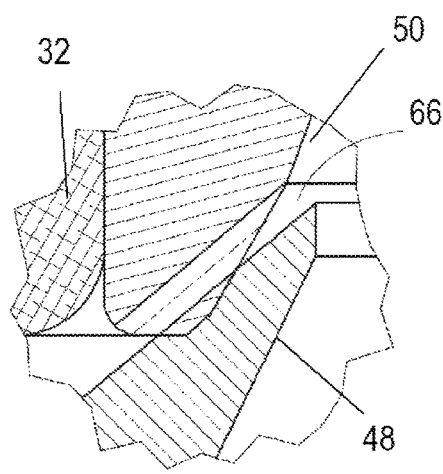
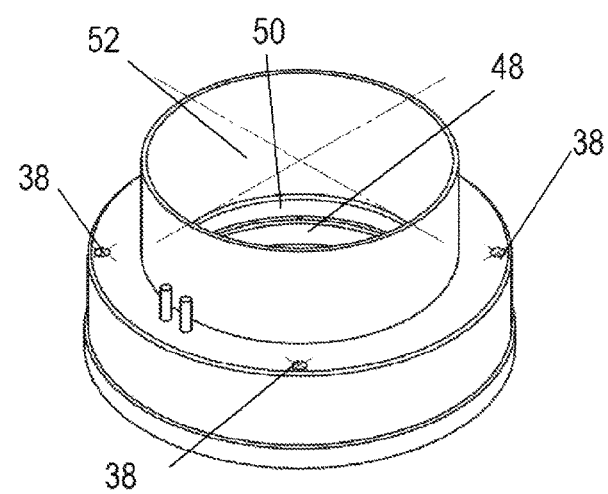
FIG. 16
FIG. 13

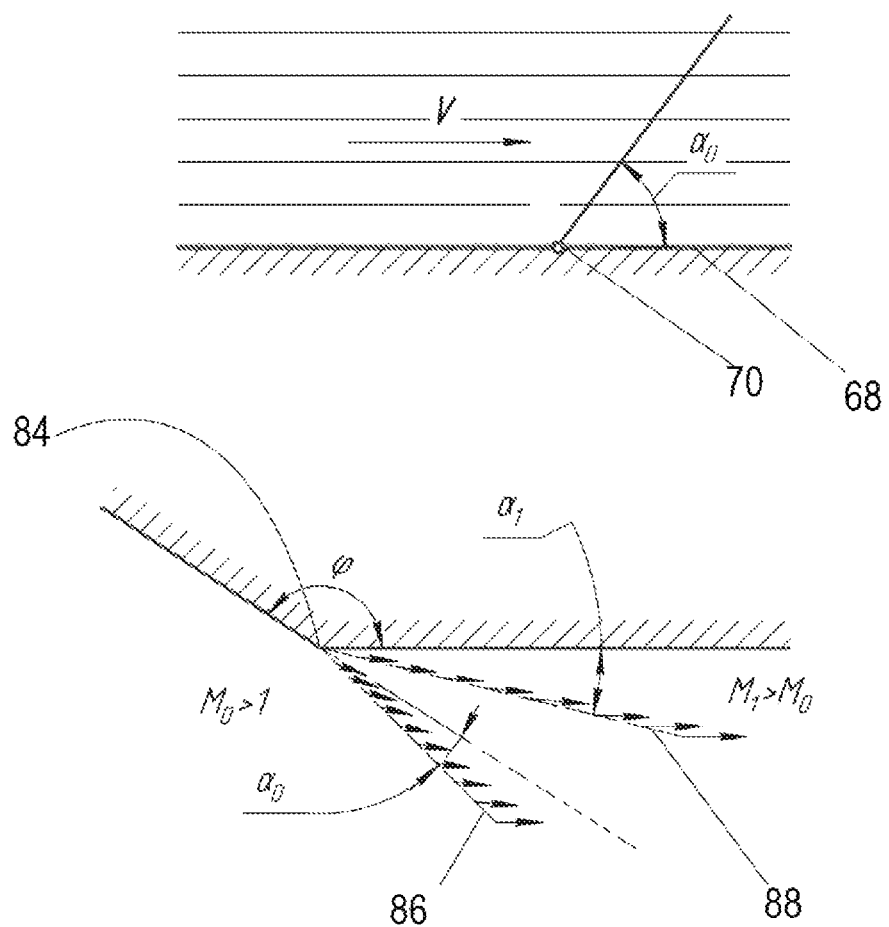

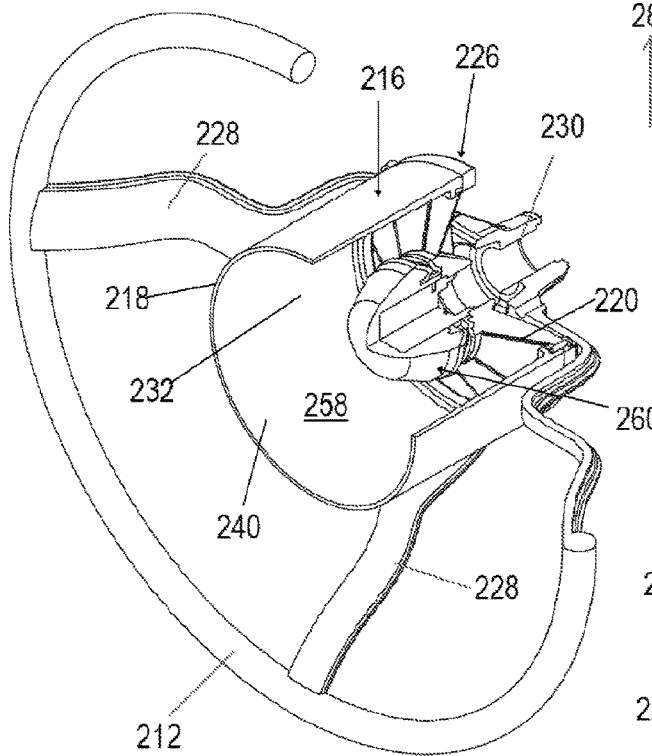
FIG. 25
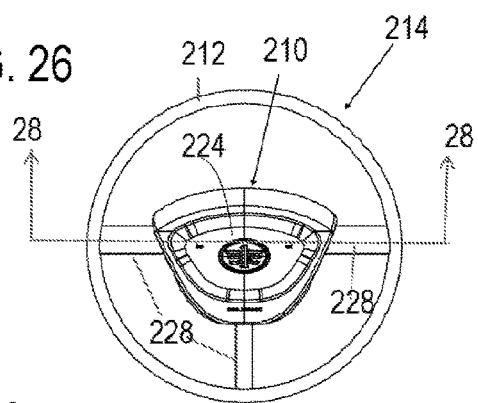
FIG. 26
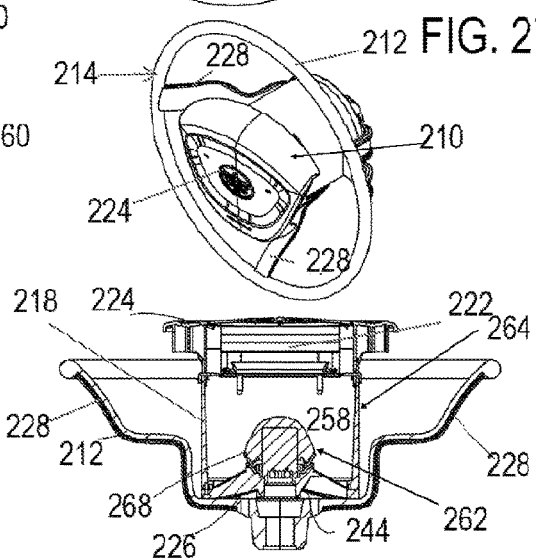
FIG. 27
FIG. 28

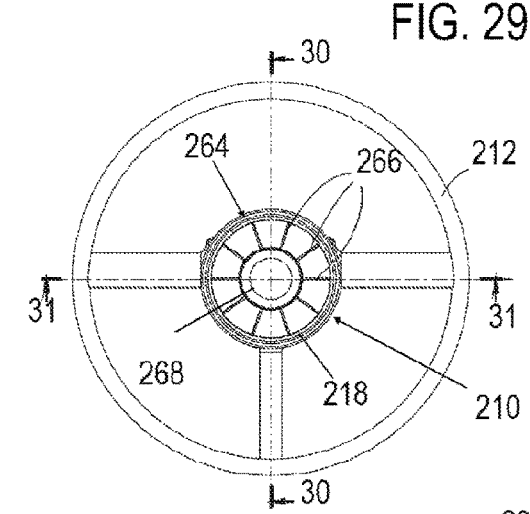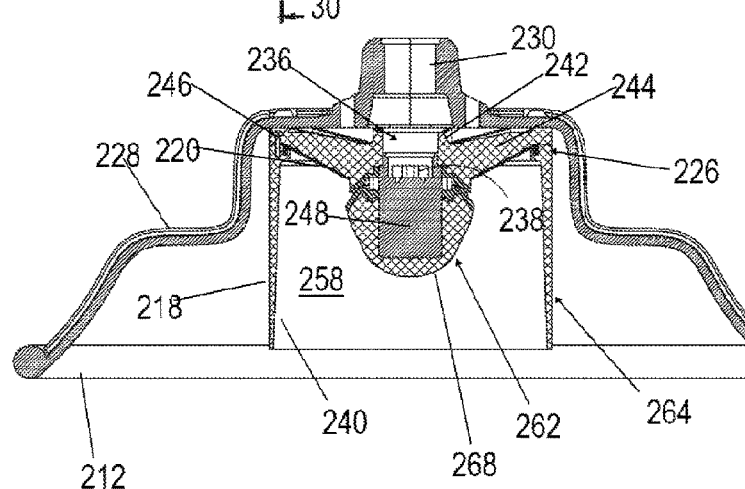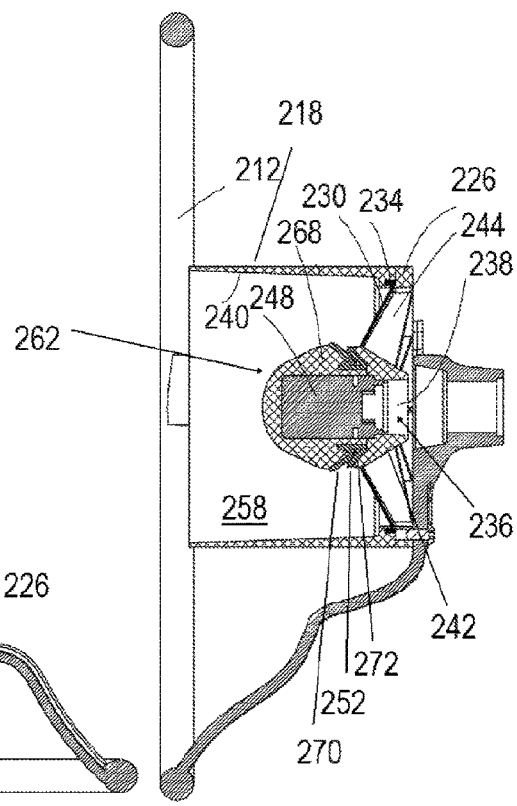

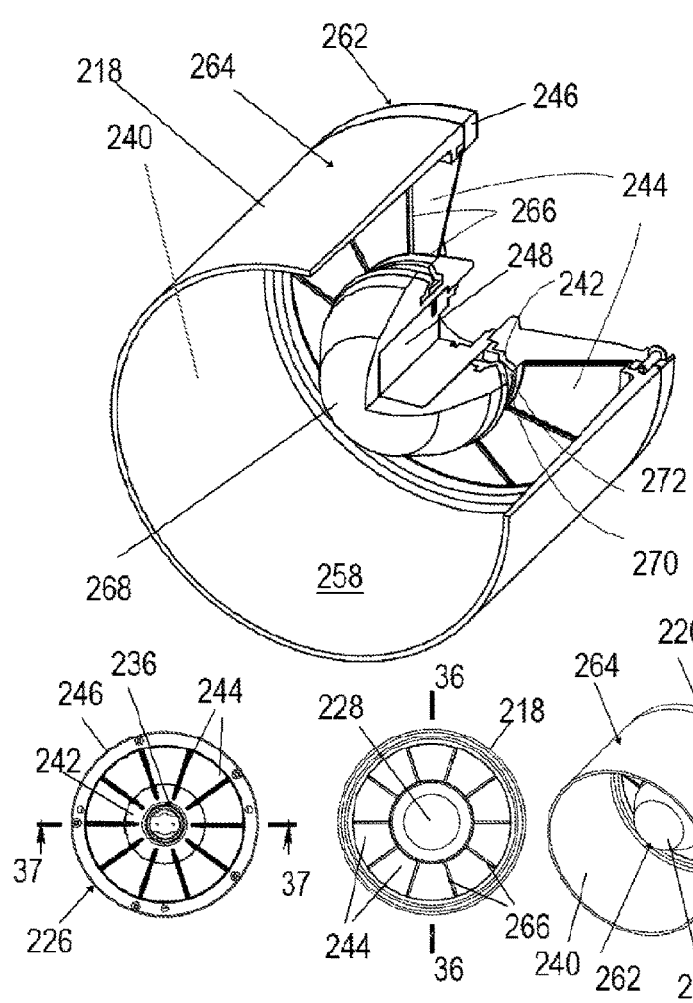
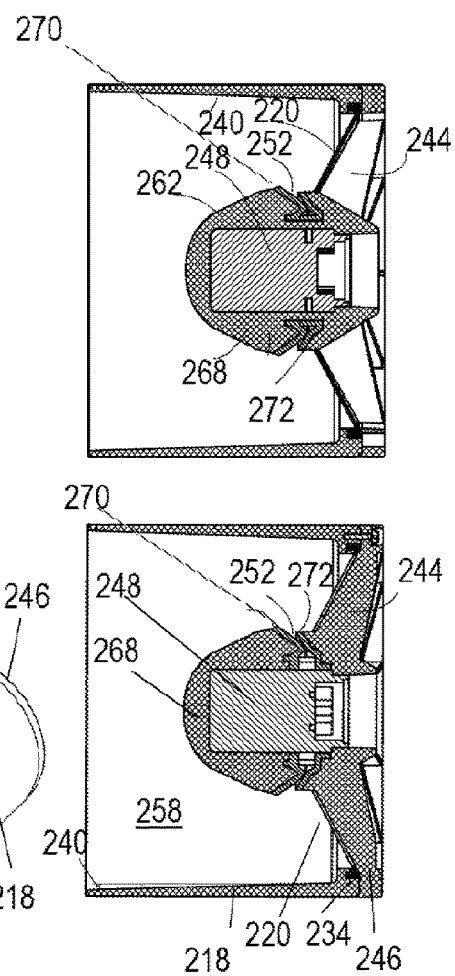
FIG. 32
FIG. 36
FIG. 35
FIG. 34
FIG. 33
FIG. 37

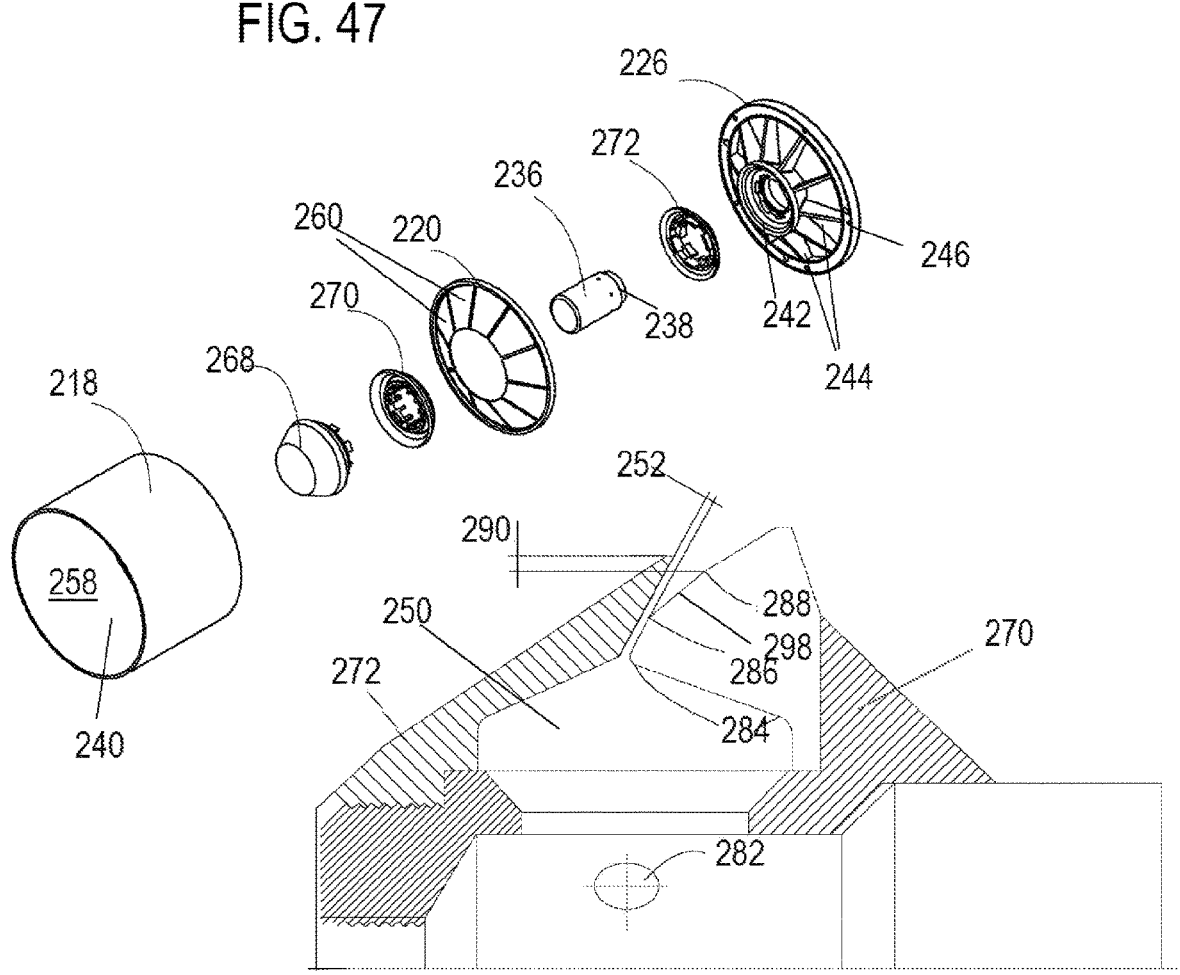

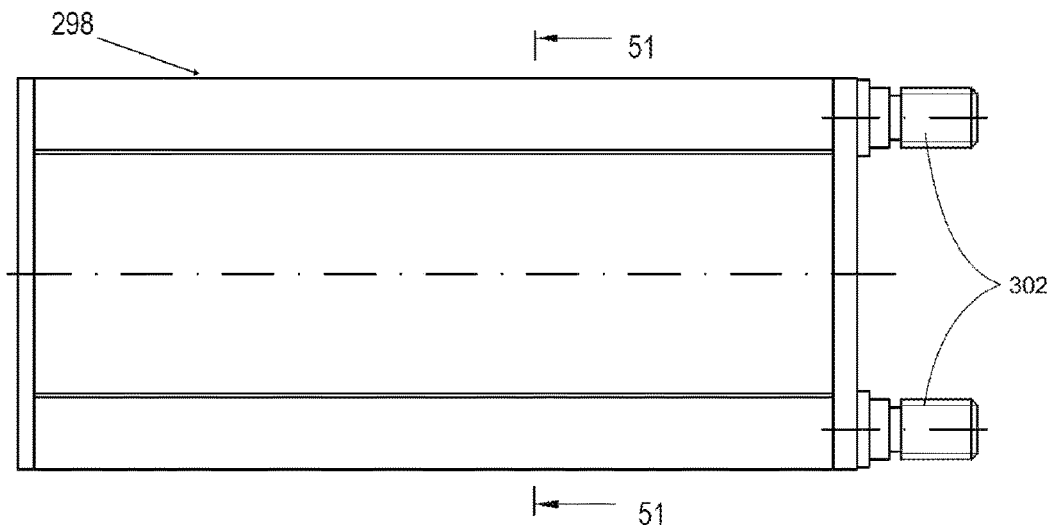
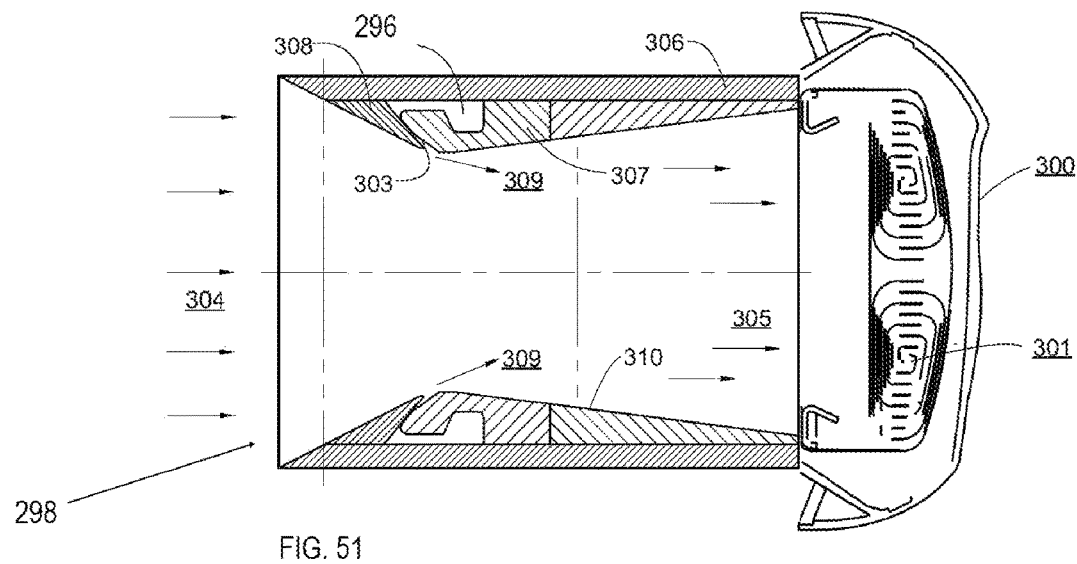

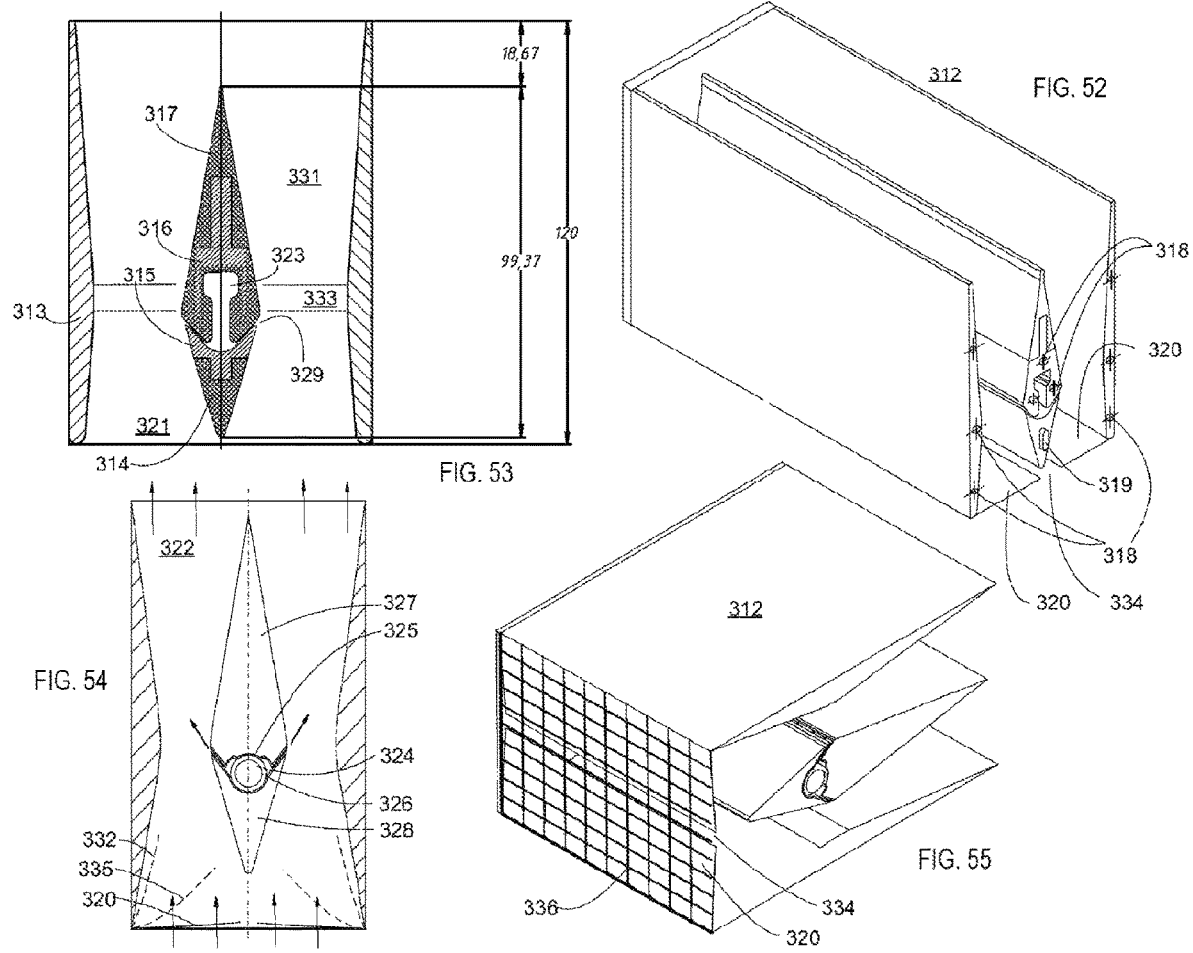

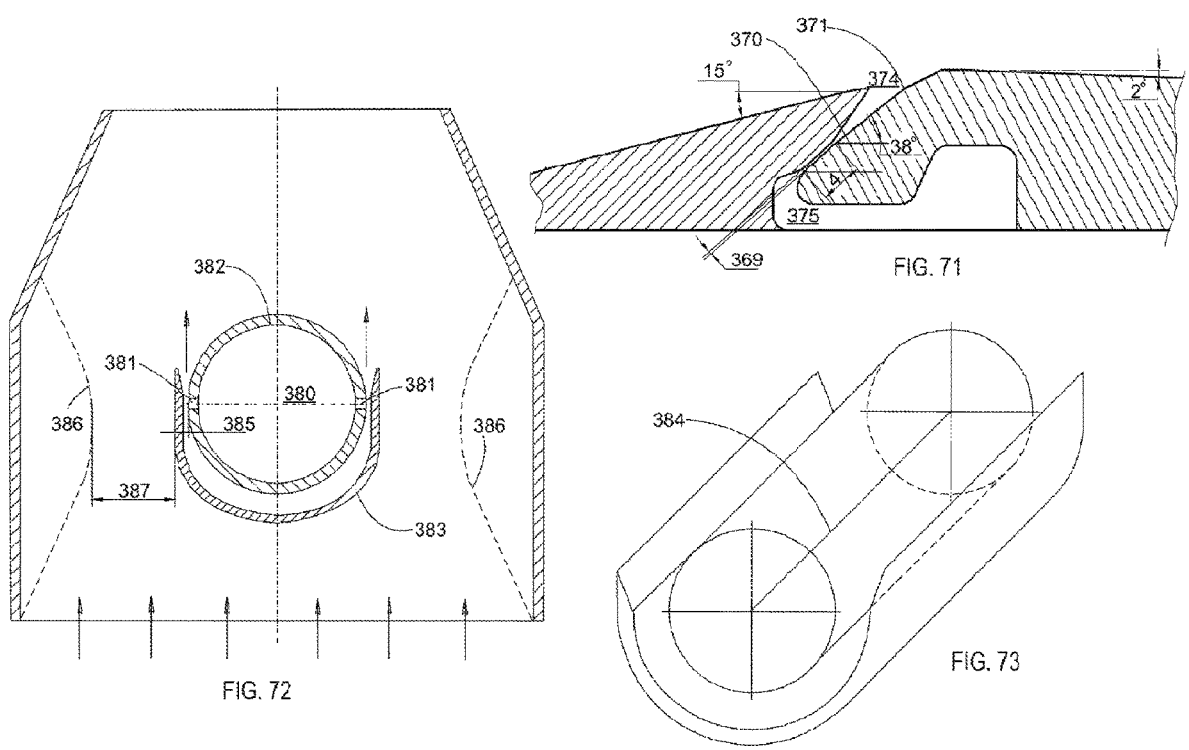

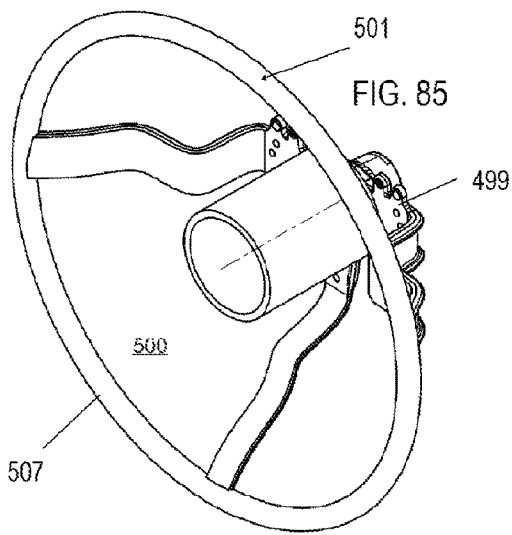
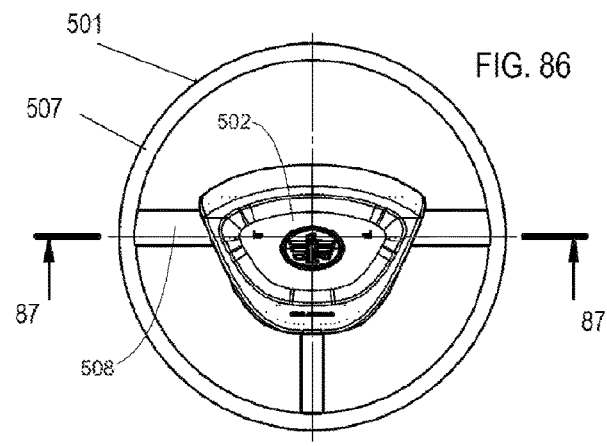
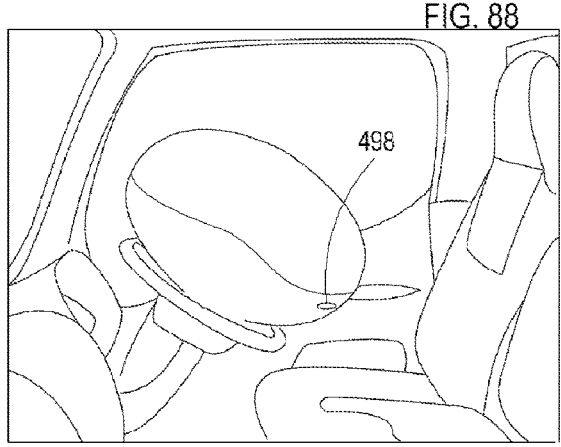
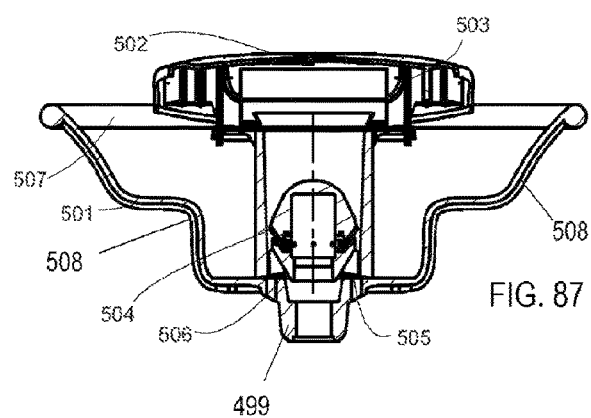

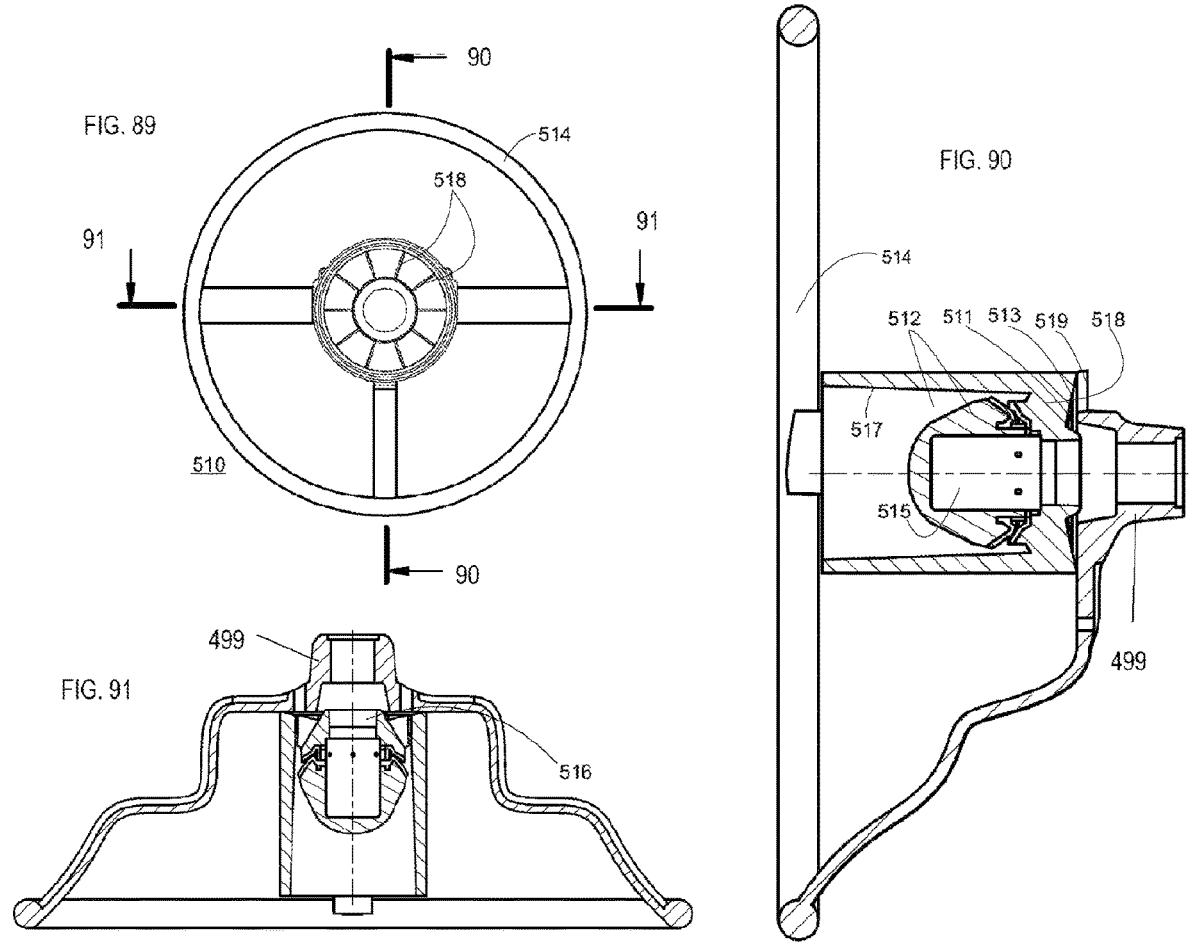

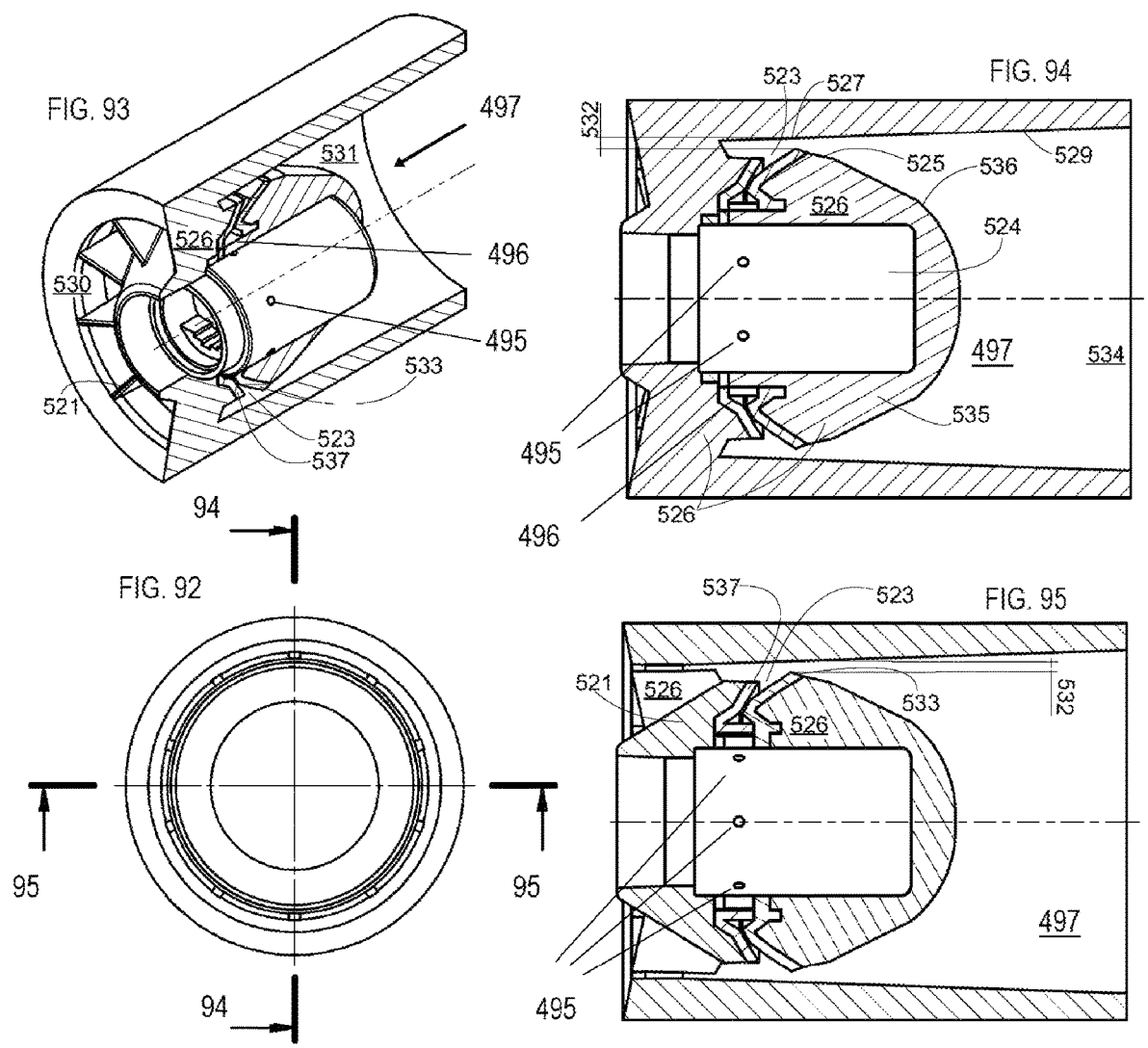

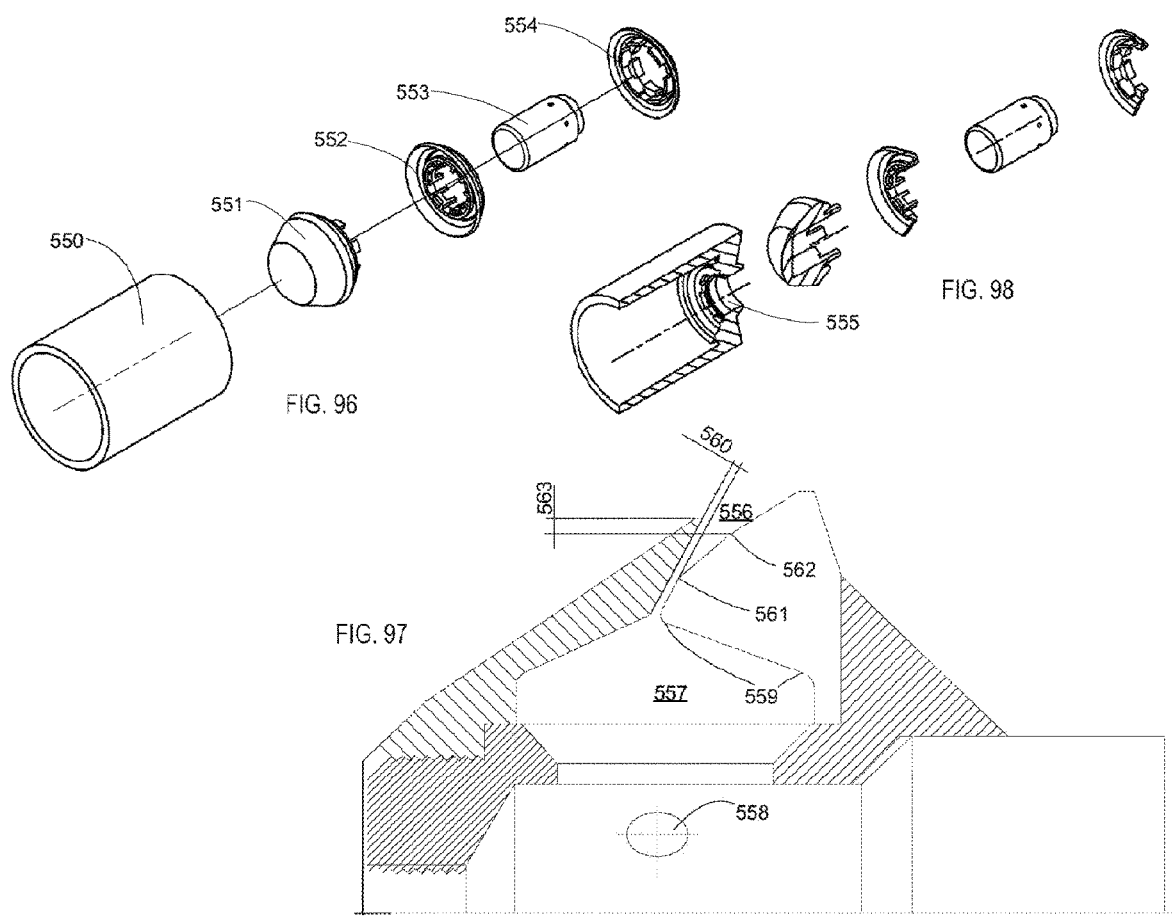

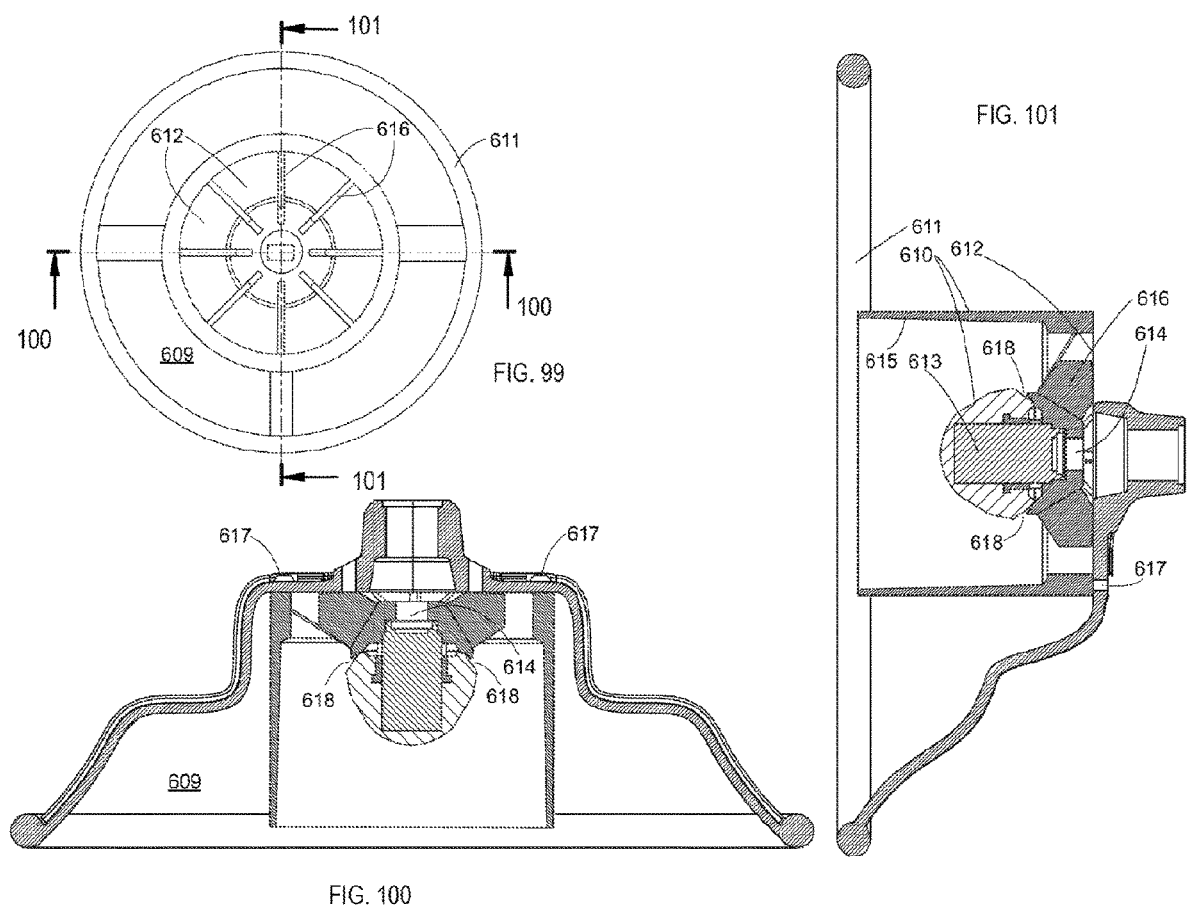

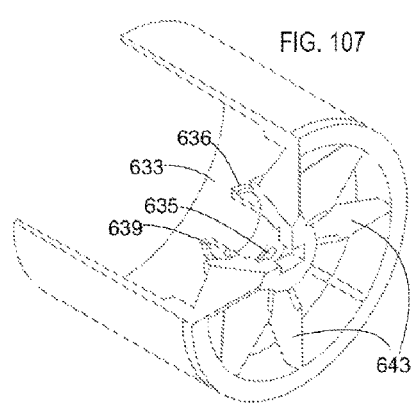
FIG. 107
FIG. 108
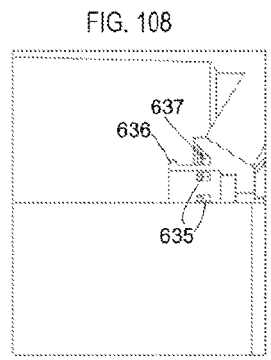
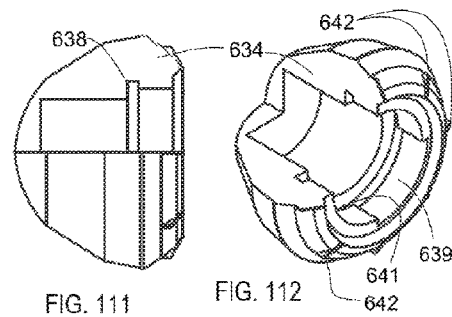
FIG. 111
FIG. 112
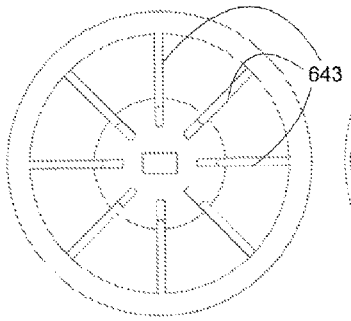
FIG. 109
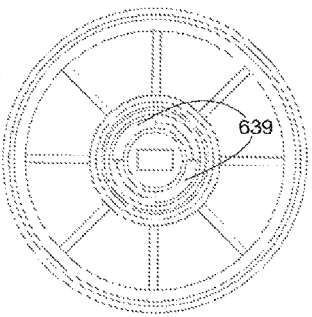
FIG. 110
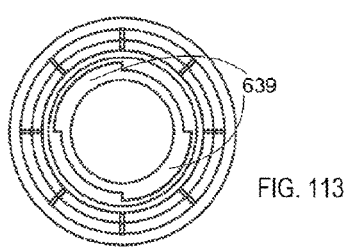
FIG. 113
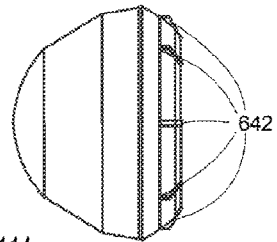
FIG. 114

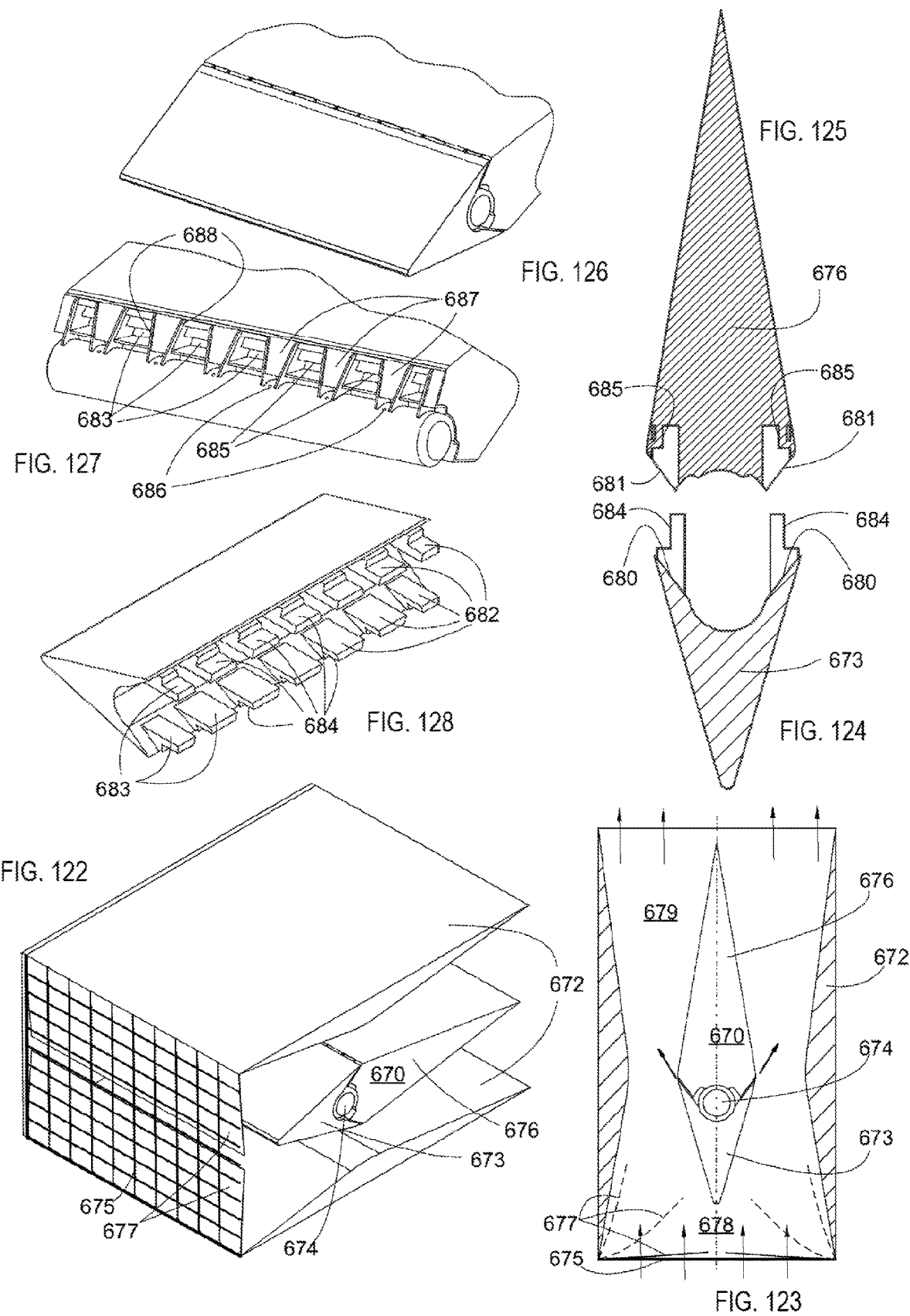

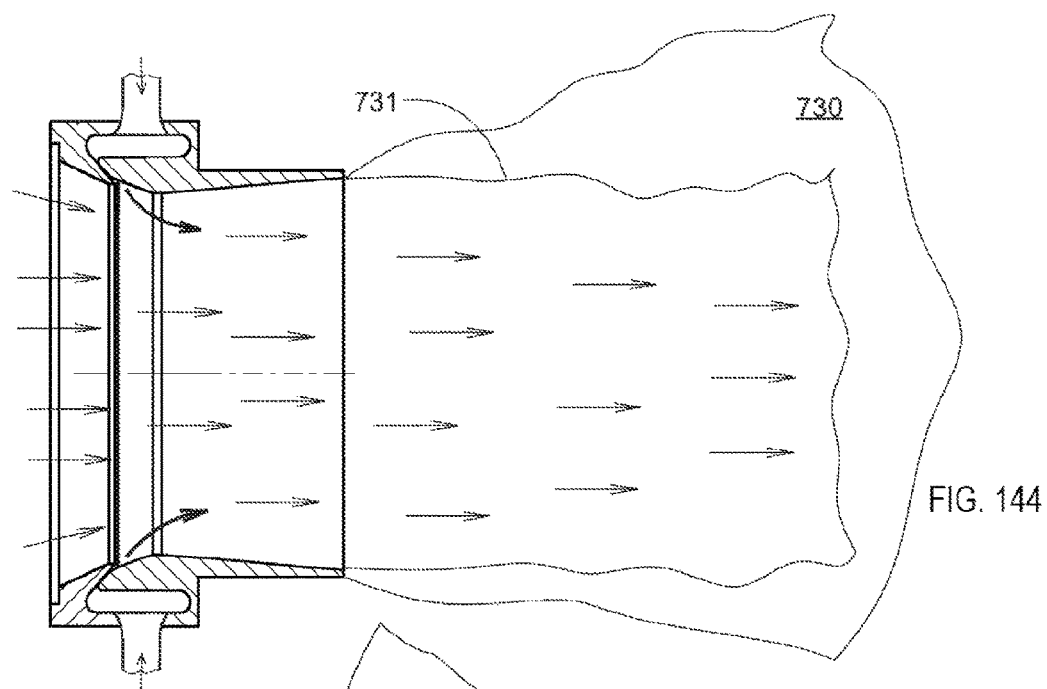
FIG. 144
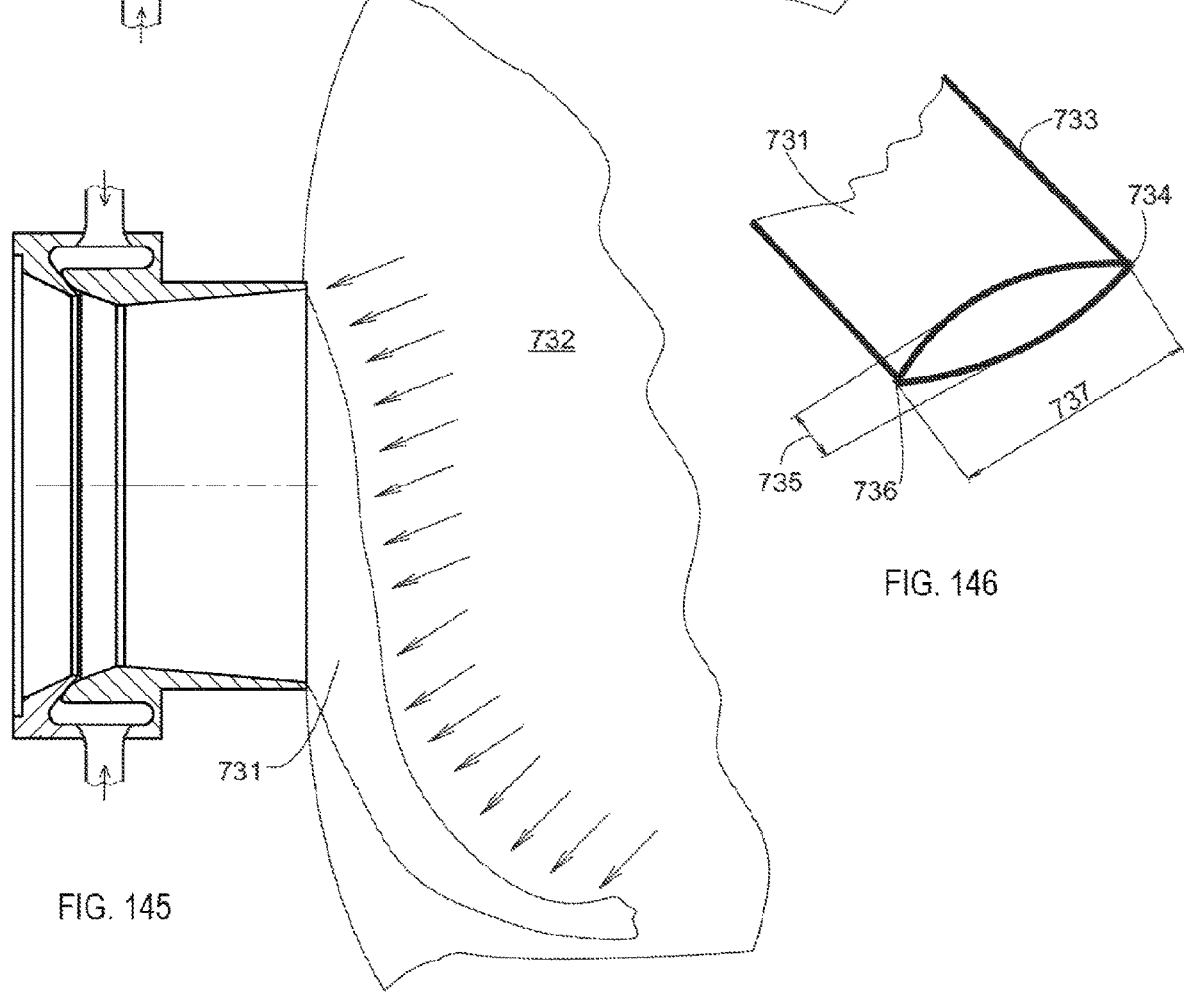
FIG. 145
FIG. 146

AIRBAGS INCLUDING INFLATOR ASSEMBLIES

TECHNICAL FIELD

The present invention relates to aspirated airbag systems capable of supersonic flow utilizing the Prandtl-Meyer effect, side curtain airbag inflators with an associated aspirator, and airbag systems for autonomous vehicles with an associated aspirated inflator.

BACKGROUND ART

Existing aspirated airbag systems include aspirators utilizing subsonic flow and the Coanda effect. The Coanda effect works well when the pressure of high-pressure gas used as a source is less than a few atmospheres and preferably no more than 3 or 5 atmospheres, this gas being referred to as a source gas. At higher pressures, the source gas can fail to follow the expected Coanda profile and thus aspiration fails to occur and high-pressure source gas can undesirably flow out the opening of the aspirator where the low pressure, ambient atmosphere gas is supposed to enter the aspirator. In particular, if the source of pressure to a Coanda nozzle exceeds a few atmospheres, the source gas, which is injected approximately perpendicular to an axis of the aspirator, fails to follow the Coanda wall curvature and thus stops aspirating air from the atmosphere. This significantly limits the source gas pressure that can be used.

Pyrotechnic gas generators used to inflate conventional airbags, on the other hand, are capable of producing gas pressure at from tens to hundreds of atmospheres and, if sought to be used with the Coanda effect, must be throttled down, essentially throwing away most of the energy of the inflator gas.

Furthermore, when using the Coanda effect, the pressure entering the airbag can be as low as 1 or 2 psi, but in order to open an airbag cover and unfold the airbag, pressure of from 3 to 6 psi is often desirable.

Prior art of interest includes U.S. Pat. Nos. 6,142,516, 7,703,395, 7,748,737 and 7,762,580, and U.S. Pat. Appln. Publ. No, 20070284863.

SUMMARY OF INVENTION

Airbag inflator systems including a housing defining at least one flow passage leading into an interior of an airbag. A reverse flow valve is arranged at an inlet end region and selectively enables connection of the flow passage to ambient atmosphere dependent on a pressure differential on opposite sides of the reverse flow valve. A gas generator is arranged in connection with the housing. An activation system provides a signal to the gas generator to cause generation of gas. An aspirator is arranged between the reverse flow valve and the outlet end region and includes an inlet portion alongside the reverse flow valve and an aspiration portion partly separated from the inlet portion to define at least one opening or slit in flow communication with the gas generator. The aspirator is preferably configured to generate gas flow in accordance with the Prandtl-Meyer effect.

BRIEF DESCRIPTION OF THE DRAWINGS

The following drawings are illustrative of embodiments of the invention and are not meant to limit the scope of the invention as encompassed by the claims.

FIG. 4 is a top view of a driver side airbag module similar to the one shown in FIG. 1 without a cover and airbag.

FIG. 5 is a side view of the module shown in FIG. 4.

FIG. 6 is a cross-sectional view of the module taken along the line 6-6 in FIG. 4.

FIG. 7 is a perspective view of the module shown in FIG. 4.

FIG. 8 is a perspective view of a reverse flow valve membrane used in the module shown in FIGS. 1 and 4.

FIG. 13 is a top perspective view of another embodiment of an aspirator of the module shown in FIGS. 1 and 4.

FIG. 14 is a bottom perspective view of the aspirator shown in FIG. 13.

FIG. 15 is a cross-sectional view of the aspirator shown in FIG. 13.

FIG. 16 is a partial cross-sectional view of the aspirator shown in FIG. 12.

FIGS. 19 and 20 illustrate the principle of Prandtl-Meyer flow.

FIG. 25 is a perspective view, partly broken away showing a driver side airbag module mounted on a steering wheel with a module cover and airbag removed.

FIG. 26 is a front view of a steering wheel including a driver side airbag module in accordance with the invention.

FIG. 27 is a front perspective view of the wheel including a driver side airbag module shown in FIG. 26.

FIG. 28 is a cross-sectional view taken along the line 28-28 of FIG. 26.

FIG. 29 is a front view of the driver side airbag module mounted on a steering wheel with the module cover and airbag removed.

FIG. 30 is a cross-sectional view taken along the line 30-30 of FIG. 29.

FIG. 31 is a cross-sectional view taken along the line 31-31 of FIG. 29.

FIG. 32 is a perspective view, partly broken away showing the aspirator assembly of the driver side airbag module of FIG. 25.

FIG. 33 is a perspective view showing the aspirator assembly shown in FIG. 32.

FIG. 34 is a front view of the aspirator assembly shown in FIG. 32.

FIG. 35 is a rear view of the aspirator assembly shown in FIG. 32.

FIG. 36 is a cross-sectional view taken along the line 36-36 of FIG. 34.

FIG. 37 is a cross-sectional view taken along the line 37-37 of FIG. 35.

FIG. 47 is an exploded view of the aspirator assembly shown in FIG. 32.

FIG. 48 shows basic geometric dimensions and critical point in slit design of the aspirator shown in FIG. 32.

FIG. 50 is a front view of the external nozzle passenger aspirator.

FIG. 51 is a cross section of the external nozzle passenger aspirator shown in FIG. 50.

FIG. 52 is an axonometric projection of assembled internal nozzle passenger aspirator.

FIGS. 53-55 show two variants of internal nozzle passenger aspirator design.

FIGS. 70 and 71 are drawings of cross sections of the passenger side aspirated inflator slit.

FIGS. 72 and 73 are an alternate design of the passenger aspirator with a circular internal body.

FIG. 85 is a top perspective view of a driver side airbag module mounted on a steering wheel in accordance with the invention.

FIG. 86 is a front view of the driver side airbag module shown in FIG. 85.

FIG. 87 is a cross-sectional view taken along the line 87-87 in FIG. 86.

FIG. 88 illustrates a location of a vent hole in a conventional airbag in its deployed condition.

FIG. 89 is a front view of the driver side airbag module shown in FIG. 85 without the deployment cover and airbag.

FIG. 90 is a cross-sectional view taken along the line 90-90 in FIG. 89.

FIG. 91 is a cross-sectional view taken along the line 91-91 in FIG. 89.

FIG. 92 is a front view of an aspirated inflator of the driver side airbag module shown in FIG. 85.

FIG. 93 is a perspective view partly broken away of the aspirated inflator of FIG. 92.

FIG. 94 is a cross-sectional view taken along the line 94-94 in FIG. 92.

FIG. 95 is a cross-sectional view taken along the line 95-95 in FIG. 92.

FIG. 96 is an exploded, perspective view of the aspirated inflator of FIG. 93 showing the aspirator parts.

FIG. 97 shows basic geometric dimensions and critical point in slit design FIG. 98 is a cross-sectional, partly exploded view of the aspirated inflator of FIG. 93 showing the aspirator parts.

FIGS. 99-101 show several views and cross sections of the airbag module of FIG. 25 with an airbag and deployment cover removed.

FIGS. 107-114 are detailed drawings of plastic aspirator slit parts.

FIGS. 122-128 illustrate plastic passenger aspirator design.

FIG. 144 shows airbag deployment wherein a reverse flow tube is fully open.

FIG. 145 shows the reverse flow tube which collapses when the airbag is inflated.

FIG. 146 is reverse flow tube (sleeve) cross section.

BEST MODE FOR CARRYING OUT INVENTION

Figure 1:
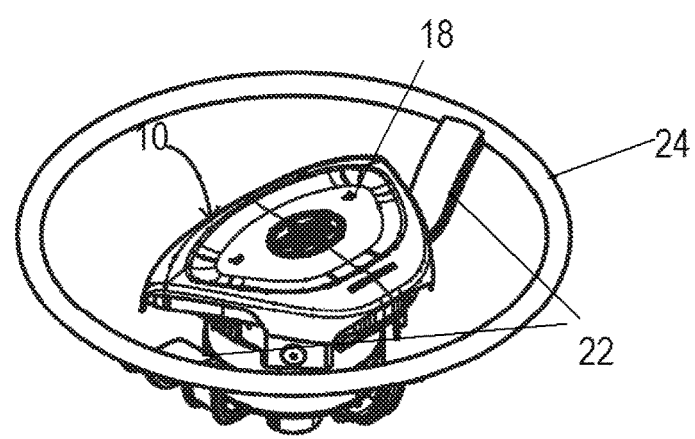
FIG. 1 is a perspective view of a driver side airbag module of the invention mounted on a steering wheel.

Referring to FIGS. 1-24, a top, perspective view of a driver side airbag module of the invention is illustrated generally at 10 in FIG. 1. Module 10 includes an aspirator apparatus, aspirator assembly or aspirator 12 having a housing 14, an aspirator reverse flow valve 16 situated at a bottom or bottom end region of the housing 14 so that the aspirator 12 is situated above the reverse flow valve 16, a module cover assembly 18 that covers an airbag 20 alongside a top end region (FIG. 2), a supporting connection structure 22 that supports the module 10 on a steering wheel 24 and an aspirator inlet part 26 that defines an inlet for air into the aspirator 12. Cover assembly 18 includes a housing that is connected to the aspirator 12 and houses the airbag 20.

Housing 14 has an outer surface with two generally cylindrical surface areas and an inner surface or wall with variable cross-section that defines a single flow passage 28 between opposite end regions. Aspirator inlet part 26 is also referred to as an inlet portion of the aspirator 12 and has a narrowing cross-section in a direction toward the top end region. Housing 14 is annular which means that it surrounds the passage 28, although it is not necessary tubular, circular in cross-section or cylindrical. As shown, the housing 14 has two cylindrical parts, with different diameters.

Air from the ambient atmosphere (e.g., the vehicle passenger compartment) is designed to flow through the reverse flow valve 16 during use into and through the passage 28 defined in part by the aspirator inlet part 26 to mix with inflation gas (to cause aspiration) with the mixed gas and air then flowing through a remaining part of the passage 28 into the airbag 20 whose interior is in flow communication with the passage 28, i.e., defined by the inner wall of the housing 14.

Figure 3:
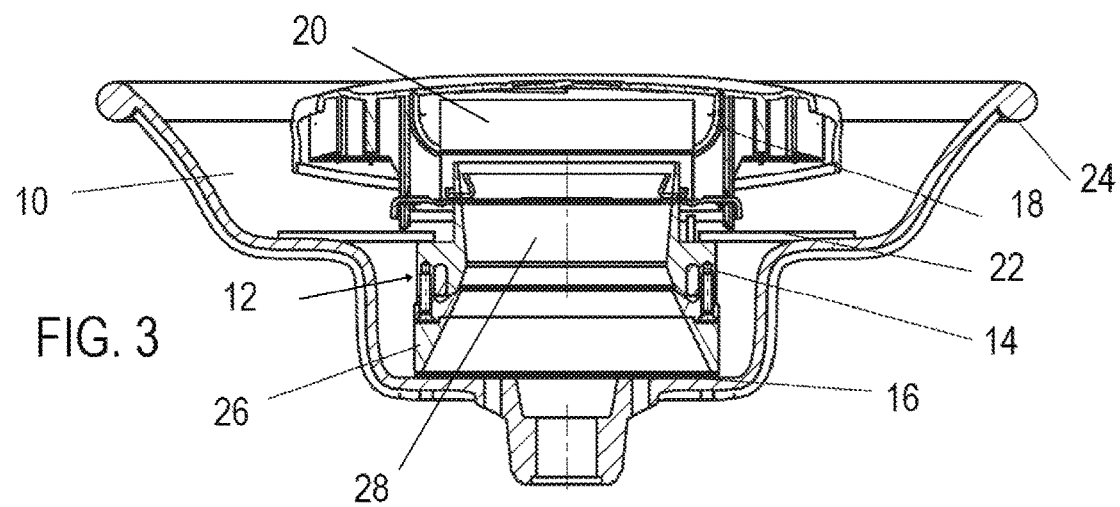
FIG. 3 is a cross-sectional view of the module taken along line 3-3 in FIG. 2.
Figure 2:
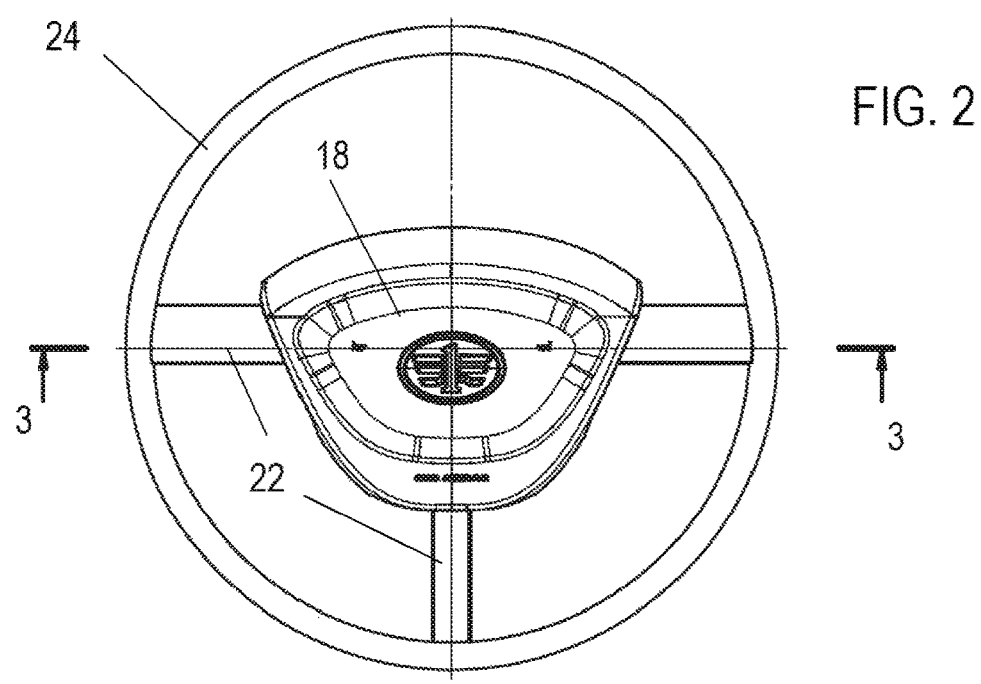
FIG. 2 is a top view of the module shown in FIG. 1.

Some elements of the module 10 and aspirator 12 are not designated in FIGS. 1-3, e.g., a toroidal gas generator assembly, but are present and described in other drawings.

FIGS. 4-8 illustrate more details of the module 10 without some structure, e.g., the cover 18 and the airbag 20. Module 10, when combined with the airbag 20 and steering wheel 24, is referred to as an airbag and steering wheel assembly 30. Module 10 also includes a gas generator assembly 32, electrodes 34, an aspirator diffuser 36, aspirator screws 38 and metal connections 40. Gas generator assembly 32 may be a toroidal gas generator assembly.

Aspirator 12 includes the aspirator diffuser 36 that has an inner surface or wall that tapers inward, has a uniform cylindrical section and then expands outward (and is also referred to as an aspiration portion of the aspirator 12). Screws 38 connect the aspirator diffuser 36 to the inlet portion 26. Inlet portion 26 has a narrowing cross-section in a direction toward the top end region. Air from the ambient atmosphere (e.g., the vehicle passenger compartment) is designed to flow through the reverse flow valve 16 during use into and through the inlet portion 26 to the area defined by the aspirator diffuser 36.

Aspirator 12 uses the Prandtl-Meyer effect. Previous aspirators typically utilize the Coanda effect and suffer from significant limitations which are overcome by the invention. Nozzles designed to utilize the Prandtl-Meyer effect do not suffer from a source pressure limitation. By using higher pressures, the combined flow into the airbag 20 can be at much higher pressures providing significantly more pressure for opening the cover 18 and initially deploying the airbag 20. This also provides more design latitude for the pressure into the airbag 20. For example, using the Coanda effect, airbag pressures even as high as 3 psi are difficult to achieve whereas with the Prandtl-Meyer effect pressures exceeding 6 psi are readily achievable.

Operation of the module 10 to inflate the airbag 20 is as follows. Gas generator assembly 32 begins generating gas after receiving a signal from an airbag sensor and diagnostic module (not shown) through the electrodes 34 (collectively referred to as an activation system) which are connected to the gas generator assembly 32. Gas generator assembly 32 then begins to cause injection of inflating gas through a circumferential slit 42, see FIG. 9. Toroidal gas generator assembly 32 may be a gas generator that causes flow of gas from all locations around the passage 28, like an annular curtain of generated gas. Thus, gas is output from the slit 43 at all locations circumferentially around the passage 28 at substantially the same time.

Slit 42 is defined between the inlet portion 26 and the aspirator diffuser 36 which are constructed to define this slit 42 when connected together by screws 38. Due to the Prandtl-Meyer flow effect, the jet outflow from slit 42 attaches to the wall of the aspirator diffuser 36 (the inner surface) and spreads across the passage 28. The high velocity jet creates a low pressure area after the slit 42 in the passage 28. Simultaneously, the reverse flow valve 16 is opened by the ambient aspirated gas flow (in view of a pressure differential between the opposite sides of the reverse flow valve 16). The reverse flow valve 16 includes flaps 44 that are initially closed, closing off the main channel and are opened due to the pressure drop behind the slit 42 when gas begins to flow from the gas generator assembly 32. Thus, ambient air will be sucked inside aspirator 12 through at least one inlet port defined by the reverse flow valve 16.

Aspirator 12 includes two parts, the aspirator diffuser 36 and inlet portion 26 with the reverse flow valve 16 (which may be a membrane having flaps 44 as shown in FIG. 8). Inlet portion 26 is contoured to mesh with the aspirator inlet channel. The reverse flow valve 16 allows aspirated ambient to flow only in one direction, i.e., to fill the airbag 20. After the airbag 20 is filled and the pressure in the airbag 20 reaches a design value, such as 3 psi, the flow into the airbag 20 stops and the reverse flow valve 16 closes. This airbag pressure will return flaps 44 to their initial position. As the occupant compresses the airbag 20 during a crash, gas from the airbag 20 flows out through an orifice 46 in a center of the reverse flow valve 16. The cross section of this orifice 46 may be equivalent in area to the vent holes normally present in a driver airbag.

The reverse flow valve 16 is preferably constructed of a pliable material such as, but not limited to, a plastic film or fabric. One or more flaps 44 are formed by, for example, cutting the material, such as to form four flaps 44 as shown in FIG. 8. Similarly, the orifice 46 is formed by cutting the material in the center, and also possibly causing a thinner region to be present in the center.

Initially, the reverse flow valve 16 remains closed for a short period until sufficient pressure is attained to open the cover 18. Then, the reverse flow valve 16 opens allowing gas to be drawn into the passage 28 providing the gas flow needed to inflate the airbag 20. When the flow reaches a sufficient pressure, the cover 18 opens and the airbag 20 starts to deploy. The airbag 20 in a folded initial state is connected to the surface of aspirator diffuser 36. The reverse flow valve 16 returns to its initial position and holds the gas inside the airbag 20 after airbag 20 is filled and the gas generator assembly 32 has run out of propellant.

When the reverse flow valve 16 is closed at the start of gas generation, gas can flow out through the orifice 46 if the cover 18 fails to open. This can occur when the occupant is out of position pressing on the cover 18. In this case, the airbag 20 will not deploy, protecting the occupant from injury. After the reverse flow valve 16 closes when the airbag 20 is inflated, the orifice 46 provides the proper flow resistance to control the motion of the occupant during the crash. The orifice 46 thus replaces the one or more holes normally in the airbag.

Figure 11:
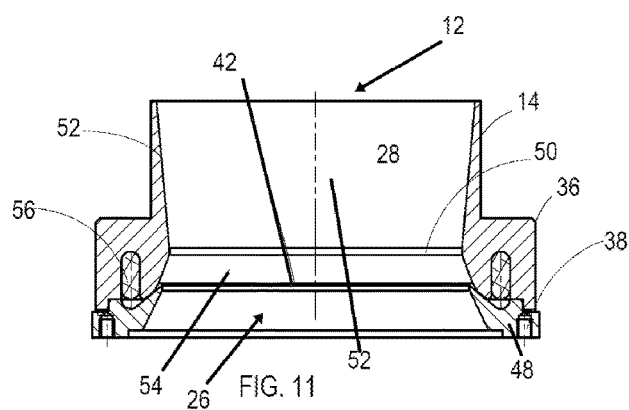
FIG. 11 is a cross-sectional view of the aspirator shown in FIG. 9.
Figure 10:
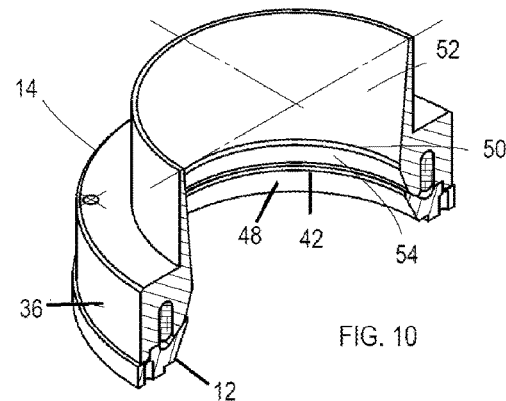
FIG. 10 is a perspective, cross-section view of the aspirator shown in FIG. 9.
Figure 9:
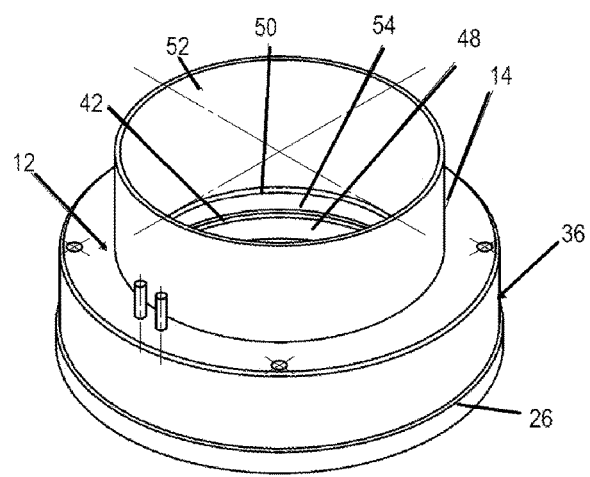
FIG. 9 is a perspective view of an aspirator of the module shown in FIGS. 1 and 4.
Figure 12:
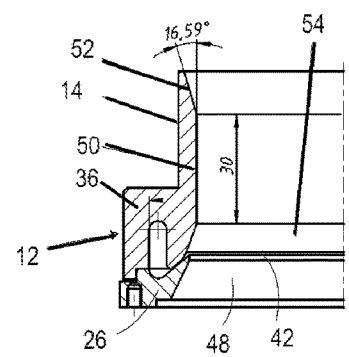
FIG. 12 is a partial cross-sectional view of the aspirator shown in FIG. 9.

Referring now to FIGS. 9-12, the internal aspirator contour can be divided into at least three sections, the inlet section 48 defined by the inlet portion 26, the cylindrical section 50 defined by the aspirator diffuser 36 and the diffuser section 54 also defined by the aspirator diffuser 36 (FIG. 11).

Aspirator diffuser 36 thus includes the cylindrical section 50 and the diffuser section 52. The wall of the inlet section 48 can have a curved or straight contour. As shown, it is straight since this part is connected to the inlet portion 24 containing the reverse flow valve 16. The length of cylindrical section 50 is defined by the jet gas dynamics parameters determined by, for example, simulation modeling. It also depends on angles and properties of the gas generator assembly 32. The diffuser section 52 can have different diffuser angles and may have a different length at end portion as it can be seen in FIG. 12. Another wall section 54 is alongside the slit 42 and may include two circumferential sections having a bending point therebetween.

The slit 42 and the shape of the inner wall defining the passage beyond the slit 42, i.e., the contour of the slit-adjoining, cylindrical and diffuser sections 50, 52 of the aspirator diffuser 36, are designed to obtain the Prandtl-Meyer effect. The slit contour is formed by the two parts of the aspirator 12 (inlet portion 26 and aspirator diffuser 36) when they are connected by screws 38 as shown in FIG. 11.

Figure 18:
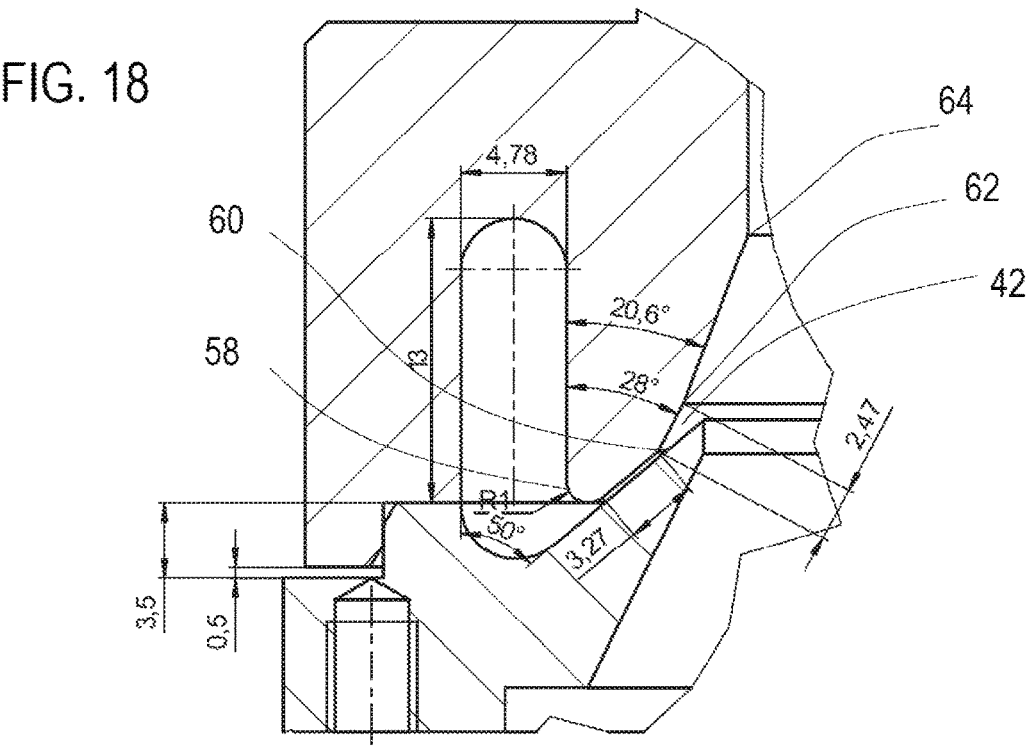
FIG. 18 is an enlarged view of the aspirator portion around the Prandtl-Meyer slit in the module shown in FIGS. 1 and 4.

Toroidal gas generator assembly 32 is housed in a toroidal chamber 56 which has a smooth contour 58 with no sharp edges as can be seen in FIG. 18. The basic slit parameters are width of the slit 42, two obtuse angles 60, 62 and the position of a sharp edge 64 relative to the second angle 62 (see FIG. 17). The combined angles determine the jet direction, spreading and position. The design of the angles 60, 62 is to keep jet attached to the aspirator wall section 54 (the inner surfaces of aspirator diffuser 36) when it flows out of the slit 42. The attached jet can be achieved by using only one angle, but in that case, the jet will separate from the wall at low pressure which does not happen in the slit design with two angles.

FIGS. 13-16 show an embodiment including discrete, separated nozzles 66 in place of the single circumferential slit 42. The number, size and location of these nozzles 66 around the circumference of the inner wall defining the passage 28 in the housing 14 can be determined using, for example, computational fluid dynamics modeling. Other factors to consider when determining parameters of the nozzles 66 are known to those skilled in the art to which this invention pertains. Nozzles 66 have the advantage that it is easier to manufacture accurate holes (each of which constitutes one nozzle) than to maintain an accurate slit around the circumference. Otherwise, the operation of an aspiration module for an airbag including nozzles 66 is essentially the same as one including slit 42. The toroidal gas generator assembly 32 may not be used when nozzles are used and a different gas generator arrangement used, e.g., a plurality of gas generators, one for each nozzle 66.

There are some marked differences between shock waves and expansion fans. Across a shock wave, the Mach number decreases, the static pressure increases, and there is a loss of total pressure because the process is irreversible. Through an expansion fan, the Mach number increases, the static pressure decreases and the total pressure remains constant. Expansion fans are isentropic.

Numerical Modeling Procedure

Numerical modeling is performed using PCs with, for example, Intel Core i5 and i7 CPU, 8 Gb and 32 Gb RAM. First, a calculation domain is created and meshed. The number of calculation nodes is preferably more than 200,000. The calculation domain comprises the aspirator itself and "boxes" at the ambient inlet and outlet of the aspirator to simulate some portion of open space in front of the aspirator and an airbag\open space where the mixture of the high-pressure and ambient air flows. Density of the calculation cells is increased ideally near the walls, near the slit, at angular points and in the aspirator inlet domain. Initial conditions for numerical modeling are zero velocity at normal pressure and temperature inside the "boxes" area.

Currently, the calculation domain does not include a precise shape of the pre-chamber in front of the slit. Then, boundary conditions are applied at the calculation domain boundaries (as examples): high pressure and temperature are specified on the high-pressure inlet (slit), ambient pressure at the ambient inlet, ambient pressure or wall at the outlet from the "box" (that models an open space or airbag, depending on a particular run aim).

Numerical modeling is done using, for example, CFD software such as FLUENT in the two regimes, steady or unsteady. The steady regime is used to try many variations of particular parameters (geometrical and physical, like pressure and temperature values) and obtain preliminary estimations of integral parameters (flow rates and aspiration ratio) of those variations for a reasonable time.

In a stationary regime, calculation takes from several hours to almost a day depending on reaching the stationary or near-stationary regime with small variations in iterations. Physically the flow is unsteady so a complete stable regime may not occur at all.

For variants with acceptable parameters, the unsteady regime is modeled to validate the results of the steady-regime modeling and evaluate the time for reaching the steady-state parameters. Such runs take a much longer computer time (several days).

Post-processing includes creation of flow patterns and plots of parameters, analysis of the obtained results.

Standard Equations that are used are (as examples): the Navier-Stokes equations in the Reynolds approximation for a compressible medium (air is considered as ideal gas), the energy equation, and the Spalart-Allmaras turbulence model.

1. Ambient inlet and outlet geometry building
2. Aspirator slit geometry building
3. Meshing calculation area
4. Cells amount distribution
5. Initial condition set $V_0$, $P_0$, $T_0$
6. Boundary conditions set
7. Start simulation Supersonic gas flow with a continuous increasing velocity (or Prandtl-Meyer flow)

To optimize use of the aspirator 10, the gas generator assembly 32 is designed to cause supersonic flow of gas when exiting the slit 42 (or nozzles 66). A subsonic flow of gas out of the slit 42 is unlikely to provide the desired aspiration. For example, the gas generator assembly 32 may be configured to generate and output gas at a pressure of at least 100 psi, or at least 150 psi (10 atmospheres or 10 bar), or up to about 100 bars (1500 psi). The design of the gas generator assembly 32, slit 42 and wall structure therebetween also affects the pressure of the gas at the outlet of the 42, so it is possible to design these components to provide for the supersonic flow at the outlet of the slit 42. One skilled in the art would understand how to achieve this in view of the disclosure herein.

Consider the simplest form of supersonic gas flow: translation uniform flow. In this flow, all gas particles move along parallel paths with constant velocity. The trajectories of the particles are simultaneously the streamlines, impermeable for gas.

If the stream does not meet any obstacles in the form of solid particles or boundaries (walls), the gas does not encounter any disturbances. The simplest boundary which might change the character of uniform translational gas flow is straight solid wall 68 in FIG. 19.

When the wall 68 is arranged parallel to the flow direction, i.e., it coincides with one of the streamlines, and if the moving gas occupies all endless space above wall 68 and the wall 68 itself is also infinite in length, it is clear that in this case the wall 68 does not have any impact on the gas flow (the influence of viscosity can be neglected). It should be noted that this statement is valid in the general case for curve streamlines, if the wall 68 coincides with the streamline, it will not affect the flowing gas.

If at some wall point 70 in FIG. 20, there is an obstacle, it will cause a weak perturbation of the uniform flow. Such a disturbance would spread in a uniform supersonic flow in a straight-line characteristic (pressure or density) parameter. This component combined with velocity direction makes an angle $\alpha_0$, determined from the condition $$\sin \alpha_0 = 1/M$$

where M is the Mach number. This angle $\alpha_0$ is called the weak disturbances propagation angle.

Figure 17:
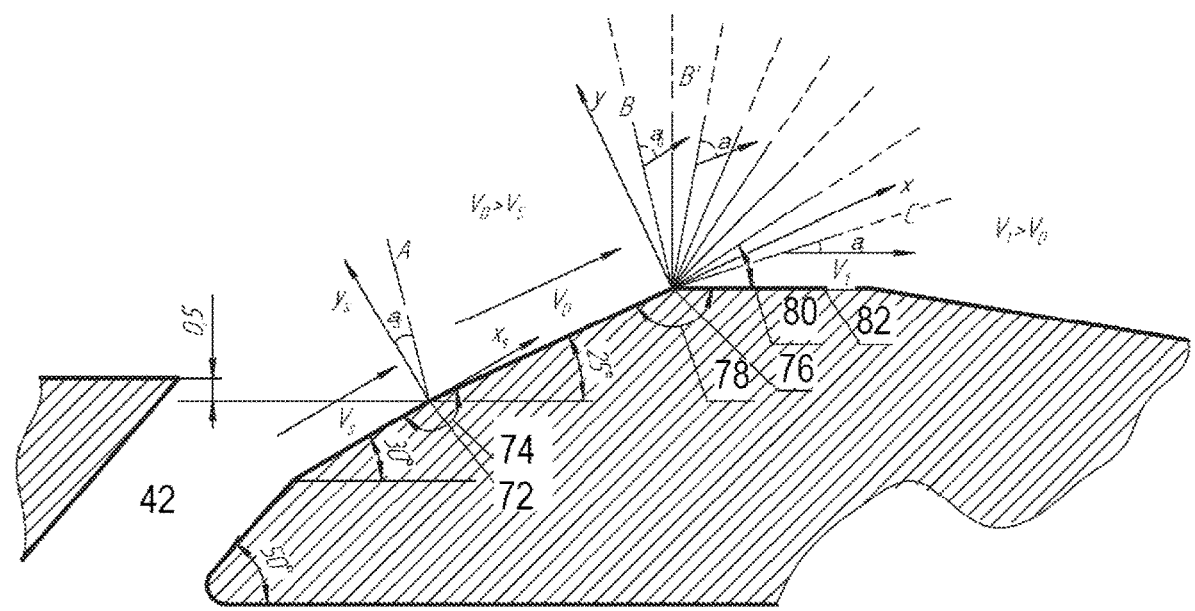
FIG. 17 is an enlarged view of the Prandtl-Meyer slit in the module shown in FIGS. 1 and 4.

FIGS. 17 and 18 are detailed views of the slit 42 designed according to the teachings of Prandtl-Meyer where dimensional information is in millimeters. A source gas, at supersonic velocities, flows out of the slit 42 marked as Vs in FIG. 17. Upon emerging from the slit 42, the gas jet flows past a first bending point 72 defined on the inner wall of aspirator diffuser 36 (on the slit-adjoining wall section 54) at an angle of about 30° which is situated at the beginning of the $y_s$ and $x_s$ axes. At this obtuse bending angle 74, the jet deviates by an angle $\alpha_s$. The gas expands when the supersonic jet flows around the obtuse angle 74, since the area occupied by the gas increases, at this expansion the gas is accelerated as taught by Prandtl-Meyer. This expansion fan is an infinite set of expansion waves, each flowing isentropically and rotated by a small angle. The expansion fan begins at plane $y_s$ and finishes at plane A. Vector $V_s$ becomes $V_0(V_s<V_0)$ after passing plane A, the gas velocity along the wall becomes constant again. The slit-adjoining wall section 54 has a straight part between its start near the expansion point of the slit 42 and bending point 72, and another straight part between bending points 72 and 76. The straight walls extend around the circumference of the housing 14 of the aspirator 12.

Bending point 76 defined on the inner wall of aspirator diffuser 36 (between slit-adjoining wall section 54 and cylindrical wall section 50) is an obstacle which is the source of weak disturbances in the gas stream. These disturbances propagate in a uniform flow by a straight line, line B, which separates the undisturbed gas stream from perturbed gas stream. The second expansion fan (bending point 76) relates to axes x and y. This means that the disturbance in the gas properties which arose as a result of the flow over angle 78, will be constant at the next line in B' which is also rectilinear. It means that all separated determined characteristics coming out from bending point 76 are rectilinear. Thus, the flow turns to a new direction and is carried out within the angle B-B' (80) between two rectilinear characteristics. For greater clarity, the continuous gas expansion area can be divided to a larger number of domains with small but continuously changing parameters.

The first shock of velocity and pressure occurs in the plane which is followed by plane B. Since the pressure is decreasing and, according to the theory of shocks, the normal velocity component related to plane B increases. Also, the flow slightly changes its direction, deviating from the shock plane because of the immutability of the tangential velocity component.

The jet increases its velocity after passing shock plane B. The pressure, density and temperature of the gas have slightly decreased. The disturbance that spreads from the area of lower pressure, which this time should be limited by new plane B', is due to the jet deflection and increasing Mach number and is located to the right of the plane B.

The second shock combines with plane B' and causes a new jet deviation towards the $V_1$ vector direction and the gas expansion which occurs simultaneously with increasing velocity. The gas velocity $V_1$ assumes a constant value greater than $V_0$ (before bending point 76), i.e., along wall 82. Wall 82 is the inner wall or surface of the cylindrical section 50 of the aspirator diffuser 36.

The flow turning will end if the jet near to the wall will be parallel to the aspirator cylindrical wall part of section 50. Thus, near the wall, the velocity vector is parallel to the cylindrical wall part.

As is known, separate adiabatic expansion shocks are not possible. However, separating angle 78 into an infinite numbers of infinitely small angles, will lead, based on the theory discussed herein (with weak shocks), to the continuous gas expansion fan; instead of a finite number of weak shocks, an infinite number of characteristics will be obtained, i.e., the Prandtl-Meyer expansion fan.

Thus, the flow deviation near an obtuse angle 78 with the associated gas expansion (pressure reduction) can be described as a series of weak disturbances, the source of which is the sharp edge of the angle 78.

Validation of operability of the basic scheme of a supersonic impulse inflator with various nozzles and their locations in the inflator mixing chamber is based on the ability of supersonic flow to deviate at a corner by an angle, determined by the Prandtl-Meyer function.

The Prandtl-Meyer function, as an element of an impulse ejector design, allows the connection of the supersonic flow parameters with the geometry of a nozzle-mixing chamber junction.

For a plane steady flow, the angle of deviation of the velocity vector of supersonic flow, θ, at a corner is determined by the Prandtl-Meyer function depended on Mach number:

$$\vartheta(M) = \sqrt{\frac{\gamma+1}{\gamma-1}} \, arctg\left(\sqrt{\frac{\gamma-1}{\gamma+1}} \sqrt{M^2-1}\right) - arctg\sqrt{M^2-1}, \text{ and}$$

$$\theta = \vartheta(M_1) - \vartheta(M_0).$$

In the appearing expansion fan, the thermodynamic parameters of the medium are described by the following:

$$\frac{\rho_1}{\rho_0} = \left(\frac{1+\frac{\gamma-1}{2}M_0^2}{1+\frac{\gamma-1}{2}M_1^2}\right)^{\frac{1}{\gamma-1}}, \quad \frac{P_1}{P_0} = \left(\frac{1+\frac{\gamma-1}{2}M_0^2}{1+\frac{\gamma-1}{2}M_1^2}\right)^{\frac{\gamma}{\gamma-1}},$$

$$\frac{T_1}{T_0} = \frac{1+\frac{\gamma-1}{2}M_0^2}{1+\frac{\gamma-1}{2}M_1^2}$$

The expansion fan angle is equal to $$\theta_1 = \psi - \pi - (\alpha_1 - \alpha_0) = \psi - \pi - \arcsin\left(\frac{1}{M_1}\right) + \arcsin\left(\frac{1}{M_0}\right).$$

$$\psi_{max} = \frac{\pi}{2}\left(\sqrt{\frac{\gamma+1}{\gamma-1}} - 1\right),$$

γ is specific heat ratio.

The Prandtl-Meyer function describes the thermodynamic parameters of supersonic flow in a plane flow of an ideal polytrophic gas when there is no influence of another wall of the mixing chamber.

When a nozzle is located in the outer wall of an axisymmetric inflator, the plane expansion wave is affected by converging characteristic lines in the direction of the symmetry axis of the inflator that attenuates under-pressure. When a nozzle is located at an internal body, the diverging characteristic lines increase under-pressure.

Note that the flow in an impulse inflator is unsteady.

Therefore, the evaluations based on the Prandtl-Meyer function is an initial approximation which explains the physical processes in an inflator and gives a direction of further development of an inflator design. Although such an aspiration system can be developed by trial and error experiments, the process can be long and tedious so use on computational fluid dynamics mathematical modeling is recommended.

For optimization of an inflator design taking account of the properties of the real flow inside the inflator (viscosity, turbulence) the following system of equations is solved:

$$\frac{\partial A}{\partial t} + \sum_{i=1}^{3} \frac{\partial}{\partial \eta_i}(F_i - S_i) = H$$

$$A = \begin{bmatrix} \rho \\ \rho X_k \\ \rho V_x \\ \rho V_y \\ \rho V_z \\ \rho E \end{bmatrix}, F_1 = \begin{bmatrix} \rho V_x \\ \rho V_x X_k \\ \rho V_x^2 \\ \rho V_y \\ \rho V_z \\ \rho E \end{bmatrix}, F_2 = \begin{bmatrix} \rho V_y \\ \rho V_y X_k \\ \rho V_x V_y \\ \rho V_y^2 + p \\ \rho V_y V_z \\ (\rho E + p)V_y \end{bmatrix},$$

$$F_3 = \begin{bmatrix} \rho V_z \\ \rho V_z X_k \\ \rho u V_x V_z \\ \rho V_y V_z \\ \rho V_z^2 + p \\ (\rho E + p)V_z \end{bmatrix},$$

$$S_1 = \begin{bmatrix} 0 \\ -J_{kx} \\ \tau_{xx} \\ \tau_{xy} \\ \tau_{xz} \\ \beta_x \end{bmatrix}, S_2 = \begin{bmatrix} 0 \\ -J_{ky} \\ \tau_{xy} \\ \tau_{yy} \\ \tau_{zy} \\ \beta_y \end{bmatrix}, S_3 = \begin{bmatrix} 0 \\ -J_{kz} \\ \tau_{zx} \\ \tau_{zy} \\ \tau_{zz} \\ \beta_z \end{bmatrix}, H = \begin{bmatrix} 0 \\ W_k \\ \rho f_x \\ \rho f_y \\ \rho f_z \\ W_e \end{bmatrix},$$

$$E = \left[e + \frac{1}{2}(V_x^2 + V_y^2 + V_z^2)\right], \tau_{xx} = \mu\left(2\frac{\partial V_x}{\partial x} - \frac{2}{3}div V\right),$$

$$\tau_{yy} = \mu\left(2\frac{\partial V_y}{\partial y} - \frac{2}{3}div V\right), \tau_{zz} = \mu\left(2\frac{\partial V_z}{\partial z} - \frac{2}{3}div V\right),$$

$$\tau_{xy} = \tau_{yx} = \mu\left(\frac{\partial V_x}{\partial y} + \frac{\partial V_y}{\partial x}\right), \tau_{xz} = \tau_{zx} = \mu\left(\frac{\partial V_x}{\partial z} + \frac{\partial V_z}{\partial x}\right),$$

-continued $$\tau_{yz} = \tau_{zy} = \mu\left(\frac{\partial V_y}{\partial z} + \frac{\partial V_z}{\partial y}\right),$$

$$\beta_x = V_x\tau_{xx} + V_y\tau_{xy} + V_z\tau_{xz} + \left(\lambda\frac{\partial T}{\partial x} - \sum i_k J_{kx}\right),$$

$$\beta_y = V_x\tau_{xy} + V_y\tau_{yy} + V_z\tau_{yz} + \left(\lambda\frac{\partial T}{\partial y} - \sum i_k J_{ky}\right),$$

$$\beta_z = V_x\tau_{xz} + V_y\tau_{yz} + V_z\tau_{zz} + \left(\lambda\frac{\partial T}{\partial z} - \sum i_k J_{kz}\right),$$

$$W_e = V_x + V_y f_y + V_z f_z$$

FIG. 19 shows calculated velocity vectors at the characteristic lines derived from the Prandtl-Meyer function. Position 84 represents bending angle which is the cause of disturbance occurrence in supersonic flow.

FIGS. 21-24 present calculation results along characteristic lines (solid lines correspond to the characteristic line at angle $\alpha_0$ 86 in FIG. 19 and dashed lines correspond to vectors values along line at $\alpha_1$ 88 in FIG. 19). These plots show that in the area close to the inflator wall, the Prandtl-Meyer function closely describes the thermodynamic parameters of supersonic flow over the junction of the nozzle and mixing chamber. Outside of this narrow area, such simplified formulation is not acceptable and it is the numerical modeling that allows fitting the flow parameters inside the mixing chamber with the outer conditions. FIGS. 21-24 represent calculated parameter values (pressure, density, velocity and Mach number) along the characteristics $\alpha_0$ and $\alpha_1$. Axis X corresponds to line 86 or line 88 in FIG. 19, while axis Y in corresponds to vector values along line 86 and line 88.

In Prandtl-Meyer flow, these parameters do not change along the radial lines; they change at a transition from one line to another. The solid lines correspond to the properties at angle $\alpha_0$ and the dashed lines correspond to the properties at $\alpha_1$.

Calculations show that at the transition from property0 to property1, the properties change with the reducing pressure and increasing Mach number, but these properties do not remain constant along the lines. This is based on the principles of Prandtl-Meyer flow.

Figure 21:
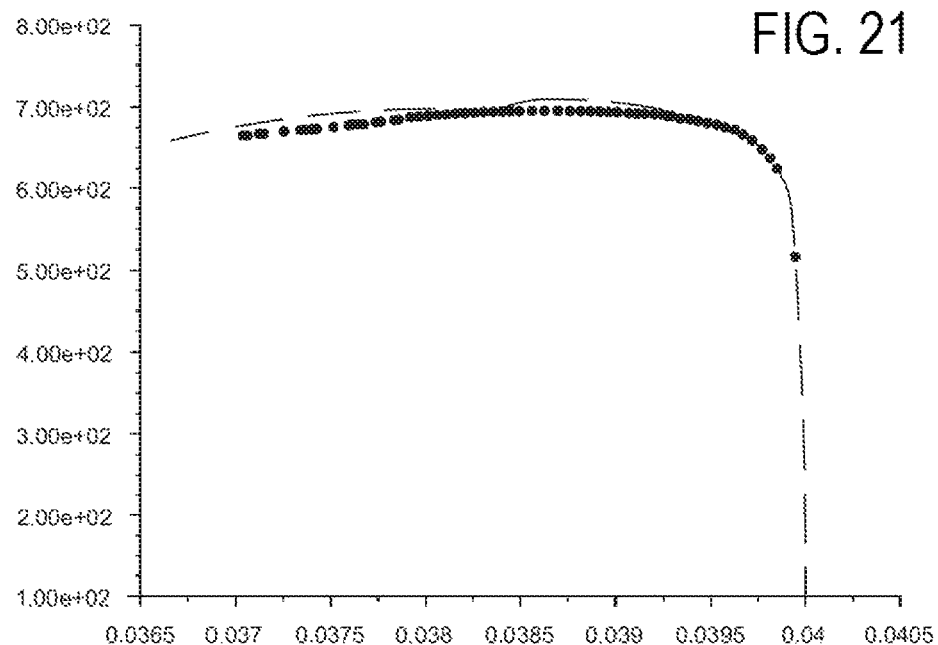
FIG. 21 is a plot of the fluid velocity across the output of the aspirator.

FIG. 21 illustrates the velocity variation at along lines B and B' which starts at bending point 76 based on the Prandtl-Meyer function. The magnitude of the velocity (m/s) is the vertical axis and the position (m) is the horizontal axis. The solid line is the characteristic line at angle a0, and the dotted line is the characteristic line at angle a1.

Figure 22:
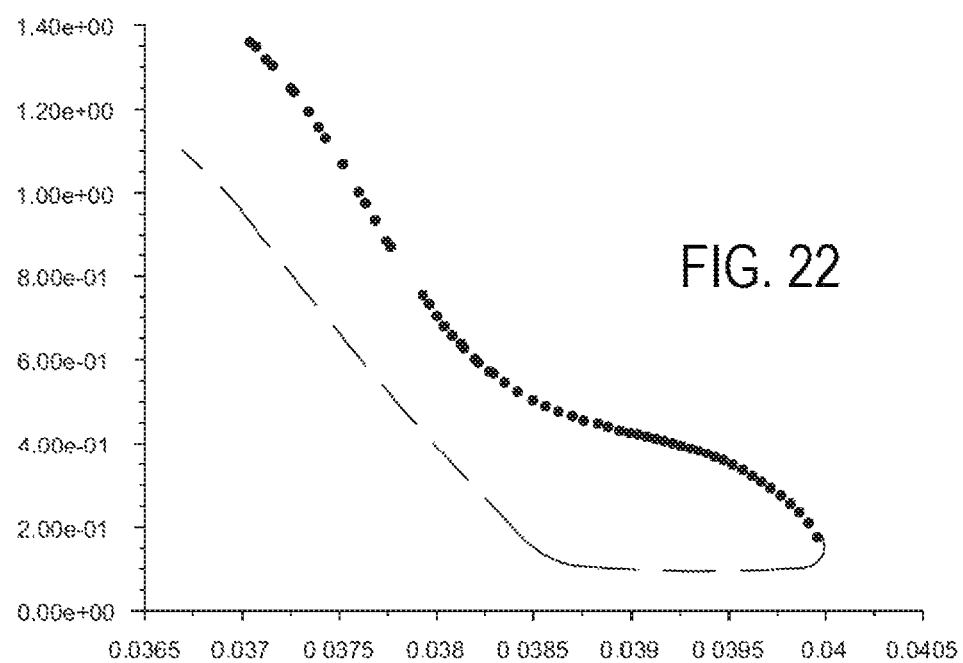
FIG. 22 is a plot of the fluid density across the output of the aspirator.

FIG. 22 illustrates the density variation at along lines B and B' which starts at bending point 76 based on the Prandtl-Meyer function. Density (kg/m³) is the vertical axis and the position (m) is the horizontal axis. The solid line is the characteristic line at angle a0, and the dotted line is the characteristic line at angle a1.

Figure 23:
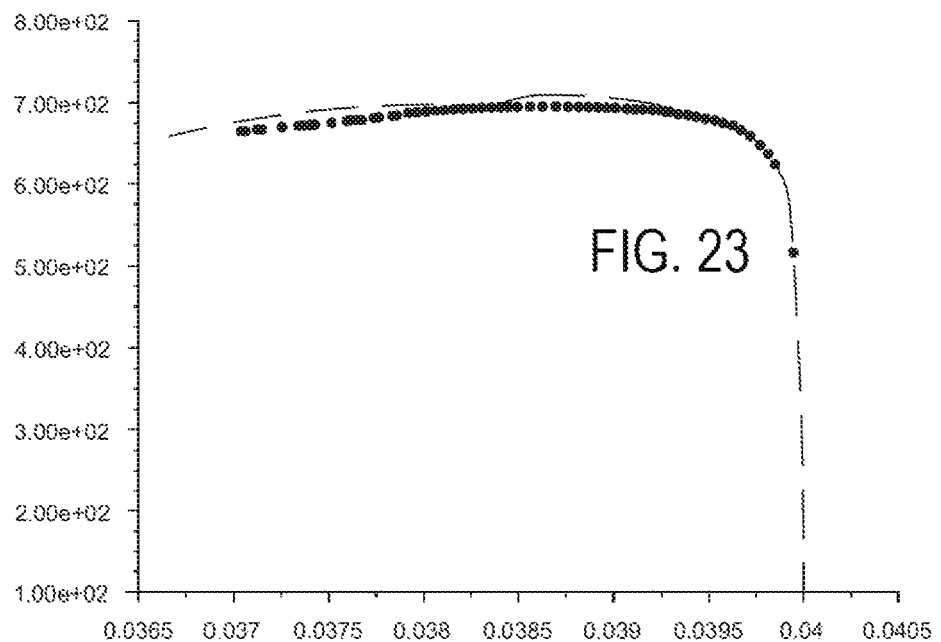
FIG. 23 is a plot of the fluid static pressure across the output of the aspirator.

FIG. 23 illustrates the static pressure variation at along lines B and B' which starts at bending point 76 based on the Prandtl-Meyer function. Static pressure (atm) is the vertical axis and the position (m) is the horizontal axis. The solid line is the characteristic line at angle a0, and the dotted line is the characteristic line at angle a1.

Figure 24:
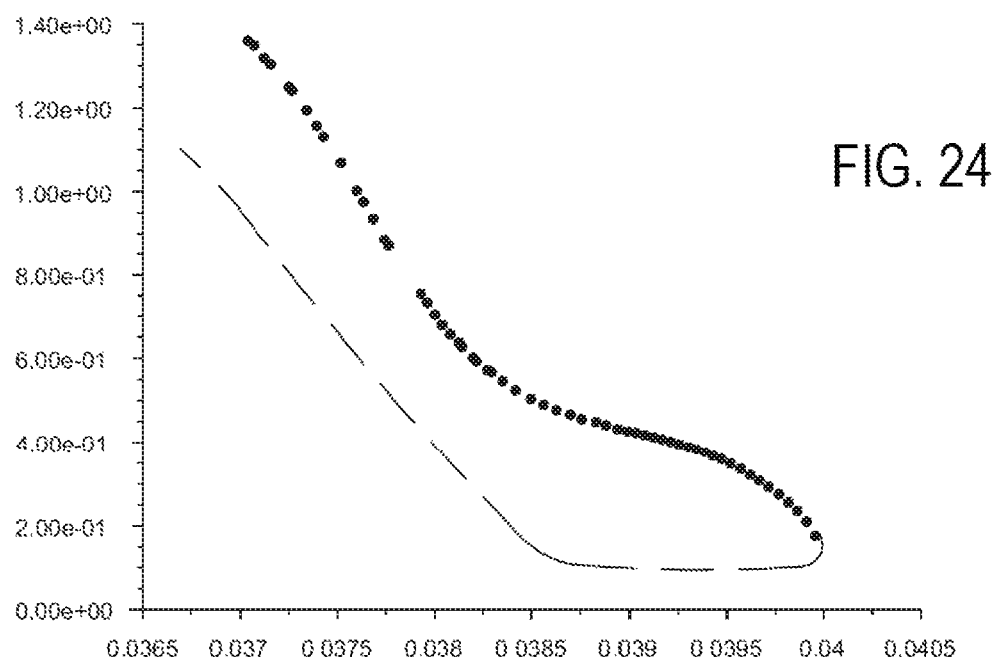
FIG. 24 is a plot of the fluid Mach number across the output of the aspirator.
Figure 38:
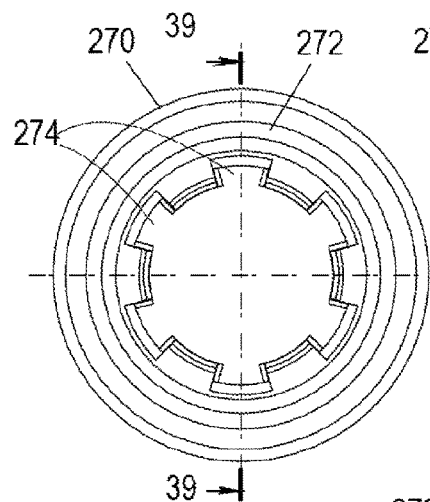
FIG. 38 is a front view of an assembly of disks in the aspirator assembly of FIG. 33.
Figure 39:
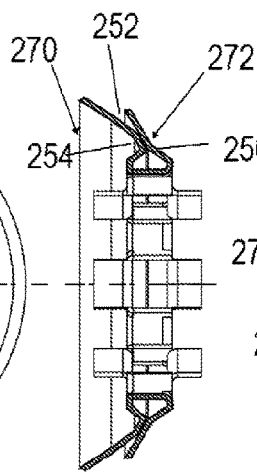
FIG. 39 is a cross-sectional view taken along the line 39-39 of FIG. 38.
Figure 40:
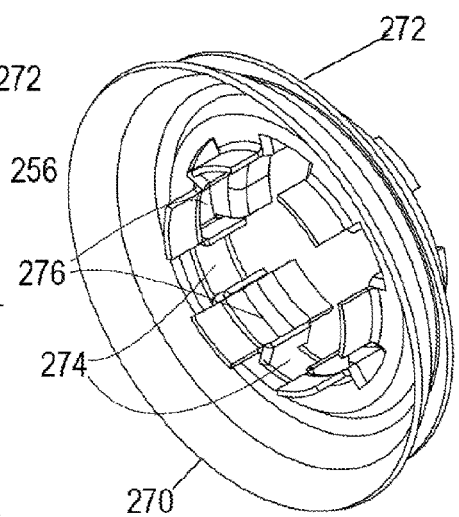
FIG. 40 is a rear perspective view of the assembly of disks shown in FIG. 38.
Figures 41, 42, 43:
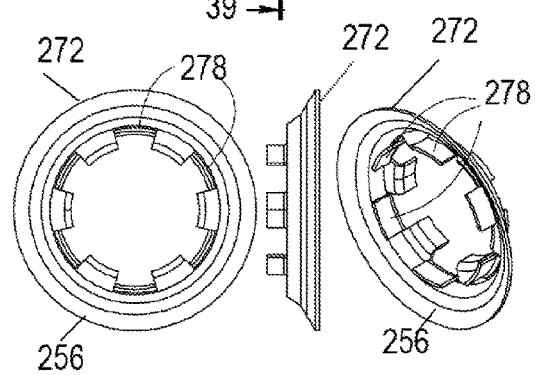
FIG. 41 is a front view of one of the disks in the assembly of disks shown in FIG. 38.
FIG. 42 is a side view of the disk shown in FIG. 41.
FIG. 43 is a rear perspective view of the disk shown in FIG. 41.
Figures 44, 45, 46:
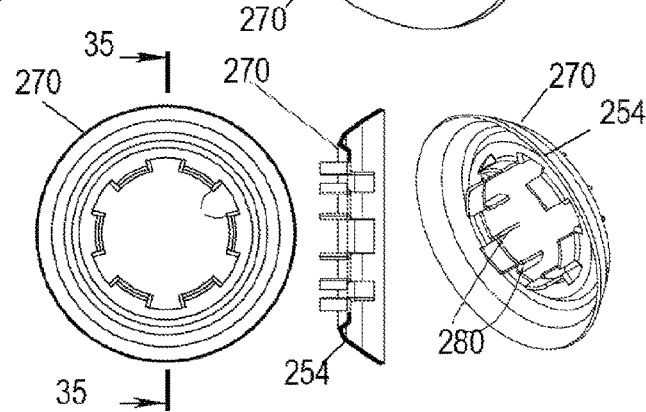
FIG. 44 is a front view of the other of the disks in the assembly of disks shown in FIG. 38.
FIG. 45 is a cross-sectional view taken along the line 45-45 of FIG. 44.
FIG. 46 is a rear perspective view of the disk shown in FIG. 44.

FIG. 24 illustrates the Mach number variation at along lines B and B' which starts at bending point 76 based on the Prandtl-Meyer function. Mach number is the vertical axis and the position (m) is the horizontal axis. The solid line is the characteristic line at angle a0, and the dotted line is the characteristic line at angle a1.

With structure described herein in any one or more of the various configurations, principle objects of this invention are obtained, including, but not limited to:
1. Providing an airbag system which stops inflating upon contact with the driver thereby substantially reducing occupant injuries due to airbag inflation.
2. Providing a very low cost airbag system through the elimination of most of the propellant thereby substantially reducing the size and cost and improving the safety of the gas generator.
3. Providing a very low cost airbag system through the elimination of the need for satellite crash sensors.
4. Sufficiently diluting the products of combustion from the gas generators through aspiration creating a breathable environment after deployment when the propellant combustion products contain pollutants, such as carbon dioxide.
5. Eliminating the need for occupant sensors through friendly non-injuring aspirated inflated airbags.

Referring to FIGS. 25-49, a driver side airbag module 210 is mounted (with an airbag and a deployment cover removed) is mounted on a generally circular steering wheel 212. The combination of the airbag module 210 and the steering wheel 212 is a steering wheel assembly 214.

Module 210 includes an aspirated airbag inflator, aspirator apparatus or aspirator 216 having a substantially cylindrical housing 218, an aspirator reverse flow valve 220 situated at a bottom or bottom end region of the housing 218 so that the housing 218 is situated above the reverse flow valve 220 relative to a gas flow outlet, an airbag 222, a module cover assembly 224 that includes an airbag deployment cover that covers the airbag 222 alongside a top end region, and an aspiration inlet part 226 that supports the module 210 on a steering wheel support structure 228 and defines an inlet for air into the housing 218. Steering wheel support structure 228 supports the module 210 on a steering column support 230. Cover assembly 224 includes a housing that is connected to the housing 218 and houses the airbag 222.

Housing 218 has an outer, generally cylindrical surface and an inner surface or wall with variable cross-section that defines a single flow passage 232 between opposite end regions. The aspirator inlet part 226 is also referred to as an inlet portion of the aspirator 216. The aspiration inlet part 226 and reverse flow valve 220 cooperate to cause the flow passage 232 to have a narrowing cross-section in a direction toward the top end region. Housing 218 is annular which means that it surrounds the passage 232, although its interior space is not necessary tubular, circular in cross-section or cylindrical.

Air from the ambient atmosphere (e.g., the vehicle passenger compartment) is designed to flow through the reverse flow valve 220 during use into and through the passage 232 defined in part by the aspirator inlet part 226 to mix with inflation gas (to cause aspiration) with the mixed gas and air then flowing through a remaining part of the passage 232 into the airbag 222 whose interior is in flow communication with the passage 232, i.e., defined by the inner wall of the housing 218.

FIGS. 29-31 illustrate additional details of the airbag module 210 without some structure, e.g., the airbag 222 and the cover assembly 224. A reverse flow valve frame 234 supports the reverse flow valve 220. Aspirator 216 includes a gas generator assembly 236 that generates gas to initiate inflation of the airbag 222, a gas generator electric plug 238, and an aspirator diffuser 240 that forms part of the housing 218. The diffuser 240 has one or more walls that define part of an outer surface of the aspirator 216 and an inner surface that defines part of the passage 232 between opposite end regions (an inlet end region being to the right in FIG. 31 and an outlet end region being to the left in FIG. 31).

Diffuser 240 that has an inner surface or wall that expands outward (and is also referred to as an aspiration portion of the aspirator 216). Air from the ambient atmosphere (e.g., the vehicle passenger compartment) is designed to flow, during inflation, through the aspiration inlet part 26, then through the reverse flow valve 220 and then into and through diffuser 240. This flow is through the passage 232.

Aspirator inlet part 226 includes a central hub 242, aspirator pylons 244 separated from one another to define flow passages therebetween and an external ring or connection 246 that engages with the steering wheel support structure 228.

Aspirator 216 uses the Prandtl-Meyer effect. Previous aspirators typically utilize the Coanda effect and suffer from significant limitations which are overcome by the invention. Nozzles designed to utilize the Prandtl-Meyer effect do not suffer from a source pressure limitation. By using higher pressures, the combined flow into the airbag 222 can be at much higher pressures providing significantly more pressure for opening the airbag deployment cover of the assembly 224 and initially deploying the airbag 222. This also provides more design latitude for the pressure into the airbag 222. For example, using the Coanda effect, airbag pressures even as high as 3 psi are difficult to achieve whereas with the Prandtl-Meyer effect pressures exceeding 6 psi are readily achievable.

Operation of the module 210 to inflate the airbag 222 is as follows. A gas generator 248 of the gas generator assembly 236, which may have any structure and triggering mechanism known to those skilled in the art to which this invention pertains, begins generating gas after receiving a signal from an airbag sensor and diagnostic module (not shown) through the plug 238 which is connected to the gas generator 248 (collectively referred to as an activation system). The airbag sensor and diagnostic module may have any structure and characteristics known to those skilled in the art to which this invention pertains and the particular type is not critical to the invention. The gas being generated flows into a circumferential expansion zone 250. Zone 250 does not have to extend entirely around the circumference of the gas generator 248, and this is only a preferred construction.

Gas generator 48 continues its generation of gas which then begins to cause injection of inflating gas from the circumferential expansion zone 250 through a circumferential slit 252 shown in FIGS. 32, 36 and 37. Slit 252 does not have to extend entirely around the circumference of the gas generator 248, and this is only a preferred construction.

Due to the Prandtl-Meyer flow effect, the jet outflow from slit 252 attaches to a wall 254 and spreads across the flow channel defined between the wall 254 and opposite wall 256. Wall 254 is the wall closer to the outlet end region of the aspirator 216 whereas wall 256 is the wall closest to the inlet end region of the aspirator 216. The high velocity jet creates a low pressure area after the slit 252 in the aspirator internal space 258 defined by the diffuser 240. Simultaneously, the reverse flow valve shown 220 is opened by the ambient aspirated gas flow. The reverse flow valve 220 (which includes flaps 260 that initially close the main flow passage or channel) are opened due to the pressure drop behind the slit 252 when gas begins to flow from the gas generator 248. Thus, ambient air will be sucked into internal space 258 through gas flow passages defined between the pylons 244.

In this design, the aspirator 216 consists of two parts and is thus more accurately referred to as an assembly, an internal one is aspirator portion 262 and the external one is housing portion or section 264 with the housing 218, reverse flow valve 220 and aspiration inlet part 226. The reverse flow valve 220 operates to allow aspirated ambient air to flow only in one direction, i.e., to fill the airbag(s) whose interior is in flow communication with the passage 232 in the aspirator 216. After each airbag is filled and the pressure in the airbag(s) reaches a design value, such as 3 psi, the flow into the airbag(s) stops and the reverse flow valve 220 closes. This airbag pressure will return flaps 260 of the reverse flow valve 220, which are similar to a membrane, to their initial position blocking inflow of air from the vehicular compartment through the gas flow passages between the pylons 244. As the occupant compresses the airbag during a crash, gas from the airbag flows out through reverse flow valve gap 266 between flaps 260 and pylons 244 (see FIG. 32). The cross section of this gap may be equivalent in area to the vent holes normally present in a driver airbag. Part of the gap 266 is formed because the flaps 260 come close to and may contact the surface of the aspirator portion 262 but are not connected thereto. Thus, the flaps 260 can be slightly separated from the surface of the aspirator portion 262 to allow for the outflow of air resulting from airbag compression.

The reverse flow valve 220 is preferably constructed of a pliable material such as, but not limited to, a plastic film or fabric. One or more flaps 260 are formed by, for example, cutting the material, such as to form four flaps. Similarly, parts of the gap 266 between adjacent flaps 260 is formed by cutting the material in the center, and also possibly causing a thinner region to be present in the center. The reverse flow valve 220 may have characteristics and properties like a membrane.

Initially, the reverse flow valve 220 remains closed for a short period until sufficient pressure is attained to open the airbag deployment cover of assembly 224. Then, the reverse flow valve 220 opens allowing gas to be drawn into the passage defined by the housing section 264 of the aspirator 216 providing the gas flow needed to inflate the airbag(s) in flow communication with the passage. When the flow reaches a sufficient pressure, the cover opens and the airbag starts to deploy. The airbag in a folded initial state is connected to the housing section 264. The reverse flow valve 220 returns to its initial position and holds the gas inside the airbag after the airbag is filled and the gas generator 248 has run out of propellant.

When the reverse flow valve 220 is closed at the start of the gas generation, gas can flow out through the hole (gap 266) in the reverse flow valve 220 if the cover fails to open. This can occur when the occupant is out of position pressing on the cover. In this case, the airbag will not deploy, thereby protecting the occupant from injury. After the reverse flow valve 220 closes when the airbag is inflated, the hole (gap 266) in the reverse flow valve 220 provides the proper flow resistance to control the motion of the occupant during the crash. The hole (gap 266) in the reverse flow valve 220 thus replaces the one or more holes normally in the airbag.

The internal aspirator contour can be divided at three sections, an inlet section, a cylindrical section and a diffuser section. The inlet section can have a curved or straight contour. As shown, the inlet section is straight since this part is connected to the inlet part containing the reverse flow valve 220. The length of cylindrical section is defined by the jet gas dynamics parameters determined by simulation modeling. It also depends on the angles and the properties of the gas generator 248. The diffuser section can have different diffuser angles and may have a different length at its end portion as seen in FIG. 37. The diffuser section starts at, and is contiguous with, the end of the cylindrical section.

All parts of aspirator are preferably made from plastic, for example, by molding. The exception is two metal plates. Aspiration portion 262 includes a plastic tail part 268 that covers the gas generator 248, i.e., the gas generator 248 is situated in an interior cavity formed in the tail part 268, and the aspirator inlet part 226, with the central hub 242 thereof being used as fixation for slit metal plates of disks 270, 272 (see FIG. 36).

FIGS. 38-46 show generally circular metal disks 270, 272 that cooperate to forming the slit 252. Disks 270, 272 are assembled together while creating passages 274 for the plastic flow during the molding process to form tail part 268. The circumferential expansion zone 250 is represented by closed chamber or channel 276 and is formed by suitable design of the disks 270, 272. Hot gas flows only inside channel 276 and exhausts through the slit 252. Roof 278 of closed channel 276 is formed from one metal disk 270 and side walls 280 of channel 276 are formed from the other metal disk 272. Combined roof 278 and side walls 280 create closed channel 276 for hot gas flow during use.

Both metal disks 270, 272 are preferably made from flat thin metal material such as sheet steel by stamping. This may be followed by coining to achieve the required accuracy of the dimensions of the slit 252.

Metal disks 270, 272 include a rim with an open central region, with disk 270 forming on side of the slit 252 and disk 272 forming the other side of the slit 252. The designed contour for the wall of disk 272 against which the gas will flow is provided when forming disk 272.

FIG. 47 is an exploded view of the aspirator 216. Aspirator 216 includes housing 218 which may substantially cylindrical, the plastic tail part 268, the first disk 270 preferably made of metal, the reverse flow valve 220, the gas generator 248 known to those skilled in the art to which this invention pertains, the second disk 272 preferably made of metal, and aspirator inlet part 226 (the pylon construction) which includes hub 242, pylons 244 and connection structure 246. In the illustrated embodiment, the plastic molded parts are shown as two parts, 226 and 268. The joining method for attaching parts 226, 268 and the remaining parts of the aspirator 216 can consist of a gluing or snapping together operation. Alternately, parts 226, 268 are formed in one plastic molding operation where the gas generator 248 and disks 270, 272 are inserted into the plastic mold before the plastic is pumped in.

As shown in FIG. 48, the slit 254 and the shape of the wall beyond the slit 254 are designed to obtain the Prandtl-Meyer effect for the resultant flow of gas. The slit contour is formed by the two parts of the aspirator 216 when they are connected (one part defined by disk 270 and the other by disk 272). Circumferential expansion zone 250 is a toroidal chamber which functions as a mixing chamber where hot gas from gas generator holes 282 flows out and has smooth contour 284 with no sharp edges. Zone 250 is defined on one side (to the rear of the aspirator 216) by the metal disk 270 and on the other side (to the front of the aspirator 216) by the disk 272.

The basic slit parameters are width of the slit 254, two obtuse angles 286, 288 formed in the wall of disk 272 and the position of sharp edge 290 relative to the second angle 288. The combined angles determined the jet direction, spreading and position. The design of the angles 286, 288 is to keep jet attached to the aspirator wall (of disk 272) when it flows out of the slit 254. The attached jet can be achieved by using only one angle, but in that case, the jet will separate from the wall (of disk 272) at low pressure which does not happen in the slit design with two angles.

There are some marked differences between shock waves and expansion fans. Across a shock wave, the Mach number decreases, the static pressure increases, and there is a loss of total pressure because the process is irreversible. Through an expansion fan, the Mach number increases, the static pressure decreases and the total pressure remains constant. Expansion fans are isentropic.

Figure 49:
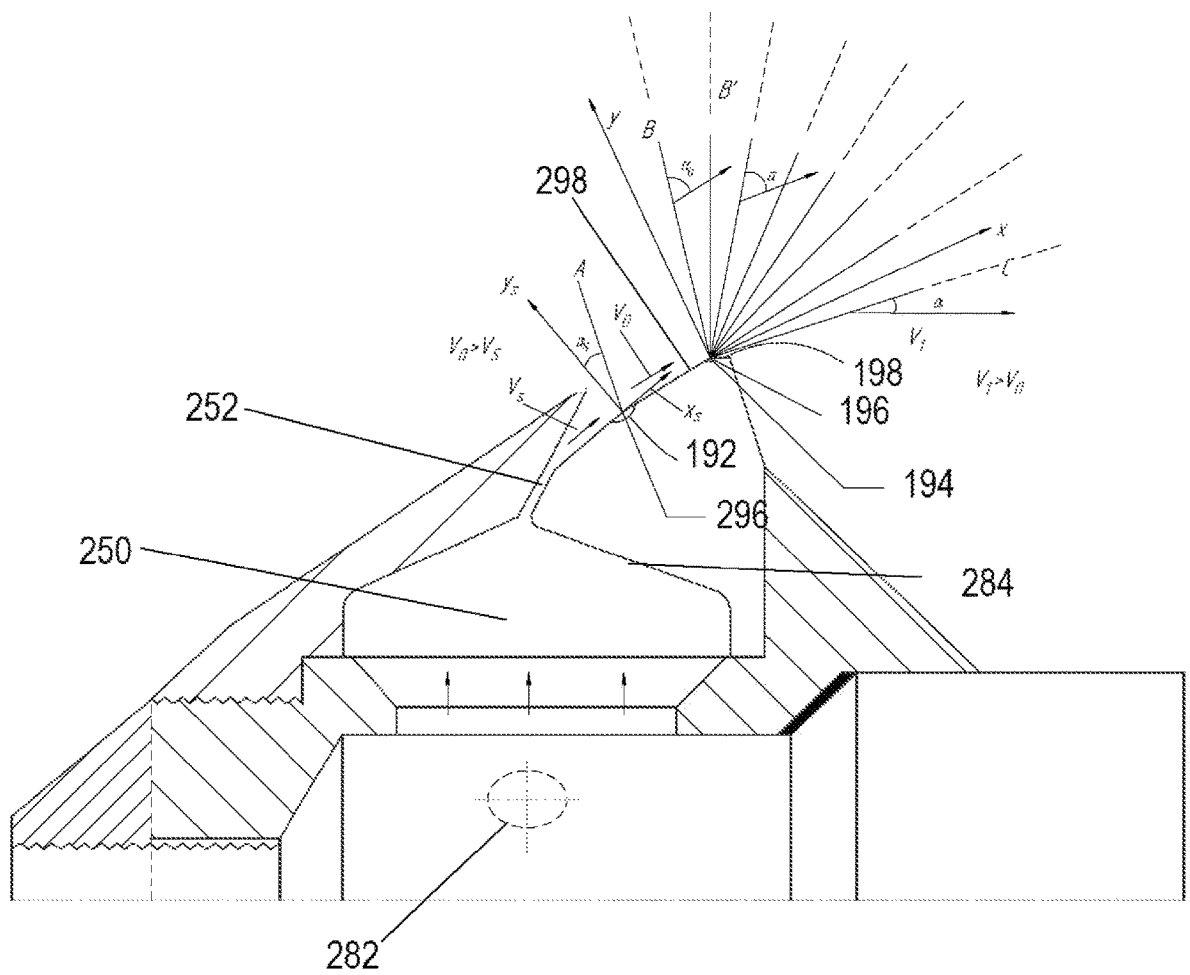
FIG. 49 is a detailed drawing of the Prandtl-Meyer flow at the aspirator slit.

FIG. 49 represents Prandtl-Meyer flow at internal aspirator. Principle of Prandtl-Meyer flow effect was described in FIG. 19-24.

Referring to FIGS. 50-79, a top, perspective view of a preferred embodiment of a passenger airbag module of the invention is illustrated generally in FIGS. 50-55 where an airbag deployment cover and airbag in a folded state are marked as 300 and 301 respectively.

In these embodiments, the airbag inflator assembly is used in particular for a passenger of a vehicle. Therefore, the airbag is typically elongate and connected to an elongate housing. The housing includes a top wall and an opposite bottom wall that are typically parallel to one another, and opposed side walls also parallel to one another. The rear of the housing is where the inlet into one or more flow passages defined by the housing is located while the front of the housing is where the outlet of the flow passage(s) is located. A flow direction is generally in a direction of an axis or line passing through the inlet and outlet and parallel to the top, bottom and side walls.

An inflator system including a passenger aspirated inflator 298 with an aspirator 296 and an external slit 303. The aspirator 296 is shown without a reverse flow valve, but one can be provided. A high-pressure gas supply from a gas generator is illustrated at 302 (thus reference number 302 generally represents a gas generator assembly or system used in the invention with only a portion being shown). Any type of gas generator that provides a high pressure flow of gas (pressurized gas) may be used in the invention. Jets of pressurized gas flow out from the aspirator 296 through the slit 303. Aspirator inlet 304 at one end of a housing 306 defines an inlet for air from an area exterior of the inflator 298 such as from the passenger compartment of a vehicle in which the inflator 298 is installed. The air flows into an interior flow passage defined by the housing 306 of the aspirated inflator 298 while an outlet part 305 represents the gas flow into the airbag 301.

The flow passage is defined as the internal channel by coupling of the housing 306, a slit part 307 and an inlet or inflow aspirator ramp part 308 (see FIG. 51). Air from the ambient atmosphere (e.g., the vehicle passenger compartment) is designed to flow through the reverse flow valve (not shown) during use into and through the passage in the housing 306 defined in part by the aspirator inlet part 308 to mix with inflation gas (represented by arrow 309 which causes the aspiration) with the mixed gas and air then continuing to flow into the interior of the airbag 301. Specifically, the mixed gas then flows through the remaining part of the passage in the housing 306 (defined by part of the slit part 307 and the outlet aspirator ramp part 310) into the airbag 301 whose interior is in flow communication with the passage in the housing 306. The aspirator inlet part 308 is angled to decrease the cross-sectional area of the passage while the aspirator outlet part 310 is angled to increase the cross-sectional area of the passage (see FIG. 51). The slit part 307 has a portion toward the airbag 301, i.e., toward the front of the housing 306, that has a surface that may be contiguous with the surface of the aspirator outlet part 310. Slit part 307 has a portion after the slit that is angled to increase the cross-sectional area of the passage.

These same elements may be indicated by different reference numbers in the remaining drawings and whenever elements are named the same but different reference numbers are used, can have the same properties, or be different. Some elements of airbag module are not designated or shown in FIGS. 50 and 51, e.g., the gas generator and reverse flow valve, but are present and described in other drawings.

FIGS. 52-54 illustrate internal passenger aspirator designs without the airbag 301 and cover 300. The aspirator cross section is shown generally in FIGS. 53 and 54 and comprises an aspirator assembly 312 having a housing 313, nose fairing 314, a slit detail or forming part 315, a slit detail or forming part 316, a tail part 317, aspirator screws 318 and a feather key part 319. Aspirator assembly 312 includes the housing 313 that preferably has an outer surface with two generally parallel parts and an inner surface or wall with variable cross-section that defines a main flow passage.

Air from the ambient atmosphere (e.g., the vehicle passenger compartment) is designed to flow through a reverse flow valve 320 at a rear of the housing 313 during use, into and through an inlet portion 321 of the main flow passage (see FIG. 53). The air flows through inlet portion 321 to the area defined by the aspirator diffuser part 322 at which it is outlet from the main flow passage (see FIG. 54).

In FIG. 53, the presence of the aspirator in the main flow passage defined by the nose fairing 314 (the part at the inlet or rear end of the housing 313 into which ambient air flows), the slit forming parts 315 and 316, and the tail part 317 (the part at the outlet or front end of the housing 313 out of which the combined air and gas flow into the airbag coupled to the housing 313), causes the main flow passage to be split into two subsidiary flow passages. One subsidiary flow passage is on each side of the aspirator and defined by one inner surface of the housing 313 on one side and the outer surface of the nose fairing 314, slit forming parts 315 and 316 and tail part 317 on the other side. The ends of the subsidiary flow passages are formed by the ends of the housing 313 (see FIG. 52). The aspirator shown in FIGS. 53 and 54 uses the same aspiration principle but differs in details of the design. As pressurized hot gas generated by a source thereof (not shown) flows through a channel 323 in the aspirator, it must not come into contact with non-metal aspirator parts or other parts that would be adversely affected by the temperature of the gas. Thus, slit forming parts 315 and 316, which are positioned to define a slit therebetween, are made from metal or other high temperature-resistant material. Other parts that do not come into contact with the gas, such as the housing 313, nose fairing 314 and aspirator screws 318, could be made from plastic such as by molding or a 3D printer.

Another aspirator variant is shown in FIG. 54. The position of a conventional or standard gas generator is shown at 324, and preferably has a circular shape. Hot gas from the gas generator 324 will flow along two thin metal plates 325, 326 which define a slit therebetween. Other aspirator parts 327 and 328, which support the metal plates 325, 326 and define the contour for the passage in the housing 313, are made from plastic. Hot gas will not come into contact with nonmetal surfaces. Plates 325 and 326 can be stamped from sheet metal providing minimal thickness of the plates and then coined to provide a precise geometry.

In FIG. 54, the presence of the aspirator in the main flow passage defined by the aspirator parts 327, 328 and to a lesser extent by the metal plates 325, 326, causes the main flow passage to be split into two subsidiary flow passages. One subsidiary flow passage is on each side of the aspirator and defined by one inner surface of the housing 313 on one side and the outer surface of the aspirator parts 327, 328 (and possibly a small exposed edge of the metal plates 325, 326) on the other side. The ends of the subsidiary flow passages are formed by the ends of the housing (see FIG. 52).

Operation of the apparatus to inflate an airbag whose interior is in flow communication with the main flow passage defined by the inner wall of the housing 313 (FIG. 53) of the aspirator assembly is as follows. The gas generator assembly, which may have any structure and triggering mechanism known to those skilled in the art to which this invention pertains begins generating gas after receiving a signal from the airbag sensor and diagnostic module which are connected to gas generator located at passage 323, see FIG. 53, or at external location away from aspirator (collectively referred to as an activation system). The airbag sensor and diagnostic module may have any structure and characteristics known to those skilled in the art to which this invention pertains and the particular type is not critical to the invention.

Gas generator assembly then begins to cause injection of inflating gas through a slit 329 defined between the slit forming parts 315 and 316 in FIG. 53. The elongation of the gas generator causes flow of gas from all length of slit passage 329 like a solid curtain of generated gas. Thus, gas is output from the slit 329 at all slit lengths along the passage at substantially the same time.

Slit 329 is defined between the inlet portion 321 of the aspirator assembly and the aspirator diffuser 331 and is constructed as combined construction from slit forming parts 315 and 316. Due to the Prandtl-Meyer flow effect, the jet outflow from slit 329 attaches to the inner wall of the aspirator internal part (of slit forming part 316) and spreads across the flow channel. The high velocity jet creates a low-pressure area after the slit 329 in the aspirator internal space or passage. Simultaneously, the reverse flow valve 320, shown in open position 332, is opened by the ambient aspirated gas flow passing through position 335 to the open position 332. The reverse flow valve 320 includes flaps that are initially closed (FIG. 55), closing off the main flow passage and open due to the pressure drop behind the slit 329 when gas begins to flow from the gas generator assembly. The flaps are each attached along one longitudinal edge to the housing 313 (see FIG. 52) and at an opposite longitudinal edge, are close to one another, defining a gap 334 between these opposed longitudinal edges, the purpose of which is explained herein (see FIG. 55). Thus, ambient air will be sucked inside aspirator assembly through at least one inlet port defined by the reverse flow valve 320.

In the internal aspirator design, the aspirator assembly primarily comprises two parts, the aspirator portions 331, 333 and the inlet portion or section 321 with the reverse flow valve 320 (flaps are shown in FIGS. 54 and 55). The reverse flow valve 320 operates to allow aspirated ambient to flow only in one direction, i.e., to fill the airbag whose interior is in flow communication with the passage in the aspirator assembly. After the airbag is filled and the pressure in the airbag reaches a design value, such as 3 psi, the flow into the airbag stops and the reverse flow valve 320 closes. This airbag pressure will return flaps of the reverse flow valve 320 membrane to their initial position. As the occupant compresses the airbag during a crash, gas from the airbag flows out through reverse flow valve gap 334 (FIG. 55) in the center of the reverse flow valve 320, i.e., between the two flaps. The cross section of this gap 334 is equivalent in area to the vent holes normally present in a driver airbag.

The reverse flow valve 320 is preferably constructed of a pliable material such as, but not limited to, a plastic film or fabric. Flaps are formed by, for example, cutting the material, such as to form two flaps as shown in FIG. 52. The valve gap is formed by cutting the material in the center line. The reverse flow valve 320 may have characteristics and properties like a membrane.

Initially, the reverse flow valve 320 remains closed (initial closed position is shown in FIG. 54) for a short period until sufficient pressure is attained to open the airbag deployment cover. Then, the reverse flow valve 320 opens allowing air to be drawn into the passage defined by the inner wall of the housing 313 of the aspirator assembly 312 providing the gas flow needed to inflate the airbag in flow communication with the passage. When the flow reaches a sufficient pressure, the cover opens and the airbag starts to deploy. Valve opening is marked as dashed lines 335 and will fully open at 332 when flaps reach a position near the aspirator wall. The airbag in a folded initial state is connected to the surface of aspirator diffuser. The reverse flow valve 320 returns to its initial position and holds the gas inside the airbag after airbag is filled and the gas generator assembly has run out of propellant. A metal mesh 336 can be located at the aspirator inlet for additional valve initial state fixation.

When the reverse flow valve 320 is closed at the start of gas generation, gas can flow out through the gap 334 in the reverse flow valve 320 if the cover fails to open. This can occur when the occupant is out of position pressing on the airbag cover. In this case, the airbag will not deploy, thereby protecting the occupant from injury. After the reverse flow valve 320 closes when the airbag is inflated, the gap 334 in the reverse flow valve 320 provides the proper flow resistance to control the motion of the occupant during the crash. The gap 334 in the reverse flow valve 320 thus replaces any holes normally in the airbag.

FIGS. 56-60 are detailed drawings of the cross section of the driver side aspirated inflator of FIGS. 52-55. The internal aspirator contour can be divided into at least three sections, an inlet section defined by an inlet portion 337, a substantially cylindrical section 338 and a diffuser section 339. Three parts combined to create a nozzle shape channel with narrowest area at the slit cross section.

Figure 56:
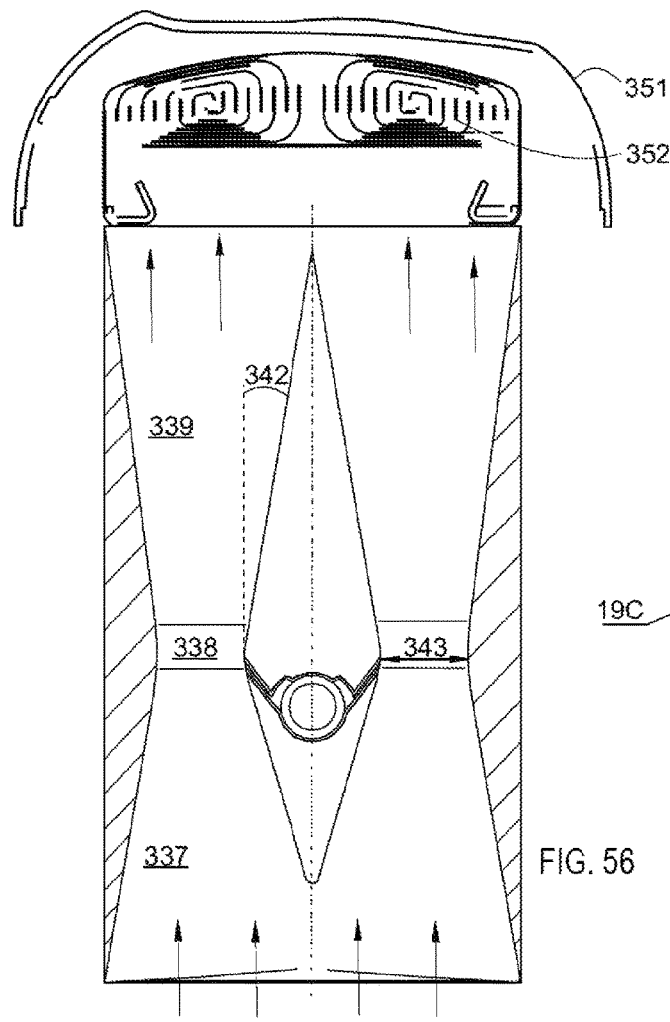
FIGS. 56 and 57 are detailed drawings of cross sections of the passenger aspirated inflator of FIG. 52.
Figure 57:
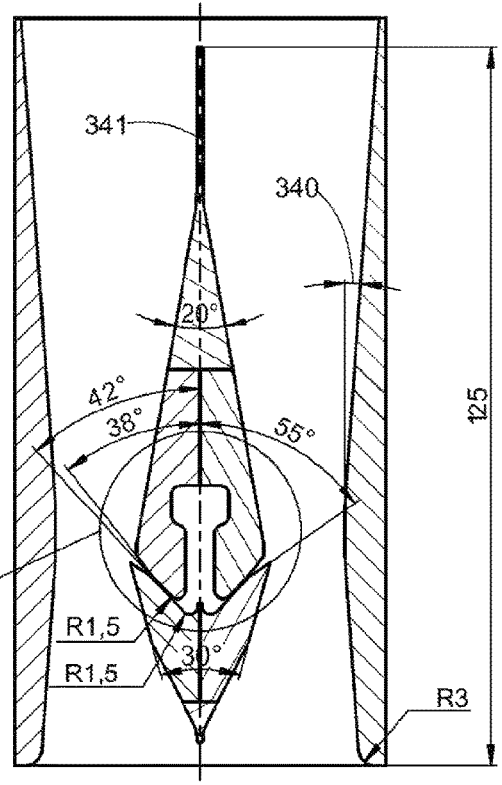

A wall of the inlet section 337 can have curve or straight contour. As shown in FIG. 56, it is straight while in FIG. 57, it is curved since this part is not connected to the inlet part containing the reverse flow valve. The length of cylindrical section 338 is defined by the jet gas dynamics parameters determined by, for example, simulation modeling. Other factors to consider when determining the length of the cylindrical section 338 are known to those skilled in the art to which this invention pertains. For example, it also depends on angles and properties of the gas generator assembly. The diffuser section 339 can have different diffuser angles 340 (about 4° as shown, but can vary range up to about 20°) and may have a different length at the end portion.

Figure 58:
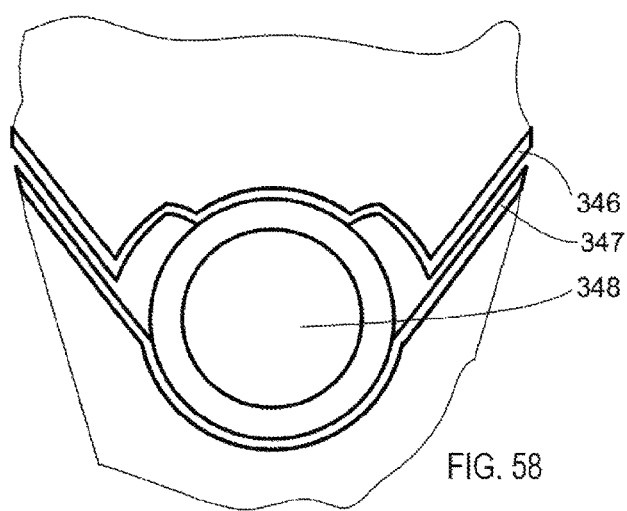
FIGS. 58, 59 and 60 represent an internal pre-slit channel design for passenger aspirated inflators shown in FIG. 56 and FIG. 57.

The slit and the shape of the inner wall defining the passage beyond the slit, for example, the length of a tail part 341, angle 342 between a slit part 344 and the longitudinal axis of the housing, a distance 343 from the slit to housing, are designed for obtaining the Prandtl-Meyer effect. The slit contour is formed by the two parts of the aspirator assembly (slit parts 344, 345) when they are connected by a connecting structure such as screws 318 as shown in FIG. 52 (the screws are connected to side walls of the aspirator). A second variant of slit design is shown in FIG. 58. Slit shape is formed by two thin metal plates 346 and 347 combined. The thickness of metal plates can be 1 mm while the slit width can vary in a range of, for example, about 0.3 mm to about 0.8 mm. The gas generator is marked as position 348.

Figure 59:
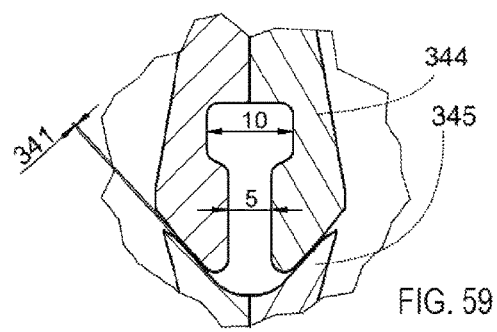
Figure 60:
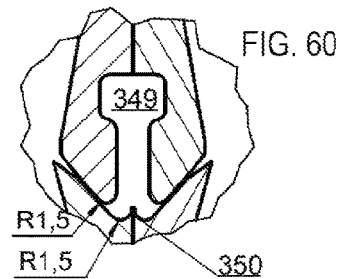

FIGS. 59 and 60 represent different types of the internal slit contour. For better gas flow operation, hot gas channel 349 can be modified by using flow separation sharp edge 350. The airbag in a folded state and airbag deployment cover are marked as 351 and 352 in FIG. 56.

Figure 61:
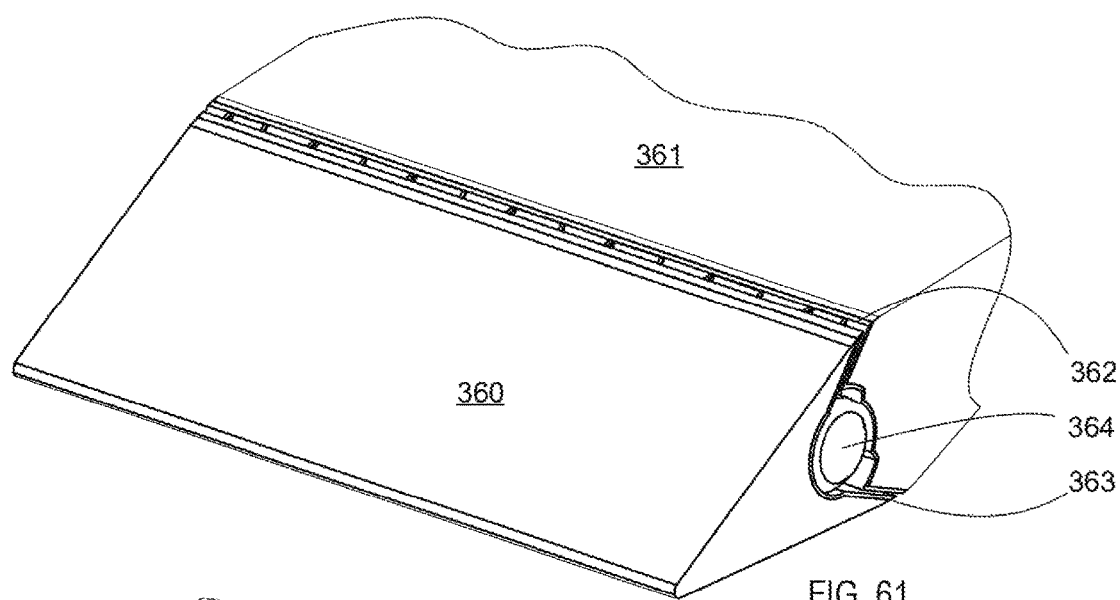
FIGS. 61-63 show the metal plates design.
Figure 62:
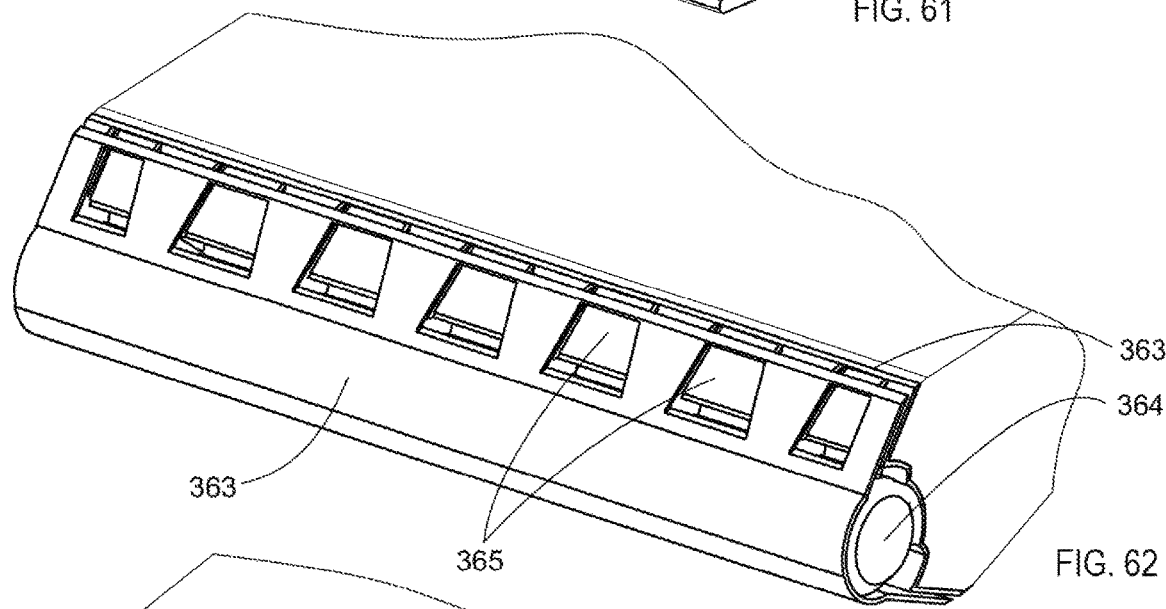
Figure 63:
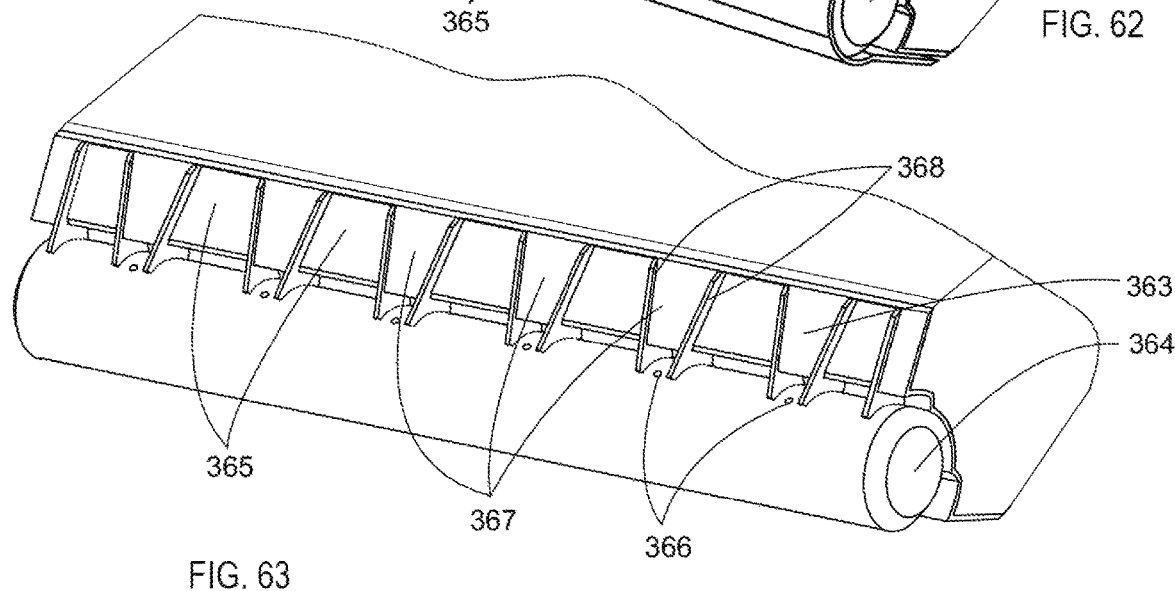

FIGS. 61-63 represent a preferred design of the metal plates. FIG. 61 shows the aspirator in its assembled state. Parts 360 and 361 may be made from plastic by, for example, casting. Metal plates 362 and 363 can be connected by rivets (not shown) and are tightly fixed around a gas generator 364. Parts 360 and 361 are one piece molded and plastic connections between them are situated in channels 365. Channels 365 are used for hot plastic flow from part 360 to part 361 during the molding operation. Hot gas flows out from gas generator holes 366. Hot gas fills all of the space and flows in closed channel 367 and has no contact with channels for the hot plastic flow 365. Channel 367 is closed by walls 368 and metal plate 363. Walls 368 are preferably made from the metal plate 362 by bending from channel 365 where they are situated in an initial state. For better filling, gas generator holes 366 can have smoothed sharp edges and have different contours.

Figure 64:
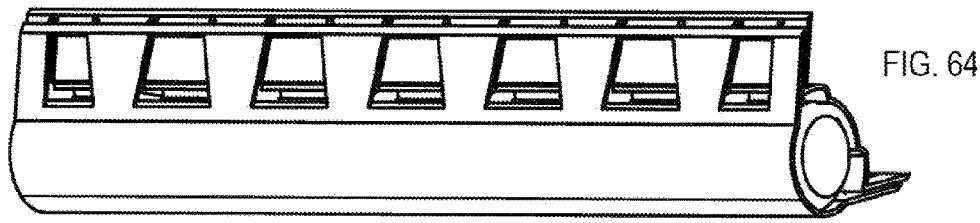
FIGS. 64 and 65 show a metal plates assembly at the gas generator.
Figure 65:
Figure 66:
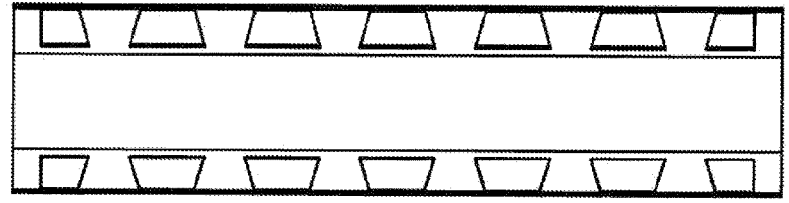
FIGS. 66-69 show separated metal plates design.
Figure 67:
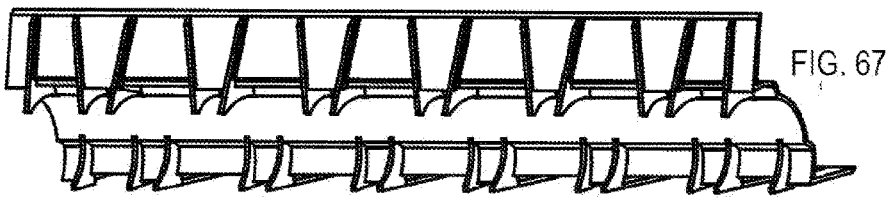
Figure 69:
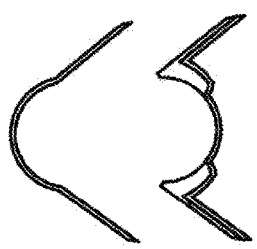
Figure 68:
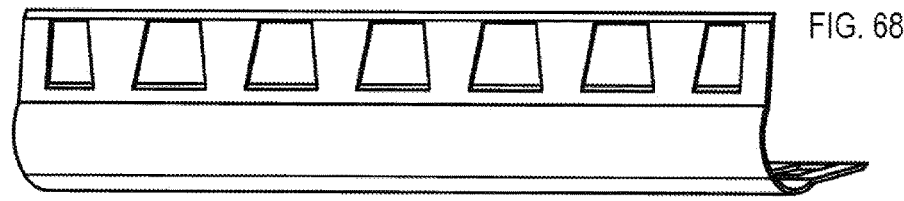

FIGS. 64-69 show another design of the metal plates. FIGS. 64 and 65 represents assembly of gas generator and metal plates, i.e., front and side views of the assembly. Separated metal plates are depicted in FIGS. 66-69.

Figure 70:
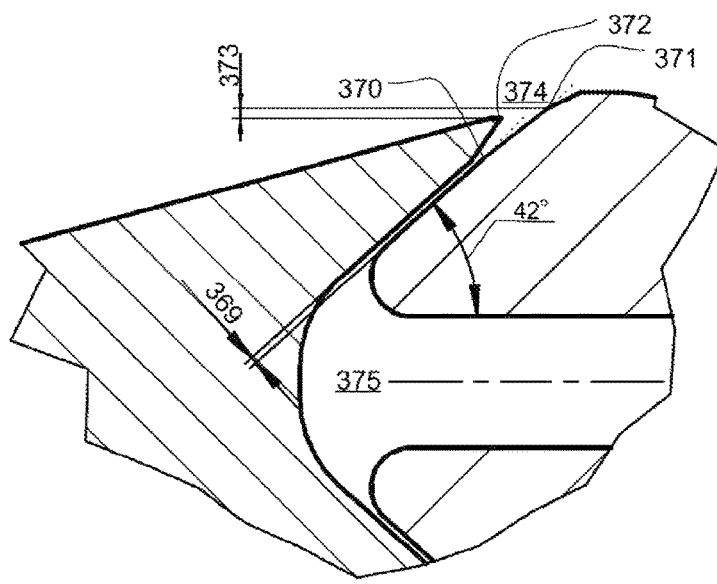

FIGS. 70 and 71 shows basic slit geometry dimensions at the internal aspirator slit (FIG. 70) and the external aspirator slit (FIG. 71). The basic slit parameters are the slit width 369, two obtuse angles 370, 371 and the position of a sharp edge 372 relative to the second obtuse angle 371, it is marked as 373. The combined angles determine the jet direction, spreading and position. A primary purpose of the design of the angles 370, 372 is to keep the jet attached to the aspirator wall (the inner surfaces of aspirator diffuser) when it flows out of the slit 374. The attached jet can be achieved by using only one angle, but in that case, the jet will likely separate from the wall at low pressure, which is less likely to happen in the slit design with two angles. Contour and volume of mixing chamber 375 influence gas dynamics parameters and must be chosen according to, for example, numerical simulation results.

FIGS. 72 and 73 represent another variant of the internal passenger aspirator. The principle is similar to those described herein, and this type relates only to different engineering solution of the aspirator design. High pressure gas flows through a passage 380, this passage 380 can be the place for a standard gas generator location. After that, the gas flows through orifices 381. The aspirator slit can have a prefabricated design and consist of two combined parts: a circular channel with exhaust holes 382 and inlet fairing part 383. Orifices 381 are located as an array along aspirator axis 384. The arrays of exhaust holes or orifices 381 are situated at the sides for achievement of gas generators neutral thrust. Basic parameters for this design are slit width 385, contour of side walls 386 and distance from slit side walls 387.

Figure 74:
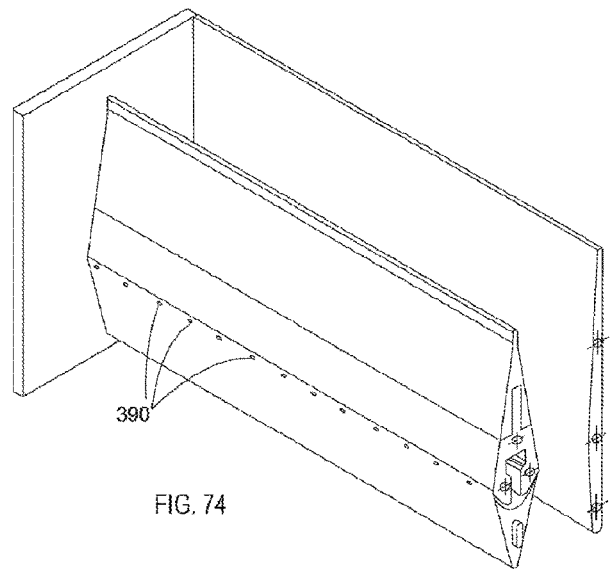
FIG. 74 shows internal aspirator with a hole nozzle array instead of slit nozzles.

FIG. 74 is principle drawing of the passenger side aspirated inflator of FIG. 52 wherein discrete, separated nozzles 390 are used in place of the single elongated slit 374 (FIG. 70). The number, size and location of these nozzles 390 along aspirator span axis, define the passage in the housing of the aspirator assembly and can be determined using, for example, computational fluid dynamics modeling. Other factors to consider when determining parameters of the nozzles 390 are known to those skilled in the art to which this invention pertains. Nozzles 390 have the advantage that it is easier to manufacture accurate holes (each of which constitutes one nozzle) than to maintain an accurate slit around the length. Otherwise, the operation of an aspiration module for an airbag including nozzles 390 is essentially the same as one including slit 374.

Figure 75:
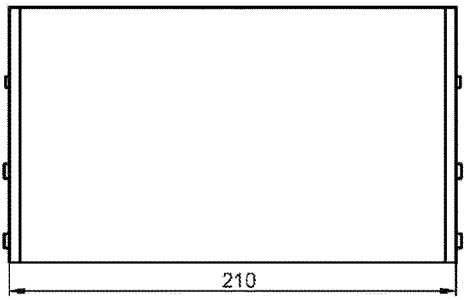
FIGS. 75-77 illustrate assembly and overall view of internal passenger aspirator.
Figure 77:
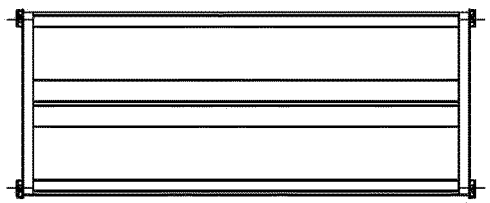
Figure 76:
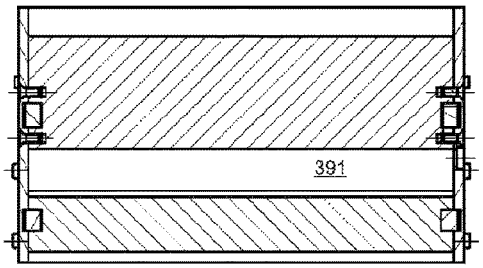

FIGS. 75-77 show the internal passenger aspirator in assembled version: show top, side, front view of aspirator with over dimensions in millimeters. Gas generator location is marked as 391.

Figure 78:
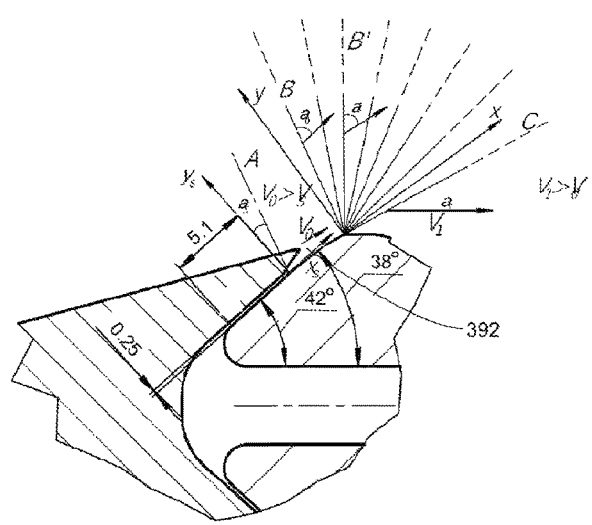
FIG. 78 illustrates the principle of Prandtl-Meyer flow at internal passenger aspirator slit.
Figure 79:
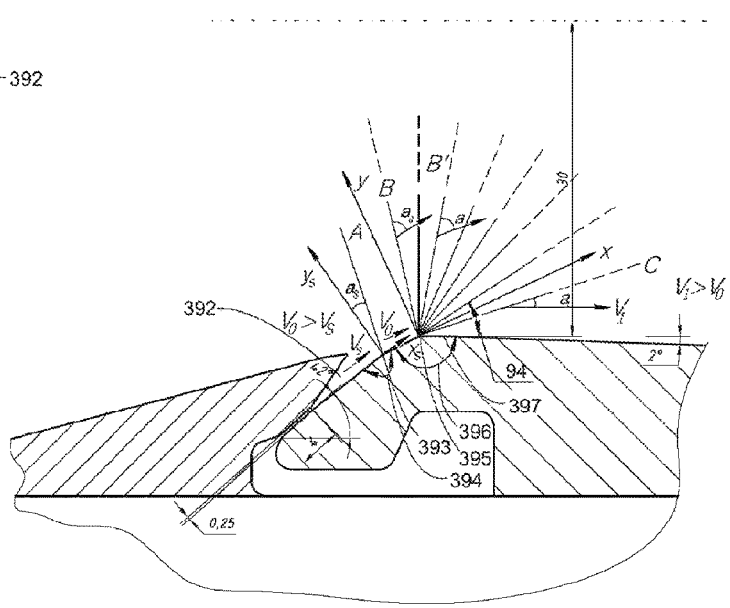
FIG. 79 shows Prandtl-Meyer flow at an external aspirator slit.

FIGS. 78 and 79 represent Prandtl-Meyer flow at passenger aspirator. Principle of Prandtl-Meyer effect was described in FIG. 19-24. The elements are similar to those in FIG. 17 with the following correspondence: 94:80; 392: 42; 393:72; 394:74; 395:76; 396:78; and 397:82.

Figure 81:
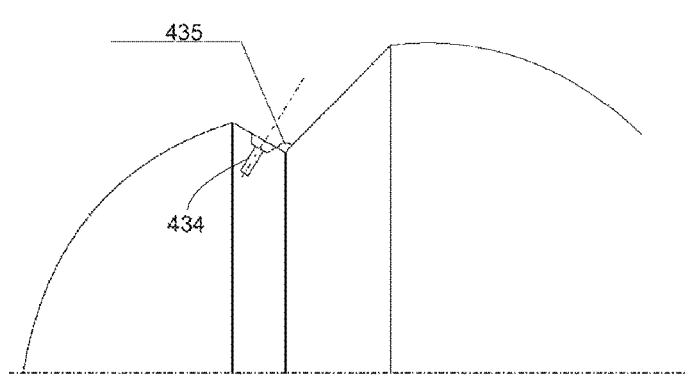
FIGS. 81 and 82 show basic nozzle parameters that influence the Prandtl-Meyer effect.
Figure 82:
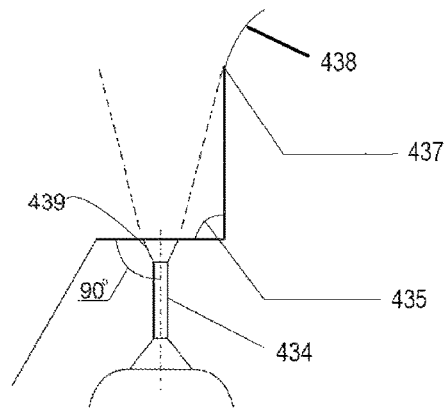
Figure 80:
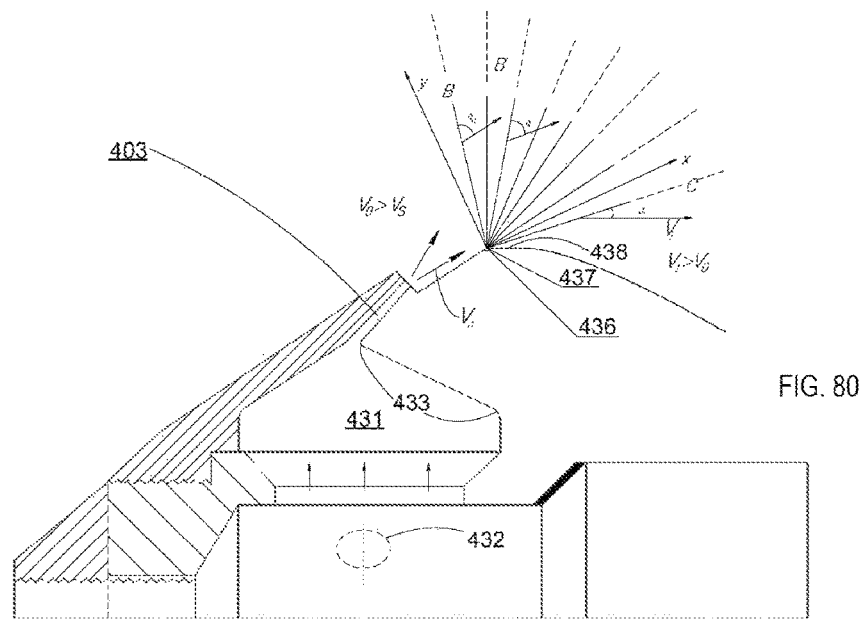
FIG. 80 shows nozzle design and Prandtl-Meyer flow principle.

Referring now to FIGS. 80-85, use of one or more nozzles instead of a slit is possible in most if not all disclosed embodiments. FIG. 80 shows the geometry of a representative nozzle. A nozzle channel 403 and the shape of the wall beyond the nozzle are designed for obtaining the Prandtl-Meyer effect (described for FIGS. 19-24). The nozzle contour is formed in one metal disk and the inlet and outlet diffuser geometry is shown in FIGS. 81 and 82. A toroidal chamber 431 constitutes a pressure distribution chamber, where the hot gas from gas generator holes 432 flows out, and has a smooth contour 433 with no sharp edges. The basic nozzle parameters are the nozzle diameter 434 width, varied angles 435 (FIGS. 81 and 82), 436 and the position of a sharp edge 437. The combined angles determined the jet direction, spreading and position. The design of the angles 435, 436 optimally keeps a jet attached to the aspirator wall when it flows out of the nozzle 403. The attached jet can be achieved by using two angles, but in that case, the jet will separate from the wall at different pressures. The flow turning will end if the jet near to the wall will be parallel to the aspirator cylindrical part 438. Thus, near the wall, the velocity $V_1$ vector is parallel to a wall part 438.

Main parameters that define nozzle aspirator design: number of nozzles, nozzle diameter, varied angle 435, and outlet angle 439 between nozzle axis and outlet cone wall. Two angles define jet width and must direct jet to interact with critical point (marked at FIG. 82). Jet interaction with the critical point will lead to the expansion fan occurrence and the Prandtl-Meyer effect.

Figure 83:
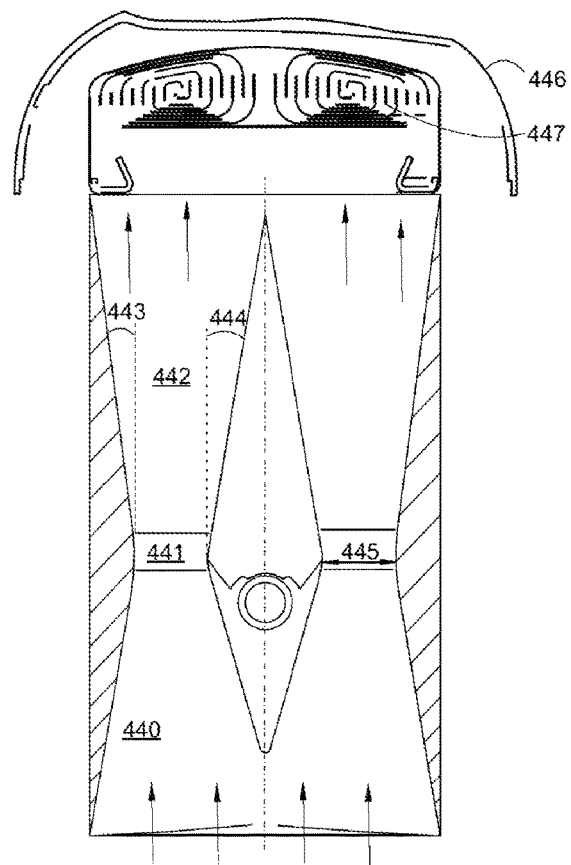
FIG. 83 is detailed drawings of passenger nozzle aspirator with airbag.

FIG. 83 is a detailed drawing of the cross section of a passenger side aspirated inflator. The internal aspirator contour can be divided into at least three sections, an inlet section defined by an inlet portion 440, a cylindrical section 441 and a diffuser section 442. Three parts combined create a nozzle shape channel with the narrowest area at nozzles cross section.

The wall of the inlet section 440 can have a curve or straight contour. The length of the cylindrical section 441 is defined by the jet gas dynamics parameters determined by, for example, simulation modeling. Other factors to consider when determining the length of the cylindrical section 441 are known to those skilled in the art to which this invention pertains or evident from the disclosure herein. For example, it also depends on angles and properties of the gas generator assembly. The diffuser section 442 can have different diffuser angles 443 (angle can vary range up to about 30) and may have a different length at the end portion. The nozzle and the shape of the inner wall defining the passage beyond the nozzle, for example angle 444, distance 445 from nozzle to housing, are designed for obtaining the Prandtl-Meyer effect.

The cover and airbag in a folded state are marked as 446 and 447, respectively, in FIG. 83.

Figure 84:
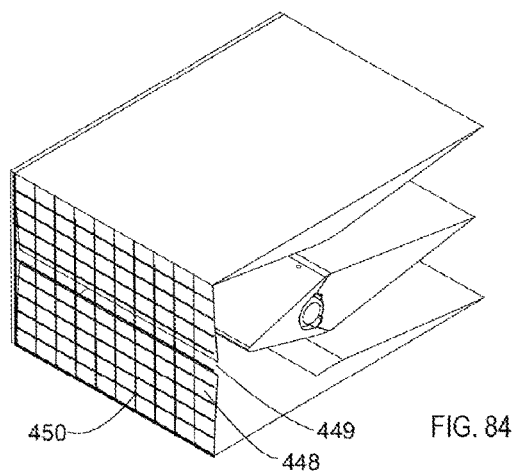
FIG. 84 is axonometric view of passenger aspirator.

In the internal aspirator design, the aspirator assembly includes the reverse flow valve 448 (the flaps are shown in FIG. 84). The reverse flow valve 448 operates to allow aspirated ambient gas to flow only in one direction, i.e., to fill the airbag whose interior is in flow communication with the passage in the aspirator assembly. After the airbag is filled and the pressure in the airbag reaches a design value, such as about 3 psi, the flow into the airbag stops and the reverse flow valve 448 closes. This airbag pressure will return flaps of the reverse flow valve membrane to their initial position. As the occupant compresses the airbag during a crash, gas from the airbag flows out through reverse flow valve gap 449 (FIG. 84) in the center of the reverse flow valve. The cross section of this gap 449 is typically equivalent in area to the vent holes normally present in a driver airbag.

The reverse flow valve 448 is preferably constructed of a pliable material such as, but not limited to, a plastic film or fabric. Flaps are formed by, for example, cutting the material, such as to form two flaps as shown in FIGS. 83 and 84. The valve gap is formed by cutting the material in the center line. The reverse flow valve 448 may have characteristics and properties like a membrane.

Initially, the reverse flow valve 448 remains closed for a short period until sufficient pressure is attained to open the airbag deployment cover. Then, the reverse flow valve 448 opens allowing air to be drawn into the passage defined by the wall of the inlet section 440 of the aspirator assembly providing the gas flow needed to inflate the airbag in flow communication with the passage. When the flow reaches a sufficient pressure, the cover opens and the airbag starts to deploy. Valve opening is indicated by the arrows in FIG. 83 and the flaps of the reverse flow valve 448 may be fully open when they reach a position near the wall. The airbag in a folded initial state is connected to the surface of aspirator diffuser. The reverse flow valve 448 returns to its initial position and holds the gas inside the airbag after airbag is filled and the gas generator assembly has run out of propellant. A metal mesh 450 can be located at the aspirator inlet for additional valve initial state fixation.

When the reverse flow valve 448 is closed at the start of gas generation, gas can flow out through the gap 449 in the reverse flow valve 448 if the cover fails to open. This can occur when the occupant is out of position pressing on the airbag cover. In this case, the airbag will not deploy, thereby protecting the occupant from injury. After the reverse flow valve 448 closes when the airbag is inflated, the gap 449 in the reverse flow valve 448 provides the proper flow resistance to control the motion of the occupant during the crash. The gap 449 in the reverse flow valve 448 thus replaces the one or more holes normally in the airbag.

In FIG. 87, an aspirated inflator is illustrated at 504, and an aspirator inlet at 505. Inflator 504 includes a housing defining a cylindrical flow passage (see FIG. 85) in which an aspirator assembly 506 is situated. Generally, aspirator assembly 506 operatively generates inflating gas which is directed into the flow passage to flow into an interior of the airbag 503 to inflate the airbag 503. The steering wheel 501 includes a circular part 507 and supports 508 connected to a steering column support that supports the steering wheel 501 on the steering column (not shown). The aspirator inlet 505 may be one or more ports, conduits or passages through the steering wheel 501 and/or steering column support that lead to the flow passage to cause air from a vehicular compartment to be drawn into the flow passage with the inflating gas, and which air mixes with the inflating gas with the resultant mixture inflating the airbag 503.

Referring to FIGS. 85-98, a top perspective view of a preferred embodiment of a driver side airbag module of the invention is illustrated generally at 500 in FIG. 85 installed in connection with a steering wheel 501 and wherein an airbag and a deployment cover have been removed. A view from the front of FIG. 85 is shown in FIG. 86 (with a module cover or deployment cover 502 added), and a cross-sectional view is shown in FIG. 87 (showing both the deployment cover 502 and an airbag 503). In FIG. 87, an aspirated inflator is illustrated at 504, and an aspirator inlet at 505. Inflator 504 includes a housing defining a cylindrical flow passage (see FIG. 1) in which an aspirator assembly 506 is situated. Generally, aspirator assembly 506 operatively generates inflating gas which is directed into the flow passage to flow into an interior of the airbag 503 to inflate the airbag 503. The steering wheel 501 includes a circular part 507 and supports 508 connected to a steering column support 19 that supports the steering wheel 501 on the steering column (not shown). The aspirator inlet 505 may be one or more ports, conduits or passages through the steering wheel 501 and/or steering column support 19 that lead to the flow passage to cause air from a vehicular compartment to be drawn into the flow passage with the inflating gas, and which air mixes with the inflating gas with the resultant mixture inflating the airbag 503.

FIGS. 89-91 illustrate additional details of the airbag module of FIG. 85 without the airbag 503 and airbag deployment cover 502. The airbag and steering wheel assembly, designated 510 in FIGS. 89-91, is shown generally in FIG. 89 and its cross sections in FIGS. 91 and 92 and comprises an aspirator assembly 511 including an aspirator 512, a support frame 513 that supports the aspirator 512 on a steering wheel 514 (and/or the steering column support 499), a gas generator 515 that operatively generates inflating gas, a gas generator electric plug 516, an aspirator diffuser 517 to guide a mixture of inflating gas and indrawn air to the airbag, and aspirator pylons 518. External connection 519 is optionally provided to facilitate connection of the aspirator assembly 511 to the steering wheel 514 and/or steering column support 499. The diffuser 517 forms a housing that has one or more walls that define an outer surface of the aspirator assembly 511 and an inner surface that defines a flow passage between opposite end regions (an inlet end region being to the right in FIG. 91 and an outlet end region being to the left in FIG. 91). Pylons 518 are separated from one another to define conduits through which air from the vehicular compartment operatively flows into the flow passage (indrawn air) to mix with inflating gas generated by the gas generator 515 which is then directed by diffuser 517 to inflate the airbag.

Aspirator 512 may be designed to use the Prandtl-Meyer effect as discussed herein.

Operation of the aspirator assembly 511 to inflate an airbag whose interior is in flow communication with the flow passage defined by the housing (diffuser 517) of the aspirator assembly 511 is as follows. Gas generator 515, 524, which may have any structure and triggering mechanism known to those skilled in the art to which this invention pertains, begins generating inflating gas after receiving a signal from an airbag sensor and diagnostic module (not shown) through the plug 516 which is connected to the gas generator 515 (collectively referred to as an activation system). The airbag sensor and diagnostic module may have any structure and characteristics known to those skilled in the art to which this invention pertains and the particular type is not critical to the invention. Gas generated flows through apertures 495 in a casing of the gas generator 524 into a pressure distribution chamber 496.

Gas generator 515, 524 continues generation of gas which then begins to cause injection of inflating gas from the pressure distribution chamber 496 through a circumferential slit 523 shown in FIGS. 92-95 (wherein the gas generator is designated 524). Due to the Prandtl-Meyer flow effect, the jet outflow from slit 523 attaches to a wall 525 of the aspirator 526 and spreads across the flow channel defined between the wall 525 and opposite wall 527. The high velocity jet creates a low pressure area after the slit 523 in the aspirator internal space 497 defined by the diffuser 529. Thus, ambient air will be drawn inside aspirator assembly 526 through an inlet port of the aspirator assembly 526 defined by the spaces between pylons 521.

Aspirator assembly includes an internal aspirator portion 530 and the external housing portion 531 with pylons 521. After each airbag is filled and the pressure in the airbag reaches a design value, such as 3 psi, the flow into the airbag stops. After that, the occupant compresses the airbag during a crash, gas from the airbag flows out through gap 532 between aspirator metal disk 533 and diffuser 529. The cross section of this gap 532 is equivalent in area to the vent holes 498 (FIG. 88) normally present in a driver airbag. It means that airbag will not have vent holes and the gas will drained through gap 532.

When the flow reaches a sufficient pressure, the deployment cover opens and the airbag starts to deploy. The airbag in a folded initial state is connected to the surface of aspirator diffuser part 534 (part of the housing section 531). Gap 532, due to its relatively small area, holds the gas inside the airbag after the airbag is filled and the gas generator 524 has run out of propellant.

At the start of the gas generation, gas can flow out through the gap 532 if the cover fails to open. This can occur when the occupant is out of position pressing on the airbag deployment cover. In this case, the airbag will not deploy, thereby protecting the occupant from injury. After the airbag is inflated, gap 532 provides the proper flow resistance to control the motion of the occupant during the crash. The gap 532 thus replaces the one or more holes normally in the airbag.

FIG. 95 is a detailed drawing of the cross section of the driver side aspirated inflator of FIG. 89. The internal aspirator contour can be divided at three sections, the inlet section 526 behind the slit 523, the central section around the slit 523 and the diffuser section 529 after the slit 523 (FIGS. 94 and 95). The inlet section 526 can have a curved or straight contour. In the illustrated embodiment, the inlet section 526 is straight since this part is connected to the inlet part. The length of central part is defined by the jet gas dynamics parameters determined, for example, by simulation modeling. It also depends on the angles and the properties of the gas generator 524. The diffuser part 529 can have different diffuser angles and may have a different length at end portion as it can be seen in FIG. 94. The diffuser part 529 starts at, and is contiguous with, the end of the central section.

All parts of aspirator are preferably made from plastic by, for example, molding. The exception is two metal plates. Plastic detail part 535 covers the gas generator 524, forms aspirator tail part 536 and is used as fixation for slit metal plates (see FIG. 93).

FIGS. 96 and 98 are exploded views of the parts making up the aspirator assembly 511. Aspirator assembly 511 comprises a housing 550 which may substantially cylindrical with a cylindrical passage therethrough, a tail part 551 preferably made of plastic, a first disk 552 preferably made of metal, a gas generator 553 known to those skilled in the art to which this invention pertains, and a second disk 554 preferably made of metal. A pylon construction 555 is integral with housing 550. The plastic molded parts are shown as two parts, 550 and 551. The joining method for attaching parts 550, 551 and the remaining parts of the aspirator assembly 511 is not shown but can consist of a gluing and/or snapping together operation. Alternately, parts 550 and 551 are formed in one plastic molding operation where gas generator 535 and disks 552, 554 are inserted into the plastic mold before plastic is pumped in.

As shown in FIG. 97, the slit 556 and the shape of the wall 562 beyond the slit 556 are designed for obtaining the Prandtl-Meyer effect for the resultant flow of gas. The slit contour is formed by the two parts of the aspirator assembly 511 when they are connected as shown in FIG. 97 (one part being defined by disk 552 and the other by disk 554. Toroidal chamber 557 is a pressure distribution chamber where hot gas from gas generator apertures 558 flows out and has smooth contour 559 with no sharp edges. Chamber 557 is defined on one side (to the rear of the aspirator assembly 511) by the metal disk 554 and on the other side (to the front of the aspirator assembly 511) by the disk 552. The basic slit parameters are the slit width 560, two obtuse angles 561, 562 formed in the wall of disk 552 and the position of sharp edge 563 relative to the second angle 562. The combined angles determined the jet direction, spreading and position. The design of the angles 561, 562 is to keep jet attached to the aspirator wall (of disk 552) when it flows out of the slit 556. The attached jet can be achieved by using only one angle, but in that case, the jet will separate from the wall (of disk 552) at low pressure which does not happen in the slit design with two angles.

FIGS. 99-101 illustrate additional details of the airbag module of FIG. 25 without the airbag and airbag deployment cover. The airbag and steering wheel assembly, designated 609 in FIGS. 99-101, is shown generally in FIG. 99 and its cross sections in FIGS. 100 and 101 and comprises an aspirator or aspirator assembly 610, a steering wheel 611, an aspirator reverse flow valve 612, a gas generator 613, a gas generator electric plug 614, an aspirator diffuser 615, aspirator pylons 618 and external connection 617 to connect the pylons to the steering wheel 611. The diffuser 615 of the aspirator 610 may be considered to constitute a housing that has one or more walls that define an outer surface of the aspirator 610 and an inner surface that defines a flow passage between opposite end regions (an inlet end region being to the right in FIG. 101 and an outlet end region being to the left in FIG. 101).

An important improvement of this invention is in the design of the aspirator 610. The aspirator 610 is designed using the Prandtl-Meyer effect as described herein.

Operation of the assembly 609 to inflate an airbag whose interior is in flow communication with a passage defined by the housing (diffuser 615) of the aspirator 610 is as follows. The gas generator 613, which may have any structure and triggering mechanism known to those skilled in the art to which this invention pertains, begins generating gas after receiving a signal from an airbag sensor and diagnostic module (not shown) through the plug 614 which is connected to cylindrical gas generator 613 (collectively referred to as an activation system). The airbag sensor and diagnostic module may have any structure and characteristics known to those skilled in the art to which this invention pertains and the particular type is not critical to the invention. When installed in a vehicle, plug 614 connects the gas generator to the sensor and diagnostic module which, in a crash, provides current to initiate the gas generator causing gas to flow into a passage (see FIGS. 100, 101, 103 and 104).

Figure 102:
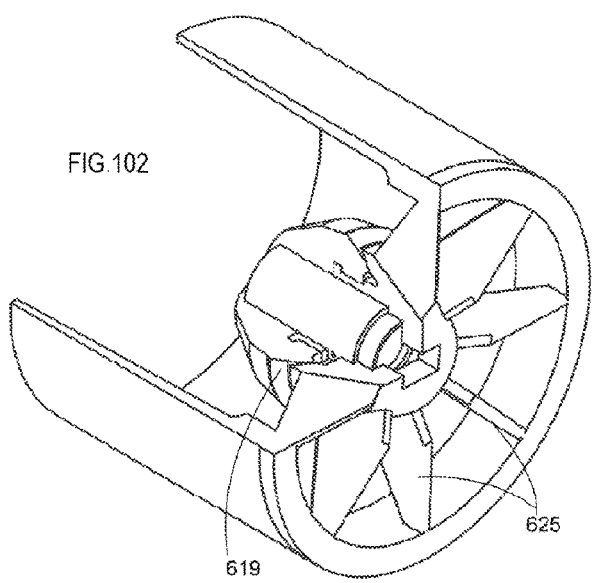
FIGS. 102-106 are detailed drawings of cross sections of the driver side aspirated inflator of FIG. 25.
Figure 103:
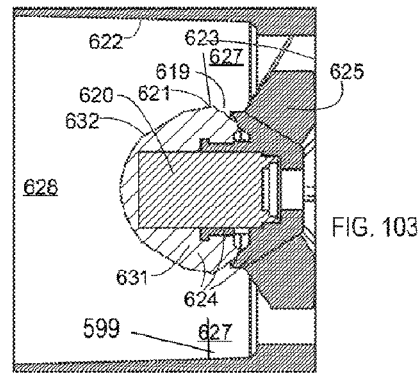
Figures 105, 106:
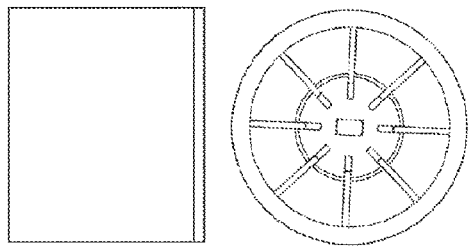
Figure 104:
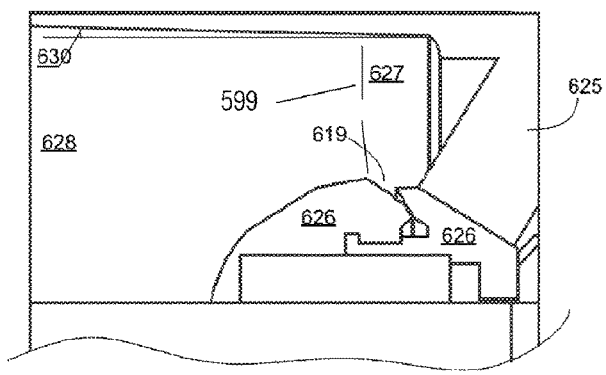

Gas generator 613 continues its generation of gas which then begins to cause injection of inflating gas through a circumferential slit 619 shown in FIGS. 102-104 (wherein the gas generator is designated 620). Due to the Prandtl-Meyer flow effect, the jet outflow from slit 619 attaches to a wall 621 and spreads across the flow channel defined between the wall 621 and opposite wall 622. Wall 621 is the wall closer to the outlet end region of the aspirator whereas wall 622 is the wall closest to the inlet end region of the aspirator. The high velocity jet creates a low pressure area after the slit 619 in the aspirator internal space defined by the diffuser parts 622, 628. Simultaneously, the reverse flow valve shown at FIG. 102 as 623 is opened by the ambient aspirated gas flow. The reverse flow valve 623 (which includes flaps that initially close the main flow passage or channel) are opened due to the pressure drop behind the slit 619 when gas begins to flow from the gas generator 620. Thus, ambient air will be sucked inside aspirator 624 through an inlet port of the aspirator 624 defined by the space between the pylons 625.

In this design, the aspirator 624 consists of two parts and is thus more accurately referred to as an assembly, an internal one is aspirator portion 622 and the external one is housing portion or section 626 with the reverse flow valve 623 (which defines the flaps) and pylons 625. The reverse flow valve 623 operates to allow aspirated ambient air to flow only in one direction, i.e., to fill the airbag(s) whose interior is in flow communication with the passage in the aspirator 624. After the airbag is filled and the pressure in the airbag reaches a design value, such as 3 psi, the flow into the airbag stops and the reverse flow valve 623 closes. This airbag pressure will return flaps (FIG. 102) of the reverse flow valve 623, which are similar to a membrane, to their initial position blocking inflow of air from the vehicular compartment through the inlet port defined between the pylons 625.

The reverse flow valve 623 (646 in FIG. 115) is preferably constructed of a pliable material such as, but not limited to, a plastic film or fabric. One or more flaps 658 (FIG. 115) are formed by, for example, cutting the material, such as to form four or more flaps. Similarly, parts of the gap 657 between adjacent flaps 658 are formed by cutting the material in the center, and also possibly causing a thinner region to be present in the center. The reverse flow valve 623, 646 may have characteristics and properties like a membrane.

Initially, the reverse flow valve 623 remains closed for a short period until sufficient pressure is attained to open the airbag deployment cover. Then, the reverse flow valve 623 opens allowing gas to be drawn into the passage defined by the housing section 627 of the aspirator assembly 624 providing the gas flow needed to inflate the airbag in flow communication with the passage. When the flow reaches a sufficient pressure, the deployment cover opens and the airbag starts to deploy. The airbag in a folded initial state is connected to the surface of aspirator diffuser part 628 (part of the housing section 627). The reverse flow valve 623 returns to its initial position and holds the gas inside the airbag after the airbag is filled and the gas generator 620 has run out of propellant.

When the reverse flow valve 623, 646 is closed at the start of the gas generation, gas can flow out through the hole (gap 657) in the reverse flow valve 646 if the cover fails to open. This can occur when the occupant is out of position pressing on the airbag deployment cover. In this case, the airbag will not deploy, thereby protecting the occupant from injury. After the reverse flow valve 646 closes when the airbag is inflated, the hole (gap 657) in the reverse flow valve 646 provides the proper flow resistance to control the motion of the occupant during the crash. The hole (gap 657) in the reverse flow valve 646 thus replaces the one or more holes normally in the airbag.

FIG. 104 is a detailed drawing of the cross section of the driver side aspirated inflator of FIG. 99. The internal aspirator contour can be divided at two sections, the inlet section 627 (from aspirator inlet plane to slit plane 599, it must be mentioned that slit plane is the narrowest part inside aspirator tract, marked as dashed line 599 in FIGS. 103 and 104) and the diffuser section 628 (from slit plane to aspirator outlet plane) both are shown in FIGS. 103 and 104. The inlet section 624 can have a curved or straight contour. In the illustrated embodiment, the inlet section 627 is straight since this part is connected to the inlet part containing the reverse flow valve 623. The length of both parts 627 and 628 are defined by, for example, the jet gas dynamics parameters determined by simulation modeling. It also depends on the angles and the properties of the gas generator 620. The diffuser part 630 can have different angles and may have a different length at its end portion as seen in FIG. 104.

All parts of aspirator are considered to be made from plastic by molding. Plastic part 631 covers gas generator, and forms aspirator tail part 632.

An important feature of embodiments of the invention is the aspirator material. In other embodiments, the aspirator or aspirator slit are typically made partly or entirely from metal because of the relatively high gas temperature flow out of gas generator. If duration of gas flow out of gas generator will be only about 30 ms, other materials may be used instead of metal. If hot gas will flow out of gas generator during 30 ms, plastic slit melting will not have time to happen. In this case, plastic aspirators can be used, with the slit geometry remaining the same as for a metal aspirator. The specific plastic material that can be used is dependent on the gat temperature and the exposure time of the gas to the material. It is contemplated that to construct this embodiment, one would conduct an experiment to determine the gas temperature and exposure time of the material to the gas, and then select an appropriate plastic material or combination of plastic materials to use. Different inflating gases may result in different materials to use.

If hot gas melts plastic slit (if hot gas flows out more than 30 or 50 ms), this design can be used with additional slit protection. A thin metal coating plated thereon, or otherwise integrated thereto, can be used. In this manner, hot gas will burn the metal coating or layer, but will not deform the slit contour, i.e., change the slit angles. Other materials than metal, than will burn off, but protect the plastic underlayer, may also be used without deviating for the scope and spirit of the invention.

Figure 116:
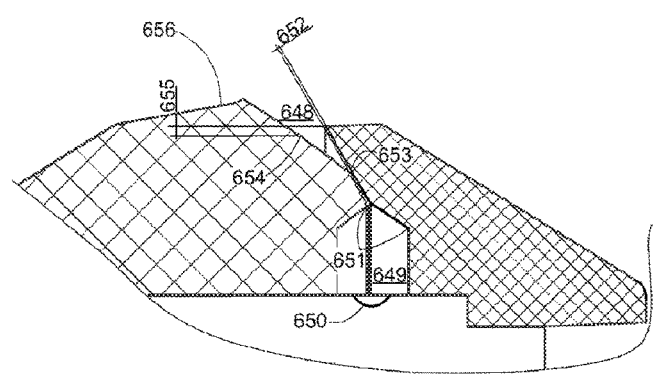
FIG. 116 shows basic geometric dimensions and critical points in slit design.
Figure 117:
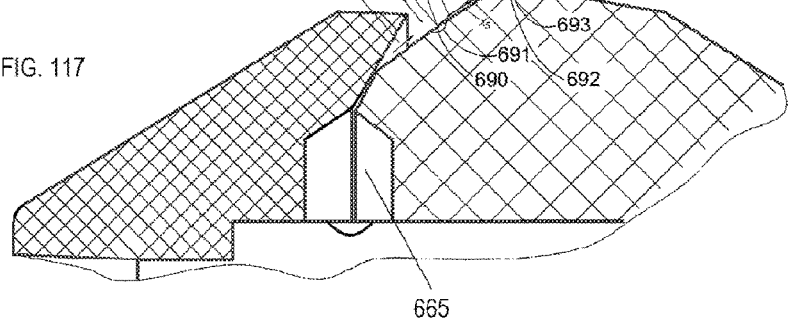
FIG. 117 is a detailed drawing of the Prandtl-Meyer flow at the aspirator slit.

FIGS. 107-114 are detailed drawings of plastic aspirator parts 633, 634 forming the slit 619 of FIG. 103 (and 60 in FIG. 117). FIG. 107 shows an internal design of the plastic part 633 wherein windows 635 are channels for hot gas flow from gas generator, and projection 636 is for fixing parts 633, 634 and keeping the slit width constant. The pressure distribution chamber 649 (from FIG. 116) is represented by closed chamber or channel 637 (637 shows only half of pressure distribution chamber) and is formed by suitable design of the aspirator parts 633, 634.

FIGS. 107-114 represent the following fixation design: projection part 636 of aspirator part 633 inserted into grooves 638 through passages 639 of aspirator part 634 and then rotated 45 degrees until a bump is situated in a small groove 641.

Special eight ridges 642 are used for fixing spacing of the slit (FIGS. 111-114). In FIGS. 99-101 and 117-128, these ridges 642 are not shown, but may be present.

The slit spacing can be alternatively or additionally controlled by providing radial ridges (not shown) which can control the spacing and geometry of the slit. Another type of connection between parts 633 and 634 is shown in FIGS. 118-121. The number of passages 639 (and their width and length) and pylons 643 can vary depending on the application of the aspirator.

Figure 115:
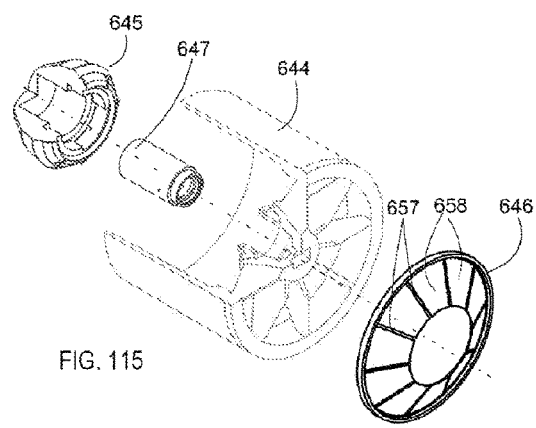
FIG. 115 is an exploded view of the aspirator parts.

FIG. 115 is an exploded view of parts making up the aspirator assembly 610 of FIG. 99. Aspirator assembly 610 comprises a housing part 644 which may have a substantially cylindrical form with pylons and its internal part defines half of the slit contour, tail part 645 which defines second half of the slit contour (both parts are made from plastic), a reverse flow valve 646 and gas generator 647. All parts are preferably made from plastic, excluding the gas generator. The joining method for attaching parts 644, 645 and the remaining parts of the aspirator assembly 610 is shown at FIG. 117, and entails a gluing or snapping together operation, not depicted. Alternately, parts 644 and 645 are formed in one plastic molding operation where the gas generator 647 is inserted into the plastic mold before the plastic is pumped in.

As shown in FIG. 116, the slit 649 and the shape of the wall beyond the slit 649 are designed to obtain the Prandtl-Meyer effect for the resultant flow of gas. The slit contour is formed by the two parts of the aspirator assembly 610 when they are connected as shown in FIG. 116 (one slit part being defined by part 644 and the other by 645). A toroidal chamber 649 is a pressure distribution chamber where hot gas from gas generator holes 650 flows out and has a smooth contour 651 with no sharp edges. Chamber 649 is defined on one side (to the rear of the aspirator assembly 610) by the part 644 and on the other side (to the front of the aspirator assembly 610) by the surface of 645. The basic slit parameters are the slit width 652, two obtuse angles 653, 654 formed in the wall of part 645 and the position of sharp edge 655 relative to the second angle 654. The combined angles determined the jet direction, spreading and position. The design of the angles 653, 654 keeps the jet attached to the aspirator wall (of 656) when it flows out of the slit 649. The attached jet can be achieved by using only one angle, but in that case, the jet will usually separate from the wall (of part 645) at low pressure, which does not happen in the slit design with two angles.

There are some marked differences between shock waves and expansion fans. Across a shock wave, the Mach number decreases, the static pressure increases, and there is a loss of total pressure because the process is irreversible. Through an expansion fan, the Mach number increases, the static pressure decreases and the total pressure remains constant. Expansion fans are isentropic.

Figure 118:
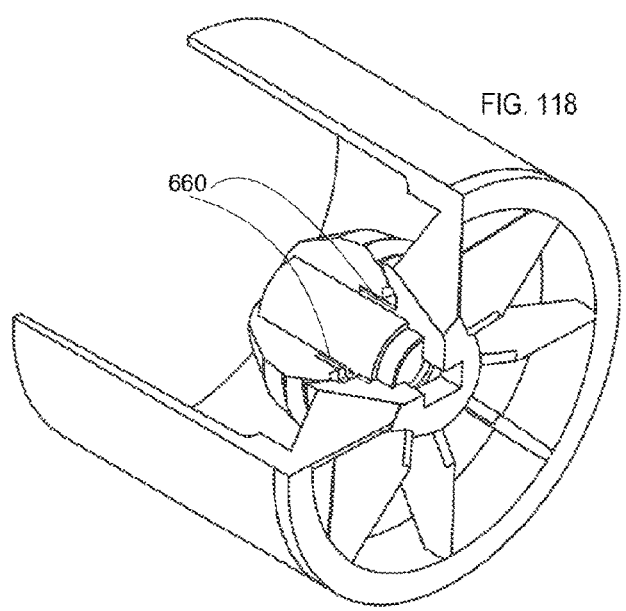
FIGS. 118-121 show different variations of plastic aspirator connections.
Figure 119:
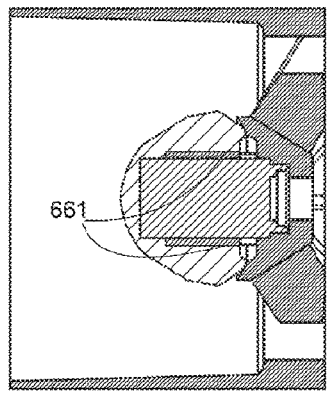

FIG. 118 shows thread connection 660 between plastic aspirator parts: length and thread step can be different. Thread connection can be changed by gluing (represented by an adhesive 661) of the same surfaces (FIG. 119).

Figure 120:
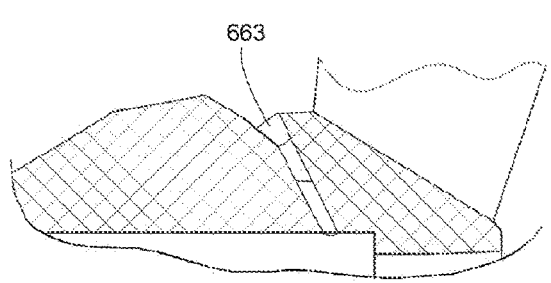
Figure 121:
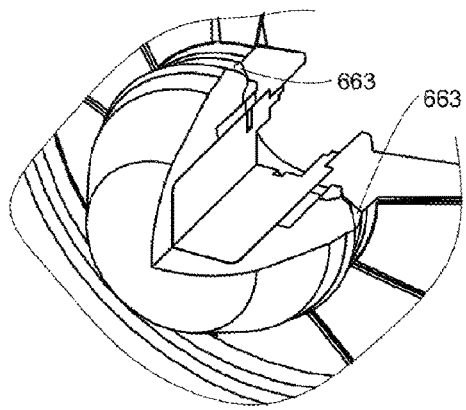

FIGS. 120 and 121 show an aspirator design where discrete, separated nozzles 663 are used in place of the elongated slit 662 (FIG. 117). The number, diameter, shape and location of nozzles 663 can be determined using, for example, computational fluid dynamics modeling. Nozzles have the advantage that it is easier to manufacture accurate holes (each of which constitutes one nozzle) than to maintain an accurate slit around its length and circumference. For FIG. 121, it is assumed that the aspirator has six nozzles. Otherwise, the operation of an aspiration module for an airbag using nozzles is essentially the same as one using a slit.

FIG. 117 shows the downstream portion of the particular shape of the wall along which the gas flows. The elements are similar to those in FIG. 17 with the following correspondence: 690:45; 691:42; 692:46; 693:43; and 694:47.

FIG. 120 illustrates the jet internal contour. It narrowest part is in the end near hot gas inlet nozzle 663 and has a slight taper along its axis. The direction of the channel taper can be in an opposite direction, or this channel can have a cylindrical form.

FIGS. 122-128 illustrate internal plastic passenger aspirator designs without the airbag and cover. The aspirator cross section is shown generally at FIGS. 122 and 123 and comprises aspirator or aspirator assembly 670, housing 672, nose fairing 673, gas generator 674, inlet mesh 675 and tail part 676. Aspirator assembly 670 includes the housing 672 that has an outer surface with two generally parallel parts and an inner surface or wall with variable cross-section that defines a flow passage.

Air from the ambient atmosphere (e.g., the vehicle passenger compartment) is designed to flow through the reverse flow valve 677 during use into and through the inlet portion 800 to the area defined by the aspirator diffuser part 679 (FIG. 122).

The position of standard gas generator is shown as 674 and has a circular shape. Hot gas from gas generator will flow along slit, i.e., between slit forming surfaces 680 and 681 (FIG. 123).

FIGS. 124-128 represent a preferred slit design and connection between parts 673 and 676. FIG. 124 shows the aspirator in its assembled state. Parts 673 and 676 are considered to be made from plastic by, for example, casting. These parts can be connected by, for example, rivets 683 of the fairing part 673 and are tightly fixed in grooves 683 of the tail part 676 by, for example, glue. Surfaces 684 are typically glued to surfaces 685 so the glue surfaces must be tangent to the gas generator.

Hot gas flows out from gas generator holes 686. Hot gas fills all of the space and flows in closed channel 687 and has no contact with glued surfaces. Channel 687 is closed by walls 688.

Figure 129:
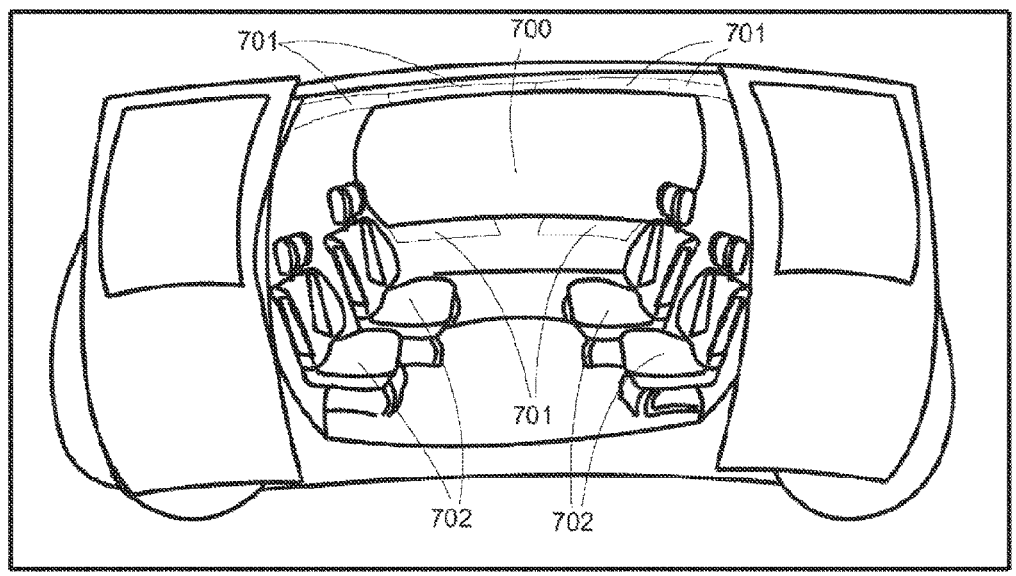
FIGS. 129 and 130 show another type of autonomous vehicle (with no driver seats) where the occupant seats are located opposite to each other.
Figure 130:
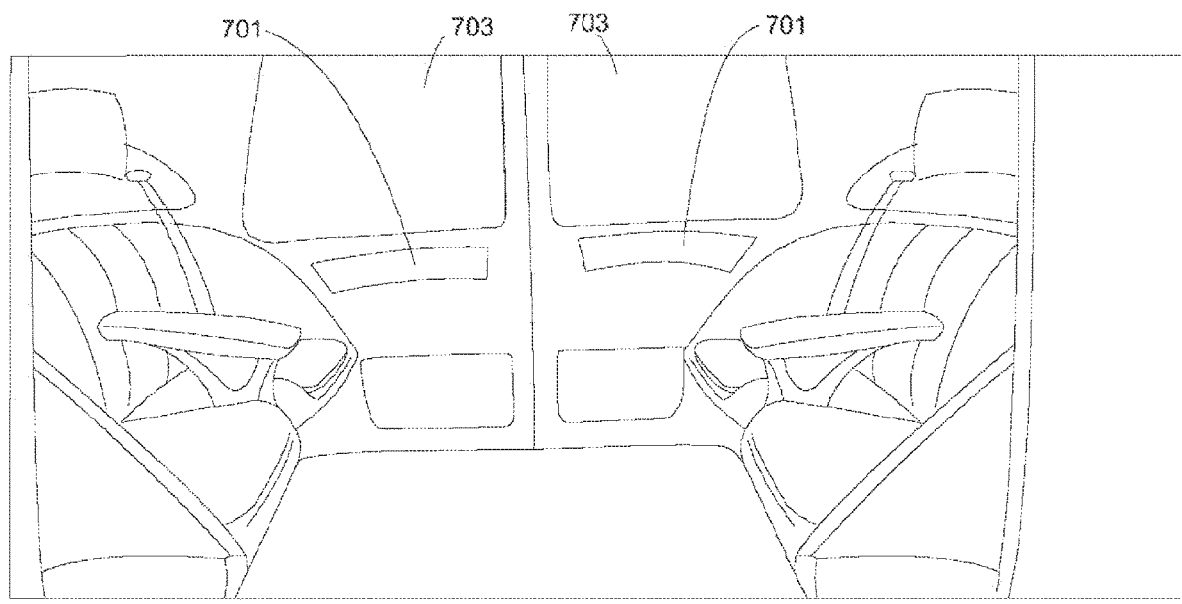

A main concept for autonomous vehicles shown in FIGS. 129 and 130 is that the inside of the vehicle will look like a general open space rather than a typical car without a driver seat. In the vehicle embodiment shown in FIG. 129, the occupant seats 702 are located opposite to each other; every seat 702 can have its own seatbelt although seatbelts may be entirely eliminated. Airbags are housing in mounting structure 701 and deploy alongside the window 700 (FIG. 129) or windows 703 (FIG. 130).

Figure 131:
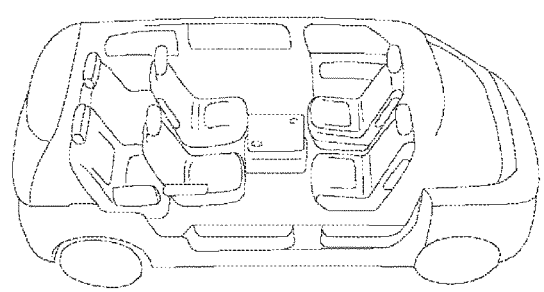
FIGS. 131 and 132 show other types of seat location in an autonomous vehicle.

In another embodiment, people can move around in the interior compartment defined by a frame of the vehicle and move the seats around as their needs demand. In one case, the seats can all face each other around a central table (see FIG. 131) and in another situation, they can turn into a sofa where people might sleep. Therefore, the airbags will need to fill the vehicle and protect the occupants regardless of where they are or what they are doing.

Side curtain airbags can cover all external surfaces of the vehicle passenger compartment, i.e., deploy in the interior passenger compartment alongside the windows of the vehicle and other structure defining the passenger compartment. Also, in contrast to some previous driver and passenger airbag systems, venting of the airbags is not required. The airbags will deploy when deployment is determined by be necessary by a suitable airbag deployment control mechanism, and expand until they are full or until they contact an occupant. That is, they will stop deploying as soon as the pressure in the airbag exceeds a design pressure value, such as 3 psi.

Figure 133:
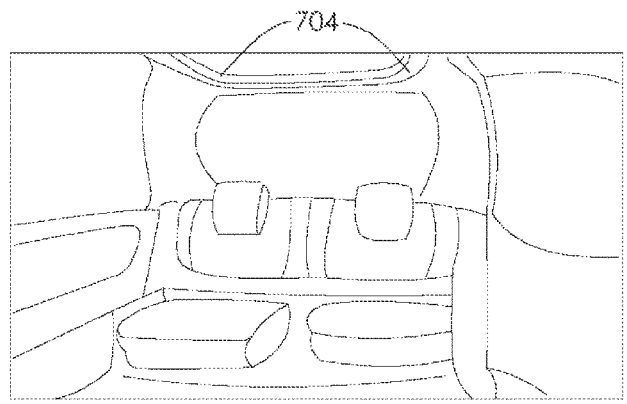
FIG. 133 shows the location of the curtain airbags in an autonomous vehicle.
Figure 132:
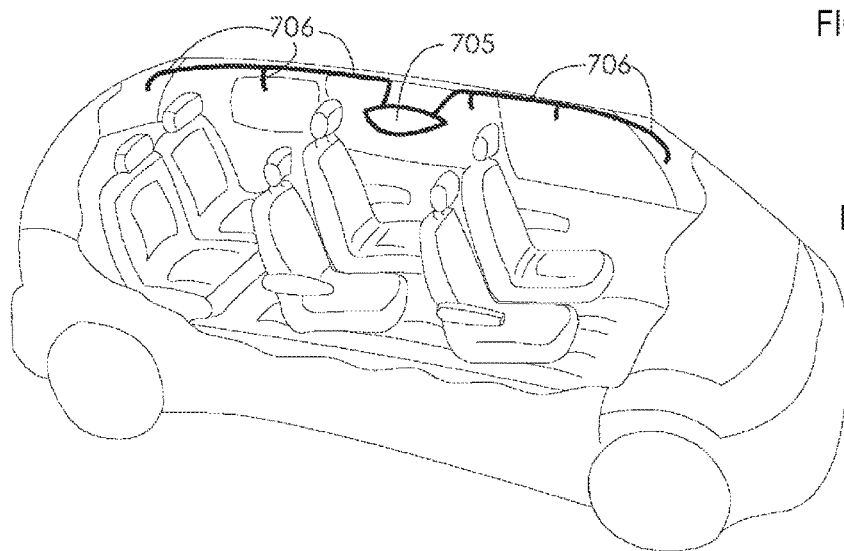
Figure 134:
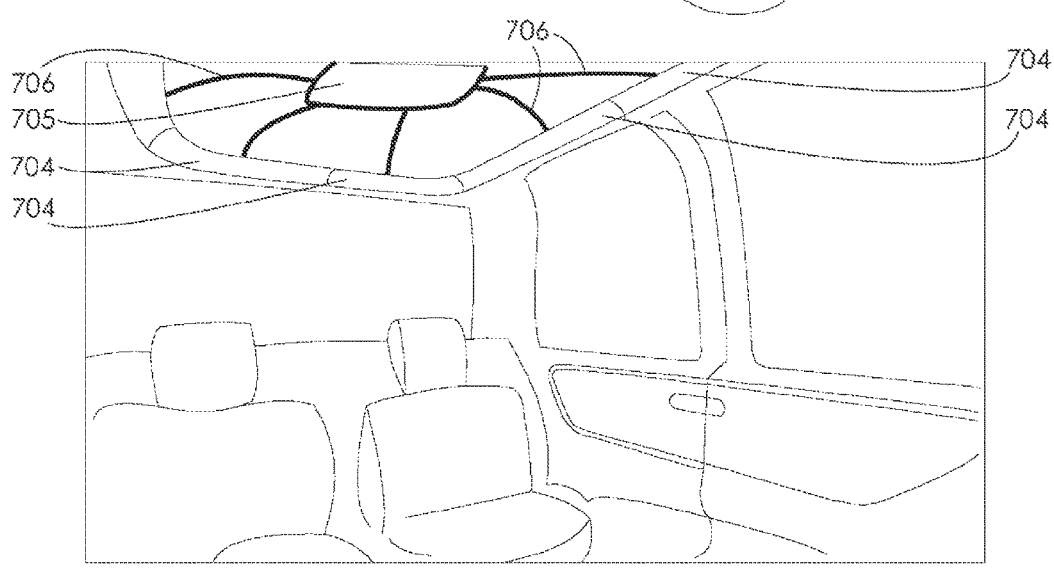
FIG. 134 shows the gas generator location and conduits to the airbags in an autonomous vehicle.

In the typically traditional case, each airbag will have its own inflator. In the simplest configuration, one gas generator 705 can be installed in the ceiling and used to deploy all the peripheral (side curtain) airbags 704 (FIGS. 132 and 133). In this case, there could be one or more metal tubes 706 (FIGS. 132 and 134) that lead to each airbag from the centralized gas generator 705. Alternatively, each airbag 704 can have its own gas generator feeding into its aspirator. This has an advantage in that the gas will cool somewhat while it flows to the airbag 704. Thus, the gas which inflates each airbag 704 will be cooler and thus will not contract as much once in the airbag 704. Now, side curtain airbags frequently combine compressed gas with gas generator gas so that the gas filling the airbag 704 is cooler than the gas generator gas and the airbag retains its pressure for a longer time. This is so that when a vehicle rolls over, the airbags continue to offer some continuous protection. Hence, the recognized 5+ second gas retention requirement.

Figure 135:
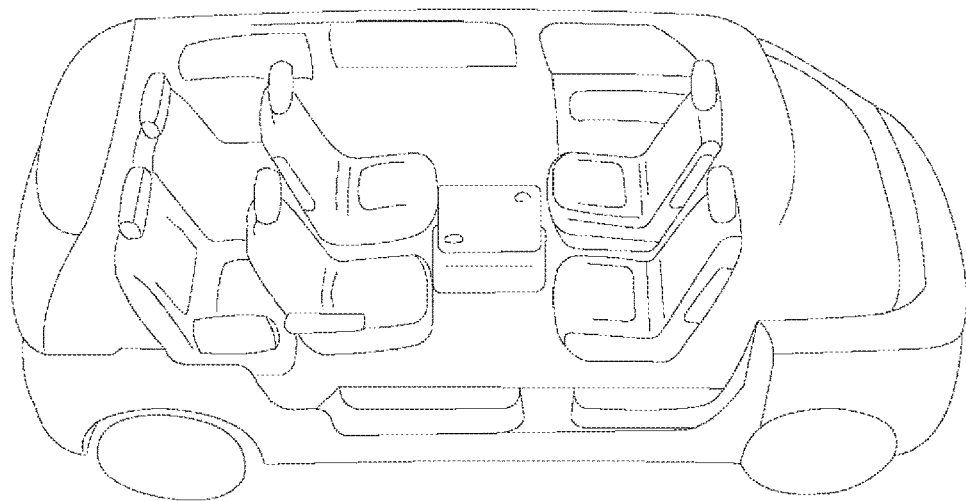
FIG. 135 illustrates another seat arrangement in an autonomous vehicle.
Figure 136:
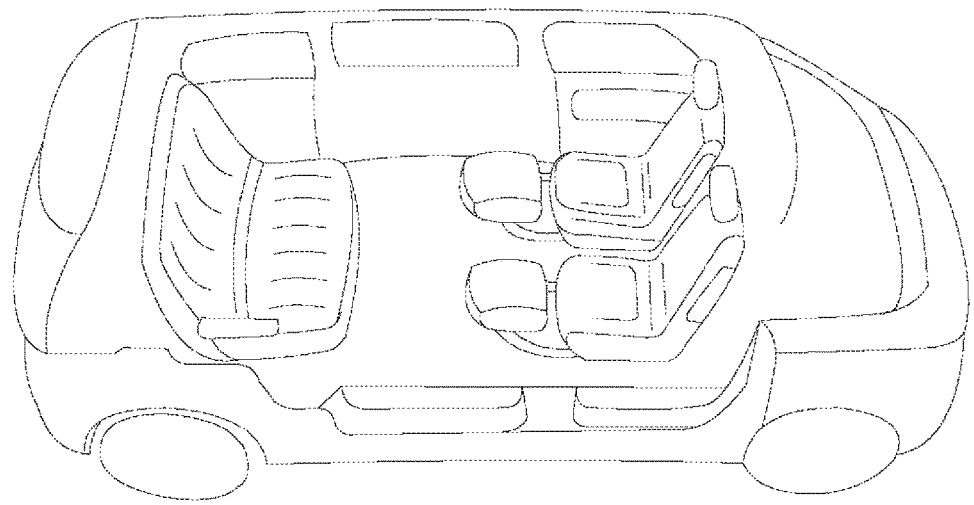
FIGS. 136 and 137 is an autonomous vehicle design where the occupant seats can be used for sleeping, as they form a sofa or elongated seats.
Figure 137:
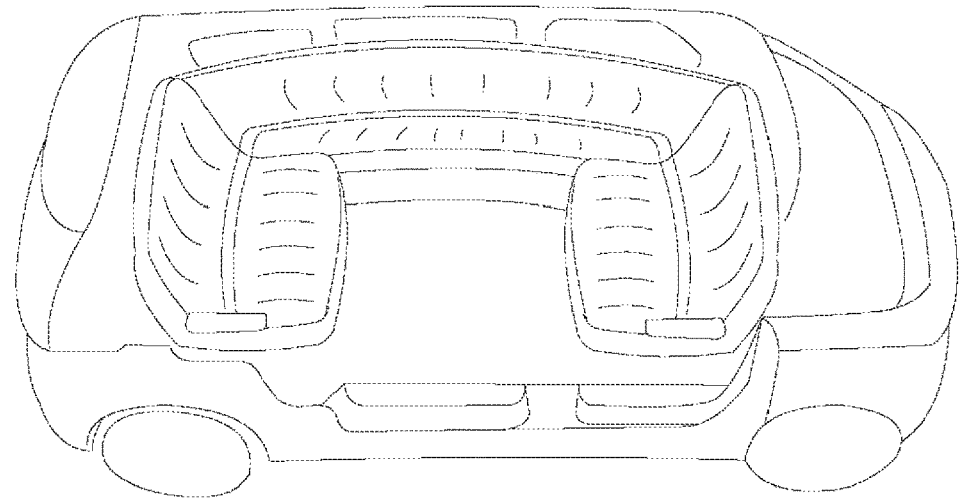

Different types of seating arrangements in autonomous vehicle are shown in FIGS. 135-137. A feature of autonomous vehicle is lack of driver seat, thus, occupants can be seated facing each other despite the vehicle moving direction. Standard occupant seats can be replaced by sofa seats (FIG. 136) which allow occupant to sleep or be in any other free position. Also, the vehicle can have one combined sofa seat which will be located along the sides of vehicle (FIG. 137).

Figure 139:
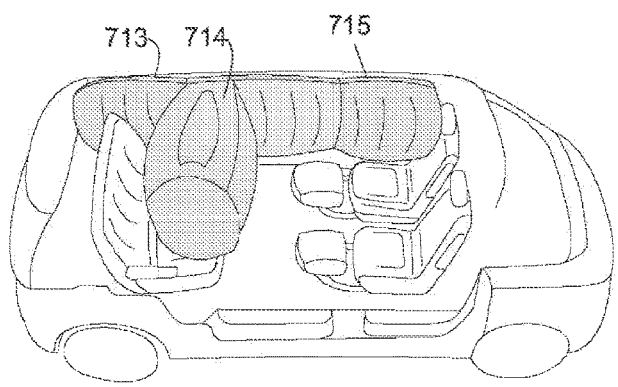
FIG. 139 is a perspective view with portions removed of a vehicle having several deployed airbags.
Figure 142:
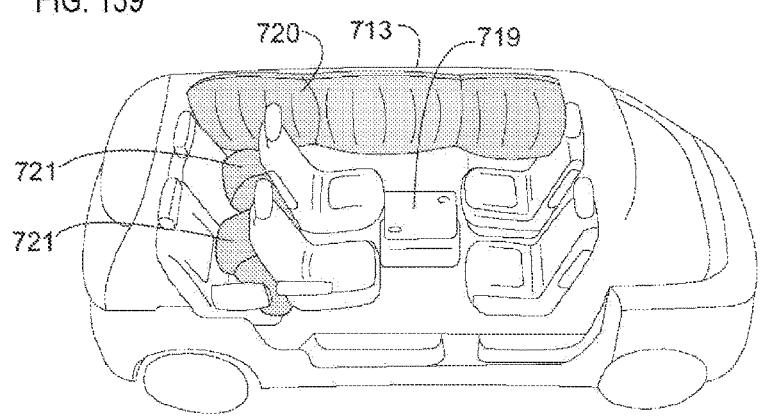
FIG. 142 is a perspective view with portions removed of a vehicle having deployed airbags.
Figure 147:
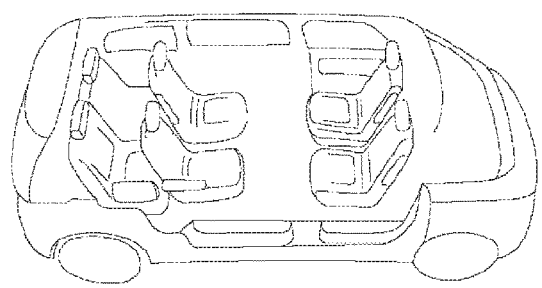
FIG. 147 shows another type of interior seat location in an autonomous vehicle.
Figure 149:
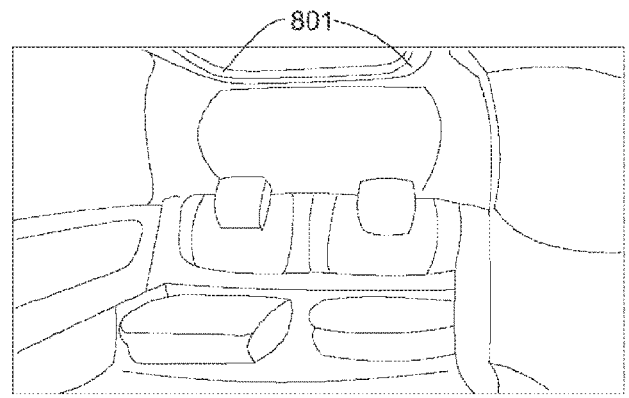
FIGS. 148 and 149 show the location of the airbag system in the ceiling in an autonomous vehicle in accordance with the invention.
Figure 148:
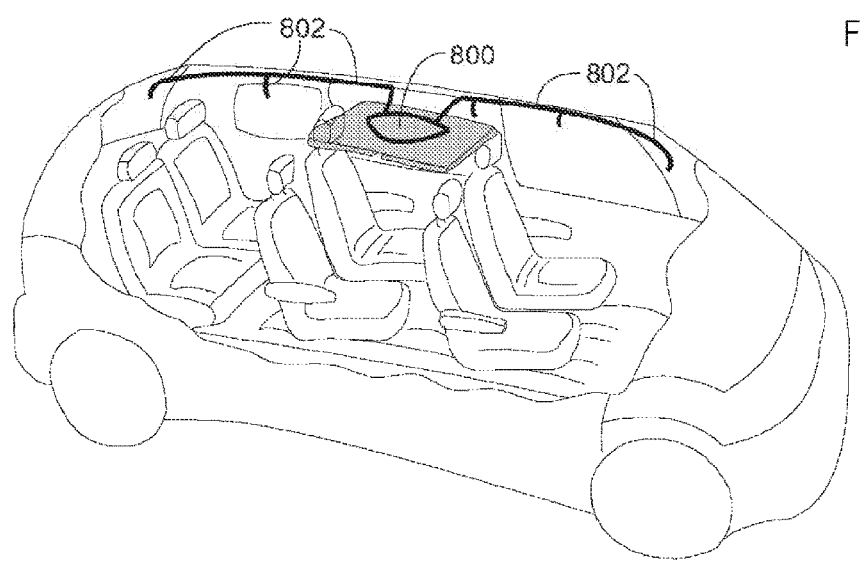
Figure 150:
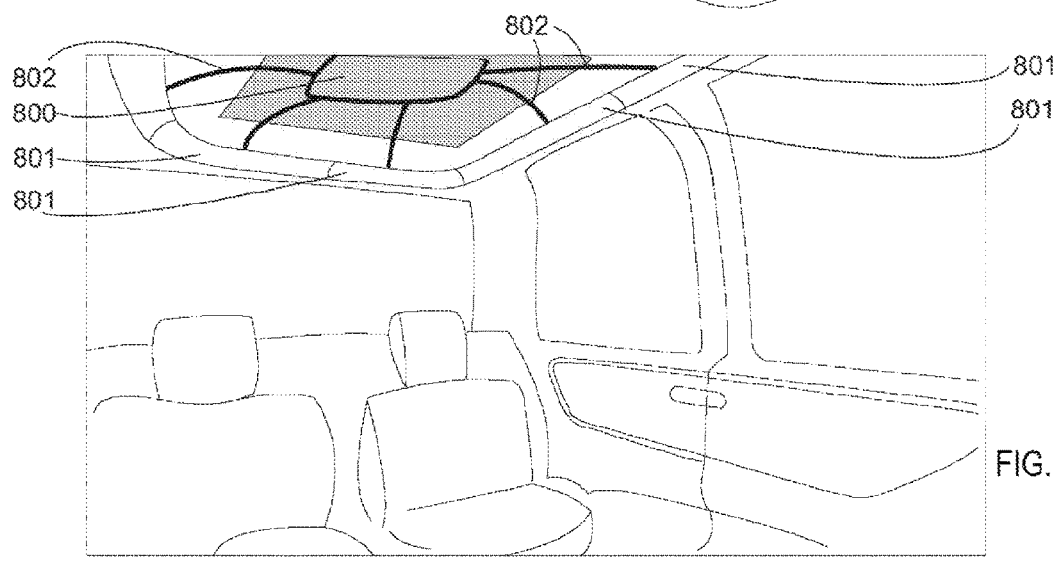
FIG. 150 shows the airbag system with airbag locations and conduits to the airbags in an autonomous vehicle in accordance with the invention.

The airbag systems shown in FIGS. 139 and 142 include an airbag 714 deploying from the ceiling, and airbags 721 deploying from the back of the front seat (if such seats are in the vehicle design). Airbag modules can be mounted at other locations in the passenger compartment such as the lower instrument panel, if present, for knee protection or the ceiling for driver protection or rear passenger protection.

Figure 140:
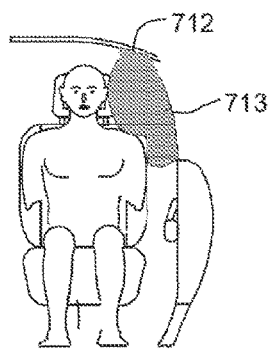
FIG. 140 is a view of a preferred embodiment of the invention shown mounted in a manner to provide head protection for a front and a rear seat occupant in side impact collisions and to provide protection against impacts to the roof support pillars in angular frontal impacts.

Several different airbags are shown for protecting occupants of the vehicle, i.e. the side airbag 713 shown in FIGS. 139 and 140 and the front seat airbag 721 shown in FIG. 142. Simultaneous deployment of any combination of or even all of these airbags may be initiated by the sensor and diagnostic module upon determining that a crash requiring deployment of such airbag(s) is required. Thus, the sensor and diagnostic module may determine that deployment of only the front airbag and the side airbag are desired, for example, in the case of a frontal crash, or possibly only the side and rear seat airbags in the event of a side impact. Accordingly, sensor and diagnostic module may be designed to detect or forecast frontal impacts requiring deployment of airbags as well as side impacts requiring deployment of airbags and rear impacts requiring deployment of airbags. Anticipatory sensors will most likely control the deployment of the airbags in autonomous vehicles.

A perspective view of a vehicle having several deployed airbags for both front and side protection is shown in FIG. 139. The vehicle includes protection airbags 713 and 714 each of which is coupled to an airbag module (not shown)

whereby each module may include one or more airbags as well as a gas generator for inflating the airbag(s), the airbag(s) being attached to and in fluid communication with the gas generator, and an initiator for initiating the gas generator in response to a crash of the vehicle. The airbag 714 has been deployed as well as the side head protection airbag 713.

In this case, the sensing system for controlling the deployment of the airbags, not shown but which is coupled to all of the airbag modules, detected or forecasted that the crash had an angular component which might have resulted in head injuries to the occupant from impacts with airbag 720, front seat airbag 721 or airbag 714 of the vehicle, so the sensing system determined that deployment of the side head protection airbags 720 and 713 was warranted, along with deployment of the frontal protection airbags 714. The front passenger seat was unoccupied, which was detected by the occupant presence or position sensor, not shown, and therefore the corresponding frontal protection airbag 714 and left side protection airbags (not shown) were not deployed. Since both rear seats were occupied, the appropriate seat protection airbags were deployed.

It is thus possible to selectively control or determine which airbags of a plurality of airbags, e.g., side/head protection airbags, frontal protection airbags, in a passenger compartment of a vehicle should be deployed depending on the crash conditions to thereby avoid unnecessary airbag deployment. Although the sensing system which determines which airbags require deployment is not shown, this system may include or be connected to occupant sensing means for sensing which seats are occupied. Such occupant sensing means may operate through weight sensing, wave-based sensing, and the like, which techniques are known to those skilled in the art to which this invention pertains.

The airbags disclosed are examples of multi-chambered airbags that are deployed from the ceiling and examples of the use of tubular or cellular airbags. These designs should become more widely used as protection is sought for other situations such as preventing occupants from impacting with each other and when developments in autonomous vehicles are implemented. In some cases, in additional to support from the ceiling, these airbags will sometimes be attached to other surfaces in the vehicle such as the A, B and C pillars in much the way that some curtain airbags now receive such support.

Figure 138:
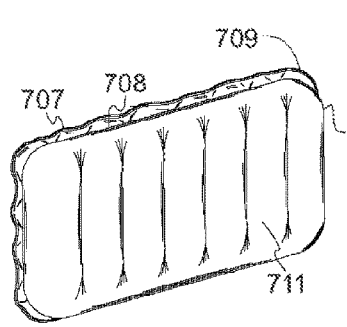
FIG. 138 is a perspective view of an airbag where the airbag is formed from tubes.

One method of forming an airbag is illustrated generally at 707 in FIG. 138. In this implementation, the airbag is formed from two flat sheets or layers of material 709, 710 which have been sealed, e.g., by heat or adhesive, at joints 708 to form long tubular shaped mini-airbags 711 (also referred to herein as compartments or cells) in much the same way that an air mattress is formed. In FIG. 138, a single layer of mini-airbags 711 is shown. It should be understood that the mini-airbags 711 are interconnected to one another to allow the inflating gas to pass through all of the interior volume of the airbag 707. Also, the joints 708 are formed by joining together selected, opposed parts of the sheets of material 709, 710 along preferably parallel lines whereby the mini-airbags 711 are thus substantially straight and adjacent one another. In other implementations, two or more layers can be used. Also, although a tubular pattern has been illustrated, other patterns are possible such as concentric circles, waffle-shaped or one made from rectangles, or one made from a combination of these geometries or others. The airbag 707 may be used as either a side airbag extending substantially along the entire side of the vehicle, an airbag disposed down the center of the vehicle between the right and left seating positions or as a rear seat airbag extending from one side of the vehicle to the other behind the front seat (see FIG. 139) and may or may not include any of the venting arrangements described herein.

FIG. 139 is a perspective view with portions removed of a vehicle having several deployed airbags 713, 714, 715. Specifically, a single airbag having several interconnected sections, not shown, spans the left side of the vehicle and is deployed downward before being filled so that it fits between the front seat and the vehicle side upon inflation (an airbag spanning the right side of the vehicle can of course be provided). This provides substantial support for the airbag and helps prevent the occupant from being ejected from the vehicle even when the side window glass has broken.

Side Curtain Airbags

In FIG. 140, a single side protection airbag for occupants in automotive vehicle is illustrated at 713. A single airbag is used for protection of the front and rear seat occupants in side impacts and is illustrated at 715. With respect to the positioning of the side airbag 713, the airbag 713 is contained within a housing 712 which can be positioned entirely above the window of the side doors prior to deployment, i.e., no portion of it extends down the A-pillar or the B-pillar of the vehicle. The side airbag housing 712 thus includes a mounting structure (not shown) for mounting it above the window to the ceiling of the vehicle and such that it extends across both side doors and thus protects the occupants sitting on that side of the vehicle from impacting against the windows in the side doors. To ensure adequate protection for the occupants from side impacts, as well as frontal impacts and roll-overs which would result in sideward movement of the occupants against the side doors, the airbag housing 712 is constructed so that the airbag 405 is initially projected in a downward direction from the ceiling during inflation and extends at least substantially along the entire side of the ceiling. This initial projection may be designed as a property of the module 712 which houses the airbag 713, e.g., by appropriate construction and design of the module and its components such as the dimensioning the module's deployment door and deployment mechanism.

FIG. 140 is a view looking toward the rear of the vehicle of the deployed side protection airbag of FIG. 139. The upper edge of the airbag is connected to an inflator in housing 712 and the airbag 713 covers the height of the window in the door in this implementation.

Figure 141:
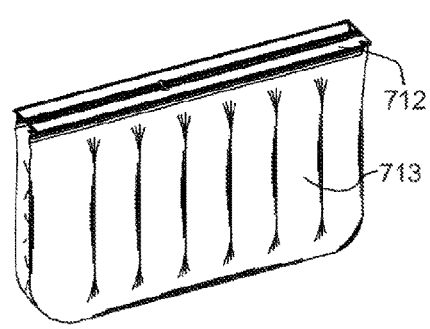
FIG. 141 is a view of the side airbag with the airbag removed from the vehicle.

FIG. 141 is a view of a side airbag similar to the one of FIG. 140 although with a different preferred shape, with the airbag 405 removed from the vehicle. The parallel compartments or cells can be seen.

FIG. 142 is a perspective view of another preferred embodiment of the airbag of this invention 713 shown mounted in a manner to provide protection for a front and a rear seat occupant in side impact collisions and to provide protection against impacts to the roof support pillars in angular frontal impacts and to offer some additional protection against ejection of the occupant.

More particularly, in this embodiment, an airbag system for protecting at least the front-seated occupant comprises a single integral airbag 713 having a frontal portion 714 sized and shaped for deploying in front of the front facing occupant and behind a table 719 (as in FIG. 139) and a side portion 720 sized and shaped for deploying to the side of the front facing occupant. In this manner, airbag 713 wraps around the front facing occupant during deployment for continuous front to side coverage. An inflator (not shown) is provided for inflating the single integral airbag with gas. As shown, the side portion 720 may be sized and shaped to deploy along an entire side of the vehicle, the side portion 720 is longer than the frontal portion 714 and the frontal portion 714 and side portion 720 are generally oriented at a 90 degree angle relative to each other. As with the other side curtain airbags discussed in connection with FIGS. 139-142, the airbag 713 may be housed in the ceiling. The construction can also comprise straight or curved interconnected cells or tubular structures.

Figure 143:
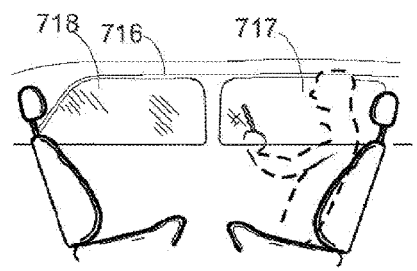
FIG. 143 is a side view of the interior of a vehicle provided with another form of safety device in accordance with the invention, before the safety device moves to the operative state.

FIG. 143 illustrates another embodiment of the invention intended to provide protection from side impacts and rollover accidents not only for a person in the front seat of a motor vehicle such as a motor car, but also for a person in the rear seat of the vehicle which is similar to that shown in FIGS. 139-141.

There are of course many ways of making ceiling-mounted frontal protection airbags using chambers without departing from the teachings of this invention such as disclosed in published patent applications WO03093069, US20030234523 and US20030218319, incorporated by reference herein along with their corresponding US patent publications. Such airbags can be made from tubular sections or sections of other shapes and the amount of deployment of such airbags can be determined by occupant sensors as disclosed in other patents assigned to the current assignee of this application. Such airbags can be flat as disclosed herein or other shapes.

For curtain airbags, a collapsible sleeve can be provided as a substitute for or in addition to a reverse flow valve for an aspirator described herein. Since curtain airbags must remain inflated for about 5 seconds or more, the reverse flow valve may not provide sufficient resistance to the flow out of the airbag and a more positive sealing system is needed, an example of which is shown in FIGS. 144-146.

Specifically, reverse flow valve functionality in a form of flexible tube (sleeve) is shown in FIGS. 144-146. Tube 731 can be made from fabric material and has seams 733 (FIG. 146) on its sides. It is possible to form the tube 731 without any seams along its edges. Typically though the tube 731 would be formed from a planar piece of fabric material that is wrapped around a solid tube and then sealed along its adjoining edges. The solid tube may have the cross-section of an ellipse toward the outlet end, i.e., starting with a circular shape at the end at which it is connected to the aspirator diffuser and then changing into an elliptical shape at the open outlet end. The tube 731 thus has a compressed state in which it has a ring shape (prior to initiation of gas generation and deployment of the airbag) and an expanded state in which it has a sleeve shape (during gas generation-shown in FIG. 144) and also a collapsed state (after gas generation is completed-shown in FIG. 145).

Airbag 730 deployment is shown in FIG. 144 where tube valve is fully open (arrows show gas flow direction). FIG. 145 shows the interior 732 of the airbag 730 is filled by gas and in this situation the tube 731 will be collapsed by the airbag pressure (pressure is marked by arrows). Tube 731 cross section is shown in FIG. 146 and it has the form of an ellipse with two sharp edges 734. Tube width 737 should be about 3 to 5 times longer that tube height 735.

The tube 731 may be made from fabric that is flexible and generally impervious to air and the inflation medium. This will provide a flow in the direction of the arrows in FIG. 144 and not flow through the material comprising the tube 731.

Each tube 731 may be attached to the diffuser section of an aspirator assembly disclosed herein, possibly to the outer edge of the diffuser section or to the outer surface of the diffuser section. The manner of attachment is not critical and should ensure that the tube 731 does not separate from the diffuser section during gas flow out of the aspirator assembly. The tube 731 initially has a collapsed state and may be present within the folded airbag 732 and/or within a portion of the aspirator assembly.

By virtue of its flexibility, the tube 731 does not maintain its form when the gas flow out of the aspirator assembly ceases. Thus, once the gas flow from the aspirator assembly ceases, it inherently will collapse on itself and thereby hinder and ideally prevent reverse flow. Once the tube 731 is collapsed, the gas in the airbag interior 732 will not be able to flow in significant quantity through the collapsed tube 731. Rather, the gas could be urged to press the tube 731 against itself as shown in FIG. 145.

Although the use of a flexible tube 731 as a reverse flow regulation system is illustrated in combination with one aspirator assembly, it may also be used with any other aspirator apparatus. Indeed, the concept of providing a flexible tube 731 at the outlet of an aspirator may be applied to any number of different airbag aspirators, including but not limited to any of the airbag aspirators disclosed herein.

Moreover, the flexible tube 731 may be used in a side curtain airbag such as shown in FIGS. 138-143 wherein there is a typically elongate housing in which one or more airbags are arranged, and the gas generator is arranged apart from such a housing. A conduit leads from the gas generator to the housing to enable gas generated by the gas generator to flow through the conduit to the housing and more specifically, to an aspirator assembly wherein the generated gas is output through a slit and combines with ambient air in the aspirator assembly with the combined air/gas being forced into the interior of the airbag through the flexible tube 904.

Differing from prior art constructions wherein one airbag is arranged inside of another airbag, in an airbag with the flexible tube 731, the flexible tube is provided with an elongate form with an opening at each end. The opening at the inlet end is the only inlet for inflating medium into the airbag and the opening at the outlet end is the outlet for the inflating medium. The air flow is thus linearly through the flexible tube 731. If there is only a single outlet opening as in a preferred embodiment, it may have the same cross-sectional area as the inlet opening. Moreover, the flexible tube 731 is intentionally not designed to retain inflating medium, see its collapsed state in FIG. 145, in contrast to other airbag within airbag constructions wherein the inner and outer airbags retained inflating medium. Flexible tube 731 is designed to serve as a conduit to the airbag, and is not constructed as an airbag per se.

Referring to FIGS. 147-161, main inventive ideas described herein are used with autonomous vehicles, although they are not restricted to use with such vehicles and their use with other types of vehicles is contemplated by the inventors herein. In such vehicles, people can move around and move the seats around as their needs demand. In one case, the seats can all face each other around a central table and in another they can turn into a sofa where people might sleep (FIG. 153). Therefore, the airbags will need to fill the vehicle and protect the occupants regardless of where they are or what they are doing.

In a traditional case, each airbag will have its own inflator. In a simple configuration, one gas generator 800 can be mounted in the ceiling and used to deploy all the peripheral (side curtain) airbags mounted in the ceiling 801 (FIGS. 148 and 150) and even all ceiling mounted airbags (that deploy in the middle of the interior compartment and not along the side. In this case, there could be one or more tubes 802 (see FIGS. 148 and 150) that lead to each airbag from the centralized gas generator 800, and could be made of metal or another material or materials with the same or similar properties. Alternatively, each airbag can have its own gas generator feeding into its aspirator. This central gas generator and tube design has an advantage in that the gas will cool somewhat while it flows to the airbag. Thus, the gas which inflates each airbag will be cooler and thus will not contract as much once in the airbag. Now, side curtain airbags frequently combine compressed gas with gas generator gas so that the gas filling the airbag is cooler and the airbag retains its pressure for a longer time. One purpose for this is that when a vehicle rolls over, the airbags continue to offer some continuous protection. Hence, the 5+ second gas retention requirement.

Figure 151:
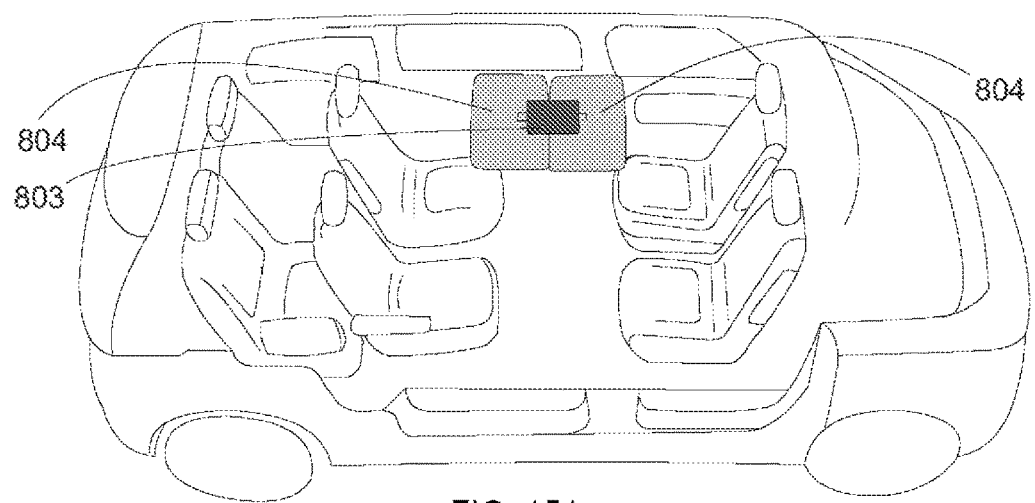
FIG. 151 illustrates another seat arrangement and aspirator with folded airbags in an autonomous vehicle in accordance with the invention.
Figure 152:
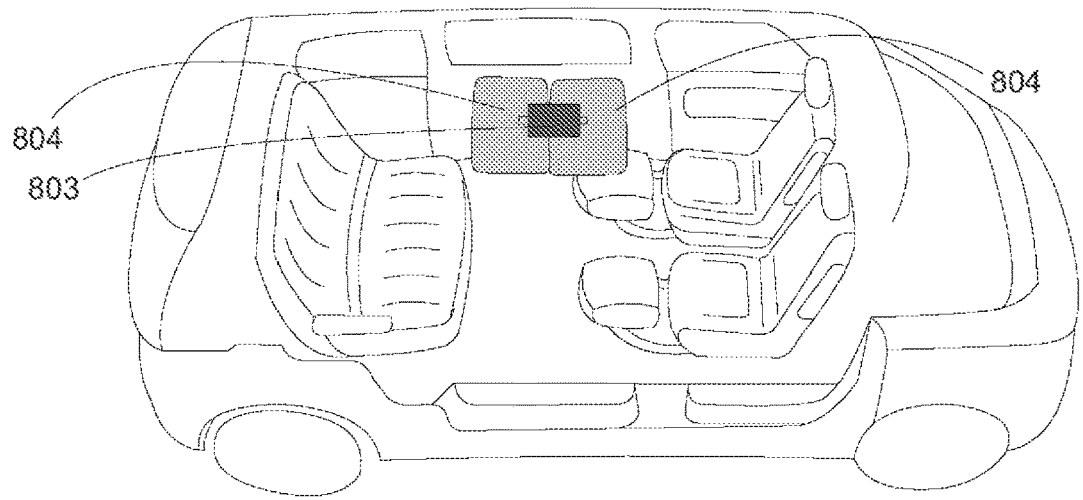
FIGS. 152 and 153 are autonomous vehicle designs in accordance with the invention where the occupant seats can be used for sleeping on a sofa or elongated seats.
Figure 153:
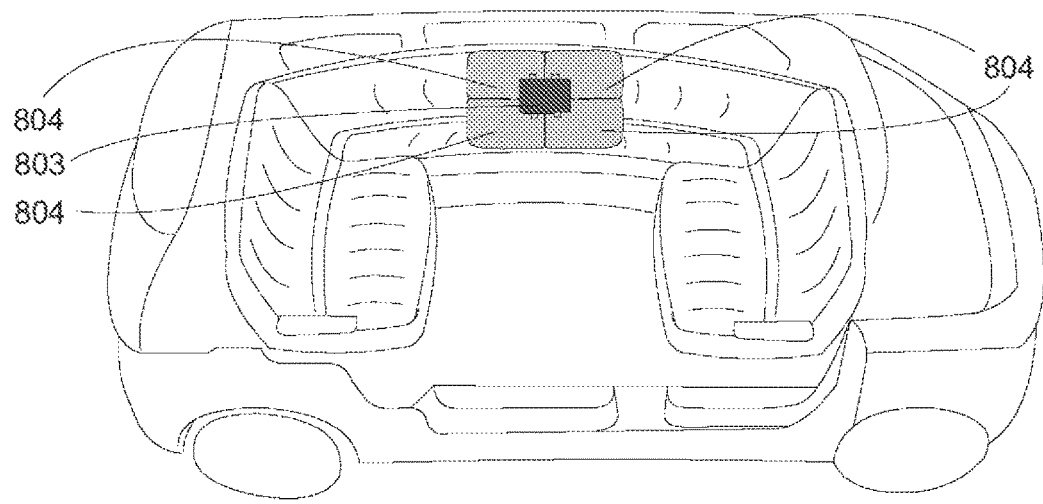

Different types of seating arrangements in autonomous vehicle are shown in FIGS. 151-153. A common feature of autonomous vehicles is lack of a driver seat; thus, occupants can be seated facing each other irrespective of the vehicle moving direction. Standard occupant seats can be replaced by a sofa seats (FIG. 152) which allow occupants to sleep or be in any other free position. Also, the vehicle can have one combined sofa seat which will be located along the sides of vehicle (FIG. 153).

For these embodiments, a ceiling airbag system includes an aspirator 803 and airbags 804; the number of airbags can vary. For example, airbag systems may include two airbags 804 (FIGS. 151 and 152) or four airbags (FIG. 153); airbags 804 are shown in a folded state.

Figure 155:
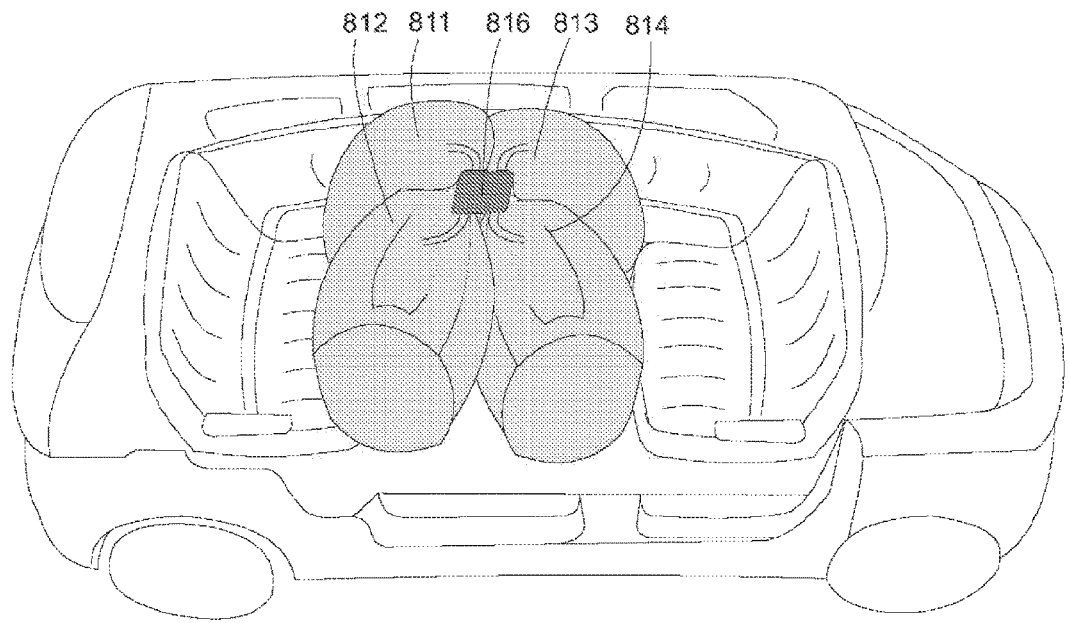
FIG. 155 shows ceiling aspirator system location with folded and deployed airbags in a vehicle in accordance with the invention.
Figure 154:
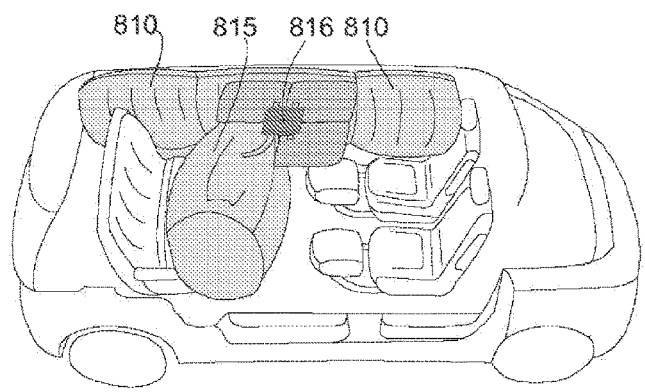
FIG. 154 is a perspective view with portions removed of a vehicle in accordance with the invention having several deployed airbags.

The airbag systems shown in FIGS. 154 and 155 include airbags 810, 811, 812, 813, 814 deploying from the ceiling, upper side of a window and the back of the front seat (if such seats are in the vehicle design). Airbag modules can be mounted at other locations in the passenger compartment, such as along the doors or the lower instrument panel, if present, for knee protection.

FIG. 154 is a perspective view with portions removed of a vehicle having several deployed airbags 810, 815. Specifically, a single airbag having several interconnected sections, not shown, is deployed downward before being filled so that it fits between the front seat and the vehicle side upon inflation. This deployment position provides substantial support for the airbag and helps prevent the occupant from being ejected from the vehicle even when the side window glass has broken.

More particularly, in this embodiment (FIG. 154), an airbag system for protecting at least the front-seated occupant comprises an airbag 810 having a frontal portion 815 sized and shaped for deploying in front of the front-facing occupant and a side portion sized and shaped for deploying to the side of the front-facing occupant. In this manner, airbag 810 wraps around the front-facing occupant during deployment for continuous front to side coverage. An inflator 816 is provided for inflating the single integral airbag with gas. As shown, the side portion of airbag 810 may be sized and shaped to deploy along an entire side of the vehicle, the side portion of airbag 810 is longer than the frontal portion 815 (or 811 in FIG. 155) and the frontal portion 815 and side portion or airbag 810 are generally oriented at a 90 degree angle relative to each other.

The vehicle includes protection airbag 810 (including a similar airbag for the front seat) each of which is coupled to an airbag system module or inflator 816 thereof whereby each module may include one or more airbags as well as a gas generator for inflating the airbag(s), the airbag(s) being attached to and in fluid communication with the gas generator, and an initiator for initiating the gas generator in response to a crash of the vehicle. The airbag 810 (also airbags 811-814) has been deployed and function as a side head protection airbag. Deployed ceiling airbags are shown in FIG. 155.

The sensing system for controlling the deployment of the airbags is not shown but is coupled to all of the airbag modules, and can detects or forecasts that the crash involving the vehicle has an angular component which might result in head injuries to the occupant from impacts with airbag 810 or airbags 811, 812 of the vehicle (FIG. 155). In this case, the sensing system determines that deployment of the side head protection airbags 810 is warranted, along with deployment of the central protection airbags 811, 812. If one of the passenger seats is unoccupied, as detected by an occupant presence or position sensor, not shown, and the corresponding central protection airbag and side protection airbags are not deployed (for example positions 813, 814 in FIG. 155). In the illustrated embodiment, since both seats were occupied, the appropriate seat protection airbags were deployed. Preferred operation of the airbag system is to deploy all airbags in every crash.

It is thus possible, although not recommended, to selectively control or determine which airbag(s) of a plurality of airbags, e.g., side/head protection airbags, frontal protection airbags, in a passenger compartment of a vehicle should be deployed depending on the crash conditions to thereby avoid unnecessary airbag deployment. Although the sensing system which determines which airbags require deployment is not shown, this system may include or be connected to occupant sensing means for sensing which seats are occupied.

Again, the recommended procedure is to deploy all airbags and allow controlled movement of the occupants for a period of about 5 seconds by allowing the flow of gas from one deployed airbag to another and eventually out into the atmosphere in the vehicle. The gas will eventually leak out of the airbags since they are porous in the case of non-coated fabric airbags or provisions to allow for venting after the crash for airbags made from film may be made.

FIG. 155 is a perspective view of another preferred embodiment of the airbags of this invention 811-814 are shown deployed in a manner to provide protection for a front and a rear seat occupant in front impact collisions and angular frontal impacts and to offer some additional protection against ejection of the occupant.

Figure 156:
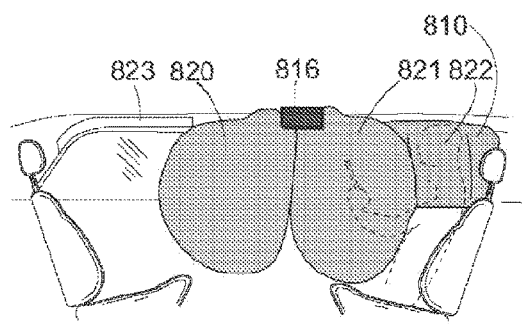
FIG. 156 is a perspective view with portions removed of a vehicle having deployed airbags in accordance with the invention.
Figure 157:
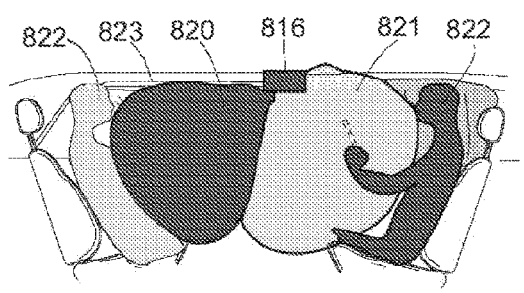
FIG. 157 is a side view of the interior of a vehicle provided with another form of safety device in accordance with the invention, before the occupant begins interacting with the airbag (with the airbag shown going above the ceiling possibly through an open roof.

FIG. 156 illustrates another embodiment of the invention intended to provide protection from side impacts and rollover accidents not only for a person in the front seat but also for a person in the rear seat of the vehicle which is similar to that shown in FIG. 154.

Figure 158:
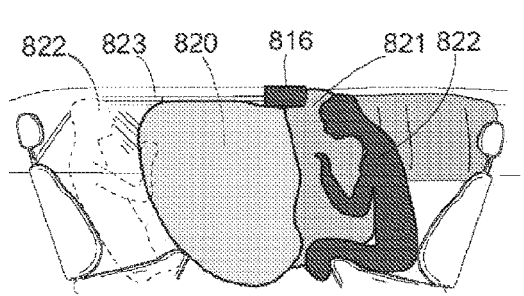
FIG. 158 illustrates air flow from one airbag to another airbag.

Filled central airbags 820 and 821 in FIG. 158 prevent the occupants 822 from colliding with each other. Airbags 820 and 821 do not have vent holes. Vent holes take care of the problem of when the occupant 822 obtains a significant velocity relative to the vehicle structure. Aspirator system will use anticipatory sensors, the airbags will be deployed prior to the crash and thus deployed airbags provide a coupling between the occupants and the vehicle. For the case where the airbags are made from film and thus do not leak, vent holes can be open from the airbags after the crash.

The central airbags 820 and 821 provide resistance to the motion of the occupants 822 and to dampen their motion during a crash but the curtain airbags 823 (FIGS. 157 and 158) really contain the occupants 822 within the vehicle, combined combination of these airbags in their filled state keeps the occupants in their initial position (i.e., their position before the crash).

Figure 159:
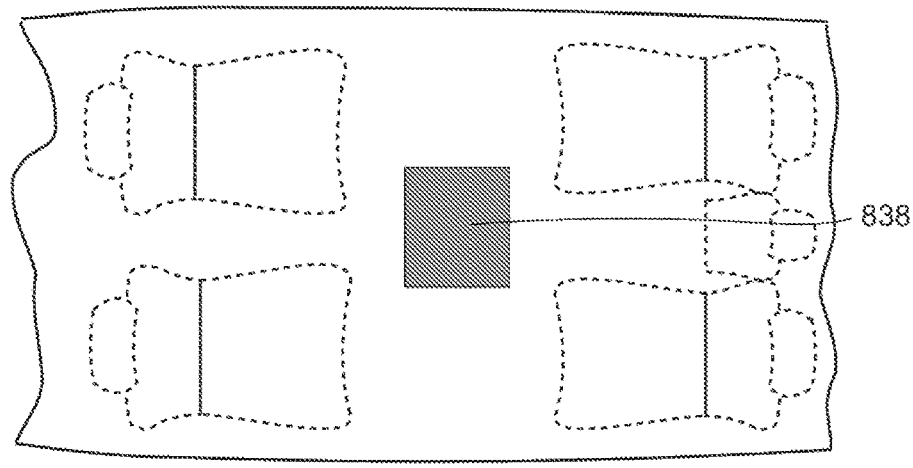
FIGS. 159-161 show top views of different positions of filled airbags.
Figure 160:
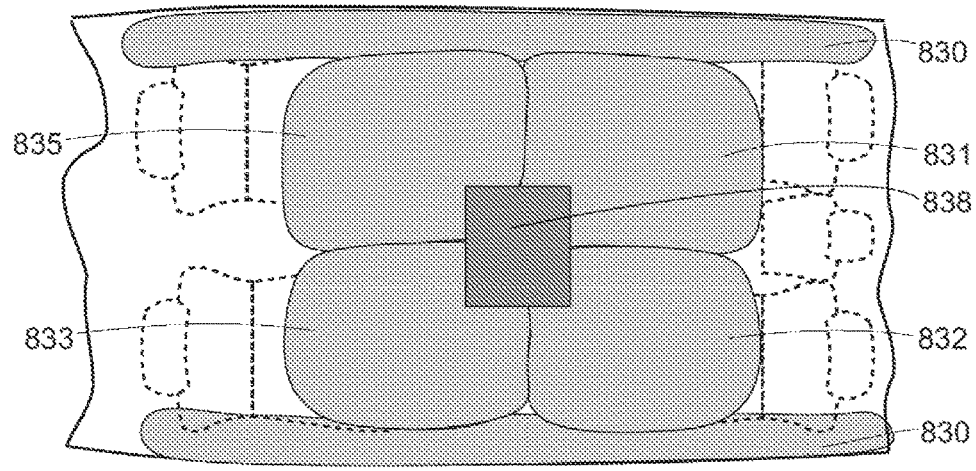
Figure 161:
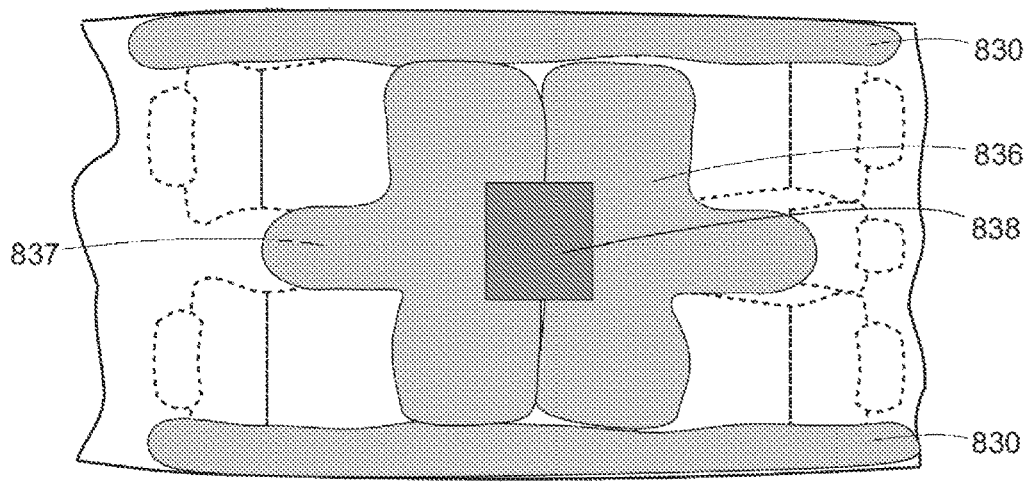

Various exemplary airbag systems for the protection for occupants in an automotive vehicle are illustrated in FIGS. 159-161. Several top views of different airbag arrangements are shown for protecting occupants of the vehicle, i.e., side airbags 830 and front seat airbags 831, 832, 833, 835, 837 are shown in FIGS. 160 and 161. With respect to the positioning of the side airbag 830, each airbag 830 may be contained within a housing positioned entirely above the window of the respective side door prior to deployment, i.e., no portion of it extends down the A-pillar or the B-pillar of the vehicle. The side airbag housing thus includes a mounting structure (not shown) for mounting it above the window to the ceiling of the vehicle such that it preferably extends across both side doors and protects any occupants sitting on that side of the vehicle from impacting against the windows in the side panels or side doors.

To ensure adequate protection for occupants from side impacts, as well as frontal impacts and roll-overs which would result in sideward movement of the occupants against the side doors, the airbag housing is constructed so that the airbags 831, 832, 833, 835 are initially projected in a downward direction from the ceiling during inflation and fill all internal space of the vehicle. This initial projection may be designed as a property of a module 838 which houses the airbags 831, 832, 833, 835, e.g., by appropriate construction and design of the module 838 and its components such as the dimensioning the module's deployment door and deployment mechanism.

Simultaneous deployment of any combination of airbags 830, 831, 832, 833 (FIG. 160), or even all of these airbags, may be initiated by a sensor and diagnostic module upon determining or predicting by anticipatory sensors, that a crash requiring deployment of such airbag(s) is required. Thus, the sensor and diagnostic module may determine that deployment of only the front airbags 831, 832, 836 and the side airbag 830 is desired, for example, in the case of a frontal crash, or possibly only the side and rear seat airbags in the event of a side impact. Accordingly, the sensor and diagnostic module may be designed to detect or forecast frontal impacts requiring deployment of airbags as well as side impacts requiring deployment of airbags and rear impacts requiring deployment of airbags. Anticipatory sensors will most likely control the deployment of the airbags in autonomous vehicles and usually all airbags will be deployed.

If the vehicle is substantially filled with airbags deployed from conventional non-aspirated airbag systems during a crash, the pressure within the vehicle can increase to the point that windows can be broken and doors forcibly opened. This increased pressure can also cause damage to the hearing of vehicle occupants. The aspirated inflators of the current invention use a substantial percentage of the passenger compartment air to inflate the airbags. This percentage can vary from 60% to 90% depending of the aspirator design. By aspirating vehicle air to inflate the airbags, the pressure increase in the vehicle is minimized.

There are of course many ways of making ceiling-mounted airbags using chambers without departing from the teachings of this invention such as disclosed in published patent applications WO03093069, 20030234523 and 20030218319, incorporated by reference herein. Such airbags can be made from tubular sections or sections of other shapes and the amount of deployment of such airbags can be determined by occupant sensors as disclosed in other patents assigned to the assignee/applicant of this patent application. Such airbags can be flat as disclosed herein or other shapes.

Although several preferred embodiments are illustrated and described above, there are possible combinations using other geometries, sensors, materials and different dimensions for the components that perform the same functions. The inventions disclosed herein are not limited to the above embodiments and should be determined by the following claims. There are also numerous additional applications in addition to those described above. Many changes, modifications, variations and other uses and applications of the subject invention will become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the following claims.

The invention claimed is:

1. An inflator system for an airbag, comprising:
a housing defining at least one flow passage having a first end region and a second end region and configured to lead into an interior of the airbag when the airbag is coupled to said housing;
a reverse flow valve arranged at said second end region and configured to selectively enable connection of said at least one flow passage to ambient atmosphere dependent on a pressure differential on opposite sides of said reverse flow valve;
a gas generator that generates gas, said gas generator being activatable to cause inflation of the airbag; and
an aspirator between said first and second end regions and at least partly alongside said at least one flow passage, said aspirator including an inlet portion at said second end region and an aspiration portion partly separated from said inlet portion to define at least one slit therebetween in flow communication with said gas generator in order to receive gas generated by said gas generator and in flow communication with said at least one flow passage, said at least one slit being oriented toward said first end region,
said aspiration portion including a wall exposed to said at least one flow passage and, in a direction of gas flow, having a first straight wall portion after said at least one slit and a second straight wall portion after said first straight wall portion in the gas flow direction, said second straight wall portion being at an obtuse angle to said first straight wall portion,
whereby the gas generated by said gas generator flows through said at least one slit, then over said first straight wall portion and around the obtuse angle and expands as it flows over said second straight wall portion.

2. The system of claim 1, wherein said housing is annular, said at least one flow passage consists of a single passage, and said slit consists of a single circumferential slit around a circumference of said single passage.

3. The system of claim 2, wherein said aspiration portion includes a first inner wall portion at said second end region, a second inner wall portion alongside said first inner wall portion and which is cylindrical, and a third inner wall portion alongside said second inner wall portion, said third inner wall portion being part of a diffuser of said aspirator and being situated alongside said first end region, said first inner wall portion having a narrowing cross-section in a direction from said second end region to said second inner wall portion and defining said first and second straight wall portions, said third inner wall portion having an increasing cross-section from said second inner wall portion to said first end region.

4. The system of claim 1, wherein said reverse flow valve is at least partly pliable and includes at least one flap that separates from adjoining material to create an opening between the opposite sides of said reverse flow valve.

5. The system of claim 1, wherein said housing is annular, said at least one flow passage consists of a single passage, said inlet portion of said aspirator includes a first disk and said aspirator portion of said aspirator includes a second disk situated relative to said first disk to define therebetween a chamber and define said at least one slit through which gas generated by said gas generator flows into said chamber and then through said at least one slit into said single passage at a location between said first and second end regions.

6. The system of claim 5, wherein said first disk is more proximate said first end region of said housing and said second disk is more proximate said second end region of the housing, said first disk comprising said first and second straight wall portions.

7. The system of claim 5, wherein said reverse flow valve comprises flexible flaps that flex inward into said single passage when pressure in said single passage is lower than pressure behind said reverse flow valve to cause ambient air to be drawn into said single passage.

8. The system of claim 5, further comprising pylons that fixedly connect said aspirator to said housing, said pylons being spaced from each other to define gas flow conduits in flow communication with said single passage.

9. The system of claim 5, wherein said first disk is more proximate said first end region of said housing and said second disk is more proximate said second end region of the housing, said first disk comprising said first and second straight wall portions, said first straight wall portion defining an additional obtuse angle opposite an intermediate location of a second wall defined by said second disk and said obtuse angle being opposite an end of said second wall defined by said second disk.

10. The system of claim 1, wherein said aspirator is configured to generate gas flow in accordance with the Prandtl-Meyer effect.

11. The system of claim 1, wherein said housing is elongate and has opposed side walls, a top wall and a bottom wall opposite said top wall, said side walls, said top wall and said bottom wall defining said at least one flow passage, said at least one slit comprising elongate slits between said gas generator and said at least one flow passage such that gas generated by said gas generator flows through said elongate slits into said at least one flow passage.

12. The system of claim 1, wherein said wall is configured to cause supersonic Prandtl-Meyer flow of gas exiting through said at least one slit.

13. An airbag assembly, comprising:
the system of claim 1;
an inflatable airbag in a folded state and having an interior communicating with said at least one flow passage; and
an airbag cover that covers said inflatable airbag prior to inflation.

14. The assembly of claim 13, wherein said aspirator defines a pressure distribution chamber that operatively receives gas for inflation of said inflatable airbag and said at least one slit communicates with said pressure distribution chamber and provides a conduit between said pressure distribution chamber and said at least one flow passage.

15. The assembly of claim 14, wherein said aspirator is situated in an interior of said at least one flow passage and said at least one slit consists of a single slit extending around a circumference of said aspirator.

16. An airbag assembly, comprising:
the system of claim 1;
an airbag; and
a flexible tube coupled to an outlet end of said housing and providing a conduit for gas to flow in a first direction from an outlet of said aspirator to the interior of said airbag, said flexible tube collapsing when said gas generator stops generating gas to thereby hinder flow of gas in a second direction opposite to the first direction from the interior of said airbag to said aspirator.

17. The assembly of claim 16, wherein said reverse flow valve comprises flexible flaps that flex inward or outward dependent on the pressure differential on opposite sides of said reverse flow valve.

18. The assembly of claim 16, wherein said tube is configured to have an initial state in which it has a ring shape, an expanded, operational state in which it has a sleeve shape during gas generation and a collapsed state after gas generation is completed.

19. An autonomous vehicle lacking a steering wheel and a driver seat, comprising:
a frame including a ceiling and defining a passenger compartment below said ceiling;
seat portions in said passenger compartment;
an airbag housing in said ceiling;
at least one airbag in said airbag housing and configured to deploy downward into said passenger compartment; and
the system of claim 1 that inflates said at least one airbag in response to vehicular activity.

20. The vehicle of claim 19, wherein said seat portions comprise at least a first seat portion on a first side of said passenger compartment, a second seat portion on a second side of said passenger compartment opposite to the first side, and a third seat portion between and perpendicular to said first and second seat portions.

21. An inflator system for an airbag, comprising:
a housing defining at least one flow passage having a first end region and a second end region and configured to lead into an interior of the airbag when the airbag is coupled to said housing;
a reverse flow valve arranged at said second end region and configured to selectively enable connection of said at least one flow passage to ambient atmosphere dependent on a pressure differential on opposite sides of said reverse flow valve;
a gas generator that generates gas, said gas generator being activated to cause inflation of the airbag; and
an aspirator between said first and second end regions, said aspirator including an inlet portion at said second end region and an aspiration portion partly separated from said inlet portion to define at least one slit therebetween in flow communication with said gas generator in order to receive gas generated by said gas generator and in flow communication with said at least one flow passage, said at least one slit being oriented toward said first end region such that the gas generated by said gas generator flows through said at least one slit into said at least one flow passage and toward said first end region,
said at least one flow passage consisting of a single passage,
said at least one slit consisting of a single circumferential slit around a circumference of said single passage, said aspiration portion including a first inner wall portion at said second end region, a second inner wall portion alongside said first inner wall portion and which is cylindrical, and a third inner wall portion alongside said second inner wall portion, said third inner wall portion being part of a diffuser of said aspirator and being situated alongside said first end region, said first inner wall portion having a narrowing cross-section in a direction from said second end region to said second inner wall portion, said third inner wall portion having an increasing cross-section from said second inner wall portion to said first end region.

22. An inflator system for an airbag, comprising:
a housing defining at least one flow passage having a first end region and a second end region and configured to lead into an interior of the airbag when the airbag is coupled to said housing;
a reverse flow valve arranged at said second end region and configured to selectively enable connection of said at least one flow passage to ambient atmosphere dependent on a pressure differential on opposite sides of said reverse flow valve;
a gas generator that generates gas, said gas generator being activated to cause inflation of the airbag;
an aspirator between said first and second end regions,
said aspirator including an inlet portion at second end region and an aspiration portion partly separated from said inlet portion to define at least one slit therebetween in flow communication with said gas generator in order to receive gas generated by said gas generator and in flow communication with said at least one flow passage, said at least one slit being oriented toward said first end region such that the gas generated by said gas generator flows through said at least one slit into said at least one flow passage and toward said first end region,
said at least one flow passage consisting of a single passage,
said inlet portion of said aspirator including a first disk and said aspirator portion of said aspirator including a second disk situated relative to said first disk to define therebetween a chamber and said at least one slit through which gas generated by said gas generator flows into said chamber and then through said at least one slit into said single passage at a location between said first and second end regions; and
pylons that fixedly connect said aspirator to said housing, said pylons being spaced from each other to define gas flow conduits in flow communication with said single passage.

23. An inflator system for an airbag, comprising:
a housing defining at least one flow passage having a first end region and a second end region and configured to lead into an interior of the airbag when the airbag is coupled to said housing;
a reverse flow valve arranged at said second end region and configured to selectively enable connection of said at least one flow passage to ambient atmosphere dependent on a pressure differential on opposite sides of said reverse flow valve;
a gas generator that generates gas, said gas generator being activated to cause inflation of the airbag; and
an aspirator between said first and second end regions,
said aspirator including an inlet portion at said second end region and an aspiration portion partly separated from said inlet portion to define at least one slit therebetween in flow communication with said gas generator in order to receive gas generated by said gas generator and in flow communication with said at least one flow passage, said at least one slit being oriented toward said first end region such that the gas generated by said gas generator flows through said at least one slit into said at least one flow passage and toward said first end region,
said at least one flow passage consisting of a single passage,
said inlet portion of said aspirator including a first disk and said aspirator portion of said aspirator including a second disk situated relative to said first disk to define therebetween a chamber and define said at least one slit through which gas generated by said gas generator flows into said chamber and then through said at least one slit into said single passage at a location between said first and second end regions,
said first disk being more proximate said first end region of said housing and said second disk being more proximate said second end region of the housing, said first disk defining a first wall having two obtuse angles, one opposite an intermediate location of a second wall defined by said second disk and one opposite an end of said second wall.

24. An inflator system for an airbag, comprising:
an elongate housing having opposed side walls, a top wall and a bottom wall opposite said top wall, said side walls, said top wall and said bottom wall defining at least one flow passage having a first end region and a second end region and configured to lead into an interior of the airbag when the airbag is coupled to said elongate housing, said at least one flow passage having an inlet at said first end region and an outlet at said second end region;
a reverse flow valve arranged at said second end region and configured to selectively enable connection of said at least one flow passage to ambient atmosphere dependent on a pressure differential on opposite sides of said reverse flow valve;
a gas generator that generates gas, said gas generator being activated to cause inflation of the airbag; and
an aspirator between said first and second end regions,
said aspirator including an inlet portion at said second end region and an aspiration portion partly separated from said inlet portion to define at least one slit therebetween in flow communication with said gas generator in order to receive gas generated by said gas generator and in flow communication with said at least one flow passage, said at least one slit being oriented toward said first end region such that the gas generated by said gas generator flows through said at least one slit into said at least one flow passage and toward said first end region,
said at least one slit comprising elongate slits between said gas generator and said at least one flow passage such that gas generated by said gas generator flows through said elongate slits into said at least one flow passage.

* * * * *